US012410266B2

(12) United States Patent
Nanba et al.

(10) Patent No.: US 12,410,266 B2
(45) **Date of Patent: *Sep. 9, 2025**

(54) METHOD FOR MANUFACTURING FLUOROPOLYMER

(71) Applicant: DAIKIN INDUSTRIES, LTD., Osaka (JP)

(72) Inventors: Yoshinori Nanba, Osaka (JP); Kenji Ichikawa, Osaka (JP); Yohei Fujimoto, Osaka (JP); Hirotoshi Yoshida, Osaka (JP); Hiroyuki Sato, Osaka (JP); Taketo Kato, Osaka (JP); Kengo Ito, Osaka (JP); Sumi Ishihara, Osaka (JP); Masahiro Higashi, Osaka (JP); Satoru Yoneda, Osaka (JP); Hirokazu Aoyama, Osaka (JP); Masamichi Sukegawa, Osaka (JP); Yosuke Kishikawa, Osaka (JP); Takahiro Taira, Osaka (JP); Chiaki Okui, Osaka (JP); Taku Yamanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/216,644

(22) Filed: Jun. 30, 2023

(65) Prior Publication Data

US 2023/0340169 A1 Oct. 26, 2023

Related U.S. Application Data

(63) Continuation of application No. 16/976,945, filed as application No. PCT/JP2019/008234 on Mar. 1, 2019, now Pat. No. 11,767,379.

(30) Foreign Application Priority Data

Mar. 1, 2018 (JP) ................................ 2018-036879
Nov. 19, 2018 (JP) ................................ 2018-216864

(51) Int. Cl.

| | |
|---|---|
| ***C08F 14/26*** | (2006.01) |
| ***B29C 55/00*** | (2006.01) |
| ***B29K 27/18*** | (2006.01) |
| ***C08F 2/22*** | (2006.01) |
| ***C08F 2/44*** | (2006.01) |
| ***C08F 114/26*** | (2006.01) |
| ***C08F 214/26*** | (2006.01) |
| ***C08F 261/06*** | (2006.01) |

(52) U.S. Cl.
CPC ............ *C08F 14/26* (2013.01); *B29C 55/005* (2013.01); *C08F 2/22* (2013.01); *C08F 2/44* (2013.01); *C08F 114/26* (2013.01); *C08F 214/26* (2013.01); *C08F 261/06* (2013.01); *B29K 2027/18* (2013.01)

(58) Field of Classification Search
None
See application file for complete search history.

(56) References Cited

U.S. PATENT DOCUMENTS

| | | | | |
|---|---|---|---|---|
| 4,273,729 A | 6/1981 | Krespan | | |
| 4,275,225 A | 6/1981 | Krespan | | |
| 4,349,650 A | 9/1982 | Krespan | | |
| 5,804,650 A | 9/1998 | Tsuda et al. | | |
| 7,455,934 B1 | 11/2008 | Araki et al. | | |
| 9,096,701 B2 | 8/2015 | Tsuda et al. | | |
| 11,767,379 B2 * | 9/2023 | Nanba .................. | C08F 114/26 526/242 | |
| 2007/0004848 A1 | 1/2007 | Hintzer et al. | | |
| 2007/0060699 A1 | 3/2007 | Tsuda et al. | | |
| 2007/0208131 A1 | 9/2007 | Tsuda et al. | | |

(Continued)

FOREIGN PATENT DOCUMENTS

| | | |
|---|---|---|
| CN | 1871268 A | 11/2006 |
| CN | 1938337 A | 3/2007 |

(Continued)

OTHER PUBLICATIONS

Extended European Search Report issued Apr. 5, 2024 by European Patent Office in European Application No. 23216669.4.
Extended European Search Report dated Dec. 1, 2021 in Application No. 19760711.2.
International Preliminary Report on Patentability dated Sep. 1, 2020 from the International Bureau in International Application No. PCT/JP2019/008234.
International Search Report for PCT/JP2019/008234 dated May 28, 2019 [PCT/ISA/210].

*Primary Examiner* — Katarzyna I Kolb
(74) *Attorney, Agent, or Firm* — Sughrue Mion, PLLC

(57) ABSTRACT

A method for producing a fluoropolymer, which includes polymerizing a fluoromonomer in an aqueous medium in the presence of a polymer (1), the polymer (1) including a polymerized unit derived from a monomer $CX_2$═CY(—$CZ_2$—O—Rf-A), wherein X is the same or different and is —H or —F; Y is —H, —F, an alkyl group, or a fluorine-containing alkyl group; Z is the same or different and is —H, —F, an alkyl group, or a fluoroalkyl group; Rf is a C1-C40 fluorine-containing alkylene group or a C2-C100 fluorine-containing alkylene group and having an ether bond; and A is —COOM, —$SO_3M$, or —$OSO_3M$, wherein M is —H, a metal atom, —$NR^7_4$, imidazolium optionally having a substituent, pyridinium optionally having a substituent, or phosphonium optionally having a substituent, wherein R' is H or an organic group, providing that at least one of X, Y, and Z contains a fluorine atom.

14 Claims, No Drawings

(56) References Cited

U.S. PATENT DOCUMENTS

| | | | | |
|---|---|---|---|---|
| 2009/0227727 | A1* | 9/2009 | Tsuda | C08F 14/18<br>524/544 |
| 2011/0021716 | A1 | 1/2011 | Washino et al. | |
| 2012/0322941 | A1 | 12/2012 | Tsuda et al. | |
| 2018/0142043 | A1 | 5/2018 | Higuchi et al. | |
| 2020/0392266 | A1 | 12/2020 | Nanba et al. | |
| 2023/0340169 | A1 | 10/2023 | Nanba et al. | |

FOREIGN PATENT DOCUMENTS

| | | | |
|---|---|---|---|
| EP | 1681308 | A1 | 7/2006 |
| EP | 1739100 | A1 | 1/2007 |
| EP | 3885406 | A1 | 9/2021 |
| JP | 11-181009 | A | 7/1999 |
| JP | 2003-231722 | A | 8/2003 |
| JP | 2005-320501 | A | 11/2005 |
| JP | 2006-111722 | A | 4/2006 |
| JP | 2008-545873 | A | 12/2008 |
| JP | 6974784 | A | 12/2021 |
| JP | 7315863 | B2 | 7/2023 |
| WO | 2005/121290 | A1 | 12/2005 |
| WO | 2009/119439 | A1 | 10/2009 |
| WO | 2017/030094 | A1 | 2/2017 |
| WO | 2020/105650 | A1 | 5/2020 |

* cited by examiner

METHOD FOR MANUFACTURING FLUOROPOLYMER

CROSS REFERENCE TO RELATED APPLICATIONS

This application is a Continuation Application of U.S. application Ser. No. 16/976,945, filed Aug. 31, 2020, which is a National Stage of International Application No. PCT/JP2019/008234 filed Mar. 1, 2019, claiming priority based on Japanese Patent Application Nos. 2018-036879 filed Mar. 1, 2018 and 2018-216864 filed Nov. 19, 2018. The respective contents of all of the above prior applications are incorporated herein in their entirety.

TECHNICAL FIELD

The present disclosure relates to a method for producing a fluoropolymer.

BACKGROUND ART

In the production of fluoropolymers by emulsion polymerization, methods using specific fluorine-containing polymers are known.

For example, Patent Document 1 discloses a method for producing an aqueous dispersion containing rod-shaped fine particles of polytetrafluoroethylene having an average aspect ratio of 2 or more, which includes polymerizing tetrafluoroethylene in the presence of a polymer containing a polymerized unit represented by the formula 1 or a copolymer containing a polymerized unit represented by the formula 1 and a polymerized unit represented by the formula 2, provided that the polymerized unit represented by the formula 1 is 40 mol % or more based on all polymerized units.

Formula 1

$$\text{—}CF_2CF\text{—}\quad(\text{with pendant } OR^fCOOM)$$

Formula 2

$$\text{—}CF_2CFX\text{—}$$

wherein in the formula 1, $R^f$ is a perfluoroperfluoroalkylene group having 1 to 6 carbon atoms, and M is an alkali metal ion or an ammonium ion, and in the formula 2, X is a fluorine atom or a chlorine atom.

RELATED ART

Patent Documents

Patent Document 1: Japanese Patent Laid-Open No. 11-181009

SUMMARY OF THE INVENTION

Problem to be Solved by the Invention

An object of the present disclosure is to provide a novel method for producing a fluoropolymer.

Means for Solving the Problem

The present disclosure relates to a method for producing a fluoropolymer, comprising polymerizing a fluoromonomer in an aqueous medium in the presence of a polymer (1) to provide a fluoropolymer, the polymer (1) comprising a polymerized unit (1) derived from a monomer represented by the following general formula (1):

$$CX_2\text{=}CY(\text{—}CZ_2\text{—}O\text{—}Rf\text{-}A) \quad (1)$$

wherein X is the same or different and is —H or —F; Y is —H, —F, an alkyl group, or a fluorine-containing alkyl group; Z is the same or different and is —H, —F, an alkyl group, or a fluoroalkyl group; Rf is a fluorine-containing alkylene group having 1 to 40 carbon atoms or a fluorine-containing alkylene group having 2 to 100 carbon atoms and having an ether bond; and A is —COOM, $—SO_3M$, or $—OSO_3M$, wherein M is —H, a metal atom, $—NR^7_4$, imidazolium optionally having a substituent, pyridinium optionally having a substituent, or phosphonium optionally having a substituent, wherein $R^7$ is H or an organic group, with the proviso that at least one of X, Y, and Z contains a fluorine atom.

In the general formula (1), at least one X is preferably —H. Further, in the general formula (1), both X are preferably —H.

In the general formula (1), Rf is preferably a fluorine-containing alkylene group having 1 to 10 carbon atoms or a fluorine-containing alkylene group having 2 to 12 carbon atoms and having an ether bond.

The polymerized unit (1) is preferably a polymerized unit (1A) derived from a monomer represented by the following general formula (1A):

$$CH_2\text{=}CF(\text{—}CF_2\text{—}O\text{—}Rf\text{-}A) \quad (1A)$$

wherein Rf and A are as described above.

The polymerized unit (1) is also preferably a polymerized unit (1a) derived from a fluoroallyl ether compound represented by the following general formula (1a):

$$CX_2\text{=}CFCF_2\text{—}O\text{—}(CF(CF_3)CF_2O)_{n5}\text{—}CF(CF_3)\text{-}A \quad (1a)$$

wherein each X is the same and represents F or H; n5 represents 0 or an integer of 1 to 10; and A is as defined above.

In the formula, A is preferably —COOM. In the formula, M is preferably —H, —Na, —K, —Li, or $—NH_4$.

In the polymer (1), the content of the polymerized unit (1) is preferably 90 mol % or more based on all polymerized units.

The number average molecular weight of the polymer (1) is preferably $1.0\times10^4$ or more, and more preferably $3.0\times10^4$ or more.

The fluoropolymer is preferably polytetrafluoroethylene. The polyfluorotetraethylene is preferably modified polytetrafluoroethylene.

The present disclosure also relates to a method for producing a stretched body, which includes stretching a polytetrafluoroethylene obtained by the production method.

The present disclosure further relates to a composition comprising a fluoropolymer and a polymer (1) comprising a polymerized unit (1) derived from a monomer represented by the following general formula (1):

$$CX_2\text{=}CY(\text{—}CZ_2\text{—}O\text{—}Rf\text{-}A) \quad (1)$$

wherein X is the same or different and is —H or —F; Y is —H, —F, an alkyl group, or a fluorine-containing alkyl group; Z is the same or different and is —H, —F, an alkyl group, or a fluoroalkyl group; Rf is a fluorine-containing alkylene group having 1 to 40 carbon atoms or a fluorine-containing alkylene group having 2 to 100 carbon atoms and having an ether bond; and A is —COOM, —$SO_3M$, or —$OSO_3M$, wherein M is —H, a metal atom, —$NR^7_4$, imidazolium optionally having a substituent, pyridinium optionally having a substituent, or phosphonium optionally having a substituent, wherein $R^7$ is H or an organic group, with the proviso that at least one of X, Y, and Z contains a fluorine atom.

The polymerized unit (1) is preferably a polymerized unit (1A) derived from a monomer represented by the following general formula (1A):

$$CH_2{=}CF({-}CF_2{-}O{-}Rf\text{-}A) \quad (1A)$$

wherein Rf and A are as described above.

In the composition of the present disclosure, the content of the polymer (1) is preferably 0.0001% by mass or more and 20% by mass or less based on the fluoropolymer.

The fluoropolymer is preferably polytetrafluoroethylene.

The polyfluorotetraethylene is preferably modified polytetrafluoroethylene.

The composition of the present disclosure is preferably stretchable.

The composition of the present disclosure preferably has a breaking strength of 10.0 N or more.

The composition of the present disclosure is preferably substantially free from a fluorine-containing surfactant.

The composition of the present disclosure is preferably a powder.

Effects of Invention

The production method of the present disclosure is a novel method for producing a fluoropolymer.

DESCRIPTION OF EMBODIMENTS

Before describing the present disclosure in detail, some terms used herein are defined or described below.

The fluororesin as used herein means a partially crystalline fluoropolymer which is a fluoroplastic. The fluororesin has a melting point and has thermoplasticity, and may be either melt-fabricable or non melt-processible.

The melt-fabricable as used herein means that a polymer has an ability to be processed in a molten state using a conventional processing device such as an extruder or an injection molding machine. Thus, a melt-fabricable fluororesin usually has a melt flow rate of 0.01 to 500 g/10 min as measured by the measurement method to be described later.

The fluoroelastomer as used herein means an amorphous fluoropolymer. The term "amorphous" means that a fluoropolymer has a melting peak (ΔH) of 4.5 J/g or lower as determined by differential scanning calorimetry (DSC) (temperature-increasing rate: 10° C./min) or differential thermal analysis (DTA) (temperature-increasing rate: 10° C./min). The fluoroelastomer exhibits elastomeric characteristics when crosslinked. The elastomeric characteristics mean that a polymer has an ability to be stretched and to retain its original length when the force required to stretch the polymer is no longer applied.

The partially fluorinated elastomer as used herein means a fluoropolymer containing a fluoromonomer unit, having a perfluoromonomer unit content of less than 90 mol % based on all polymerized units, having a glass transition temperature of 20° C. or lower, and having a melting peak (ΔH) of 4.5 J/g or lower.

The perfluoroelastomer as used herein means a fluoropolymer having a perfluoromonomer unit content of 90 mol % or more based on all polymerized units, having a glass transition temperature of 20° C. or lower, having a melting peak (ΔH) of 4.5 J/g or lower, and having a fluorine atom concentration in the fluoropolymer of 71% by mass or more. The fluorine atom concentration in the fluoropolymer as used herein is the concentration (% by mass) of the fluorine atoms contained in the fluoropolymer calculated based on the type and content of each monomer constituting the fluoropolymer.

The perfluoromonomer as used herein means a monomer free from a carbon-hydrogen bond in the molecule. The perfluoromonomer may be a monomer containing carbon atoms and fluorine atoms in which some of the fluorine atoms bonded to any of the carbon atoms are replaced by chlorine atoms, and may be a monomer containing a nitrogen atom, an oxygen atom, a sulfur atom, a phosphorus atom, a boron atom, or a silicon atom in addition to the carbon atoms. The perfluoromonomer is preferably a monomer in which all hydrogen atoms are replaced by fluorine atoms. The perfluoromonomer does not encompass a monomer that provides a crosslinking site.

The monomer that provides a crosslinking site is a monomer (cure-site monomer) having a crosslinkable group that provides the fluoropolymer with a crosslinking site for forming a crosslink with the curing agent.

The polytetrafluoroethylene (PTFE) as used herein is preferably a fluoropolymer having a tetrafluoroethylene content of 99 mol % or more based on all polymerized units.

The fluororesin other than polytetrafluoroethylene and the fluoroelastomer as used herein are each preferably a fluoropolymer having a tetrafluoroethylene content of less than 99 mol % based on all polymerized units.

The content of each of the monomers constituting the fluoropolymer can be calculated herein by any appropriate combination of NMR, FT-IR, elemental analysis, X-ray fluorescence analysis, and other known methods in accordance with the types of the monomers.

The term "organic group" as used herein means a group containing one or more carbon atoms or a group obtainable by removing one hydrogen atom from an organic compound.

Examples of the "organic group" include:

an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents,
a heteroaryl group optionally having one or more substituents,
a cyano group,
a formyl group,
RaO—,
RaCO—,
$RaSO_2$—,
RaCOO—,
RaNRaCO—,
RaCONRa—,
RaOCO—, $RaOSO_2$—, and
$RaNRbSO_2$—,
wherein each Ra is independently
- an alkyl group optionally having one or more substituents,
- an alkenyl group optionally having one or more substituents,
- an alkynyl group optionally having one or more substituents,
- a cycloalkyl group optionally having one or more substituents,
- a cycloalkenyl group optionally having one or more substituents,
- a cycloalkadienyl group optionally having one or more substituents,
- an aryl group optionally having one or more substituents,
- an aralkyl group optionally having one or more substituents,
- a non-aromatic heterocyclic group optionally having one or more substituents, or
- a heteroaryl group optionally having one or more substituents, and each Rb is independently H or an alkyl group optionally having one or more substituents.

The organic group is preferably an alkyl group optionally having one or more substituents.

The term "substituent" as used herein means a group capable of replacing another atom or group. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxyamino group, a carbamoylamino group, a sulfamoyl amino group, a halogen atom, a sulfamoyl carbamoyl group, a carbamoyl sulfamoyl group, a dialiphatic oxyphosphinyl group, and a diaromatic oxyphosphinyl group.

The aliphatic group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic group include alkyl groups having 1 to 8, preferably 1 to 4 carbon atoms in total, such as a methyl group, an ethyl group, a vinyl group, a cyclohexyl group, and a carbamoylmethyl group.

The aromatic group may have, for example, a nitro group, a halogen atom, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic group include aryl groups having 6 to 12 carbon atoms, preferably 6 to 10 carbon atoms in total, such as a phenyl group, a 4-nitrophenyl group, a 4-acetylaminophenyl group, and a 4-methanesulfonylphenyl group.

The heterocyclic group may have a halogen atom, a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the heterocyclic group include 5- or 6-membered heterocyclic groups having 2 to 12, preferably 2 to 10 carbon atoms in total, such as a 2-tetrahydrofuryl group and a 2-pyrimidyl group.

The acyl group may have an aliphatic carbonyl group, an arylcarbonyl group, a heterocyclic carbonyl group, a hydroxy group, a halogen atom, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the acyl group include acyl groups having 2 to 8, preferably 2 to 4 carbon atoms in total, such as an acetyl group, a propanoyl group, a benzoyl group, and a 3-pyridinecarbonyl group.

The acylamino group may have an aliphatic group, an aromatic group, a heterocyclic group, or the like, and may have, for example, an acetylamino group, a benzoylamino group, a 2-pyridinecarbonylamino group, a propanoylamino group, or the like. Examples of the acylamino group include acylamino groups having 2 to 12, preferably 2 to 8 carbon atoms in total, and alkylcarbonylamino groups having 2 to 8 carbon atoms in total, such as an acetylamino group, a benzoylamino group, a 2-pyridinecarbonylamino group, and a propanoylamino group.

The aliphatic oxycarbonyl group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic oxycarbonyl group include alkoxycarbonyl groups having 2 to 8, preferably 2 to 4 carbon atoms in total, such as a methoxycarbonyl group, an ethoxycarbonyl group, and a (t)-butoxycarbonyl group.

The carbamoyl group may have an aliphatic group, an aromatic group, a heterocyclic group, or the like. Examples of the carbamoyl group include an unsubstituted carbamoyl group and alkylcarbamoyl groups having 2 to 9 carbon atoms in total, preferably an unsubstituted carbamoyl group and alkylcarbamoyl groups having 2 to 5 carbon atoms in total, such as a N-methylcarbamoyl group, a N,N-dimethylcarbamoyl group, and a N-phenylcarbamoyl group.

The aliphatic sulfonyl group may be saturated or unsaturated, and may have a hydroxy group, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic sulfonyl group include alkylsulfonyl groups having 1 to 6 carbon atoms in total, preferably 1 to 4 carbon atoms in total, such as methanesulfonyl.

The aromatic sulfonyl group may have a hydroxy group, an aliphatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic sulfonyl group include arylsulfonyl groups having 6 to 10 carbon atoms in total, such as a benzenesulfonyl group.

The amino group may have an aliphatic group, an aromatic group, a heterocyclic group, or the like.

The acylamino group may have, for example, an acetylamino group, a benzoylamino group, a 2-pyridinecarbonylamino group, a propanoylamino group, or the like. Examples of the acylamino group include acylamino groups having 2 to 12 carbon atoms in total, preferably 2 to 8 carbon atoms in total, and more preferably alkylcarbonylamino groups having 2 to 8 carbon atoms in total, such as an acetylamino group, a benzoylamino group, a 2-pyridinecarbonylamino group, and a propanoylamino group.

The aliphatic sulfonamide group, aromatic sulfonamide group, and heterocyclic sulfonamide group may be, for example, a methanesulfonamide group, a benzenesulfonamide group, a 2-pyridinesulfonamide group, respectively.

The sulfamoyl group may have an aliphatic group, an aromatic group, a heterocyclic group, or the like. Examples of the sulfamoyl group include a sulfamoyl group, alkylsulfamoyl groups having 1 to 9 carbon atoms in total, dialkylsulfamoyl groups having 2 to 10 carbon atoms in total, arylsulfamoyl groups having 7 to 13 carbon atoms in total, and heterocyclic sulfamoyl groups having 2 to 12 carbon atoms in total, more preferably a sulfamoyl group, alkylsulfamoyl groups having 1 to 7 carbon atoms in total, dialkylsulfamoyl groups having 3 to 6 carbon atoms in total, arylsulfamoyl groups having 6 to 11 carbon atoms in total, and heterocyclic sulfamoyl groups having 2 to 10 carbon atoms in total, such as a sulfamoyl group, a methylsulfamoyl group, a N,N-dimethylsulfamoyl group, a phenylsulfamoyl group, and a 4-pyridinesulfamoyl group.

The aliphatic oxy group may be saturated or unsaturated, and may have a methoxy group, an ethoxy group, an i-propyloxy group, a cyclohexyloxy group, a methoxyethoxy group, or the like. Examples of the aliphatic oxy group include alkoxy groups having 1 to 8, preferably 1 to 6 carbon atoms in total, such as a methoxy group, an ethoxy group, an i-propyloxy group, a cyclohexyloxy group, and a methoxyethoxy group.

The aromatic amino group and the heterocyclic amino group each may have an aliphatic group, an aliphatic oxy group, a halogen atom, a carbamoyl group, a heterocyclic group ring-fused with the aryl group, and an aliphatic oxycarbonyl group, preferably an aliphatic group having 1 to 4 carbon atoms in total, an aliphatic oxy group having 1 to 4 carbon atoms in total, a halogen atom, a carbamoyl group having 1 to 4 carbon atoms in total, a nitro group, or an aliphatic oxycarbonyl group having 2 to 4 carbon atoms in total.

The aliphatic thio group may be saturated or unsaturated, and examples thereof include alkylthio groups having 1 to 8 carbon atoms in total, more preferably 1 to 6 carbon atoms in total, such as a methylthio group, an ethylthio group, a carbamoylmethylthio group, and a t-butylthio group.

The carbamoylamino group may have an aliphatic group, an aryl group, a heterocyclic group or the like. Examples of the carbamoylamino group include a carbamoylamino group, alkylcarbamoylamino groups having 2 to 9 carbon atoms in total, dialkylcarbamoylamino groups having 3 to 10 carbon atoms in total, arylcarbamoylamino groups having 7 to 13 carbon atoms in total, and heterocyclic carbamoylamino groups having 3 to 12 carbon atoms in total, preferably a carbamoylamino group, alkylcarbamoylamino groups having 2 to 7 carbon atoms in total, dialkylcarbamoylamino groups having 3 to 6 carbon atoms in total, arylcarbamoylamino groups having 7 to 11 carbon atoms in total, and heterocyclic carbamoylamino group having 3 to 10 carbon atoms in total, such as a carbamoylamino group, a methylcarbamoylamino group, a N,N-dimethylcarbamoylamino group, a phenylcarbamoylamino group, and a 4-pyridinecarbamoylamino group.

The ranges expressed by the endpoints as used herein each include all numerical values within the range (for example, the range of 1 to 10 includes 1.4, 1.9, 2.33, 5.75, 9.98, and the like).

The phrase "at least one" as used herein includes all numerical values equal to or greater than 1 (e.g., at least 2, at least 4, at least 6, at least 8, at least 10, at least 25, at least 50, at least 100, and the like).

Next, the method for producing a fluoropolymer of the present disclosure will be specifically described.

The present disclosure relates to a method for producing a fluoropolymer, comprising polymerizing a fluoromonomer in an aqueous medium in the presence of a polymer (1) to provide a fluoropolymer, the polymer (1) comprising a polymerized unit (1) derived from a monomer represented by the following general formula (1):

$$CX_2{=}CY({-}CZ_2{-}O{-}Rf\text{-}A) \quad (1)$$

wherein X is the same or different and is —H or —F; Y is —H, —F, an alkyl group, or a fluorine-containing alkyl group; Z is the same or different and is —H, —F, an alkyl group, or a fluoroalkyl group; Rf is a fluorine-containing alkylene group having 1 to 40 carbon atoms or a fluorine-containing alkylene group having 2 to 100 carbon atoms and having an ether bond; and A is —COOM, —$SO_3M$, or —$OSO_3M$, wherein M is —H, a metal atom, —$NR^7{}_4$, imidazolium optionally having a substituent, pyridinium optionally having a substituent, or phosphonium optionally having a substituent, wherein $R^7$ is H or an organic group, with the proviso that at least one of X, Y, and Z contains a fluorine atom.

The production method of the present disclosure can stably and efficiently produce a fluoropolymer by using the polymer (1). The method can also provide a high-molecular-weight fluoropolymer with a high yield.

In the general formula (1), X is —H or —F. Each X may be both —F, or at least one thereof may be —H. For example, one thereof may be —F and the other may be —H, or both may be —H.

In the general formula (1), Y is —H, —F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably —H, —F, or —$CF_3$, and more preferably —F.

In the general formula (1), Z is the same or different and is —H, —F, an alkyl group, or a fluoroalkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Z is preferably —H, —F, or —$CF_3$, and more preferably —F.

In the general formula (1), at least one of X, Y, and Z contains a fluorine atom. For example, X, Y, and Z may be —H, —F, and —F, respectively.

In the general formula (1), Rf is a fluorine-containing alkylene group having 1 to 40 carbon atoms or a fluorine-containing alkylene group having 2 to 100 carbon atoms and having an ether bond. The fluorine-containing alkylene group having 2 to 100 carbon atoms and having an ether bond is an alkylene group which does not include a structure in which an oxygen atom is an end and contains an ether bond between carbon atoms.

The fluorine-containing alkylene group preferably has 2 or more carbon atoms. The fluorine-containing alkylene group also preferably has 30 or less carbon atoms, more preferably 20 or less carbon atoms, and still more preferably 10 or less carbon atoms. Examples of the fluorine-containing alkylene group include —$CF_2$—, —$CH_2CF_2$—, —$CF_2CF_2$—, —$CF_2CH_2$—, —$CF_2CF_2CH_2$—, —$CF(CF_3)$—, —$CF(CF_3)CF_2$—, and —$CF(CF_3)CH_2$—. The fluorine-containing alkylene group is preferably a perfluoroalkylene group.

The fluorine-containing alkylene group having an ether bond preferably has 3 or more carbon atoms. The fluorine-containing alkylene group having an ether bond also preferably has 60 or less carbon atoms, more preferably 30 or less carbon atoms, and still more preferably 12 or less carbon atoms.

For example, the fluorine-containing alkylene group having an ether bond is preferably a divalent group represented by the following formula:

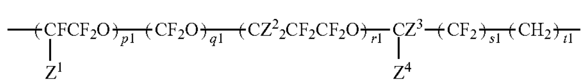

wherein $Z^1$ is F or $CF_3$; $Z^2$ and $Z^3$ are each H or F; $Z^4$ is H, F, or $CF_3$; p1+q1+r1 is an integer of 0 to 10; s1 is 0 or 1; and t1 is an integer of 0 to 5, with the proviso that when $Z^3$ and $Z^4$ are both H, p1+q1+r1+s1 is not 0.

Specific examples of the fluorine-containing alkylene group having an ether bond include —$CF(CF_3)CF_2$—O—$CF(CF_3)$—, —$(CF(CF_3)CF_2—O)_n$—$CF(CF_3)$— (where n is an integer of 1 to 10), —$CF(CF_3)CF_2$—O—$CF(CF_3)CH_2$—, —$(CF(CF_3)CF_2—O)_n$—$CF(CF_3)CH_2$— (where n is an integer of 1 to 10), —$CH_2CF_2CF_2O$—$CH_2CF_2CH_2$—, —$CF_2CF_2CF_2O$—$CF_2CF_2$—, —$CF_2CF_2CF_2O$—$CF_2CF_2CH_2$—, —$CF_2CF_2O$—$CF_2$—, —$CF_2CF_2O$—$CF_2CH_2$—, and —$CF(CF_3)CH_2$—.

The fluorine-containing alkylene group having an ether bond is preferably a perfluoroalkylene group.

In the general formula (1), A is —COOM, —$SO_3M$, or —$OSO_3M$, wherein M is —H, a metal atom, —$NR^7_4$, imidazolium optionally having a substituent, pyridinium optionally having a substituent, or phosphonium optionally having a substituent, wherein $R^7$ is H or an organic group.

$R^7$ is preferably H or a $C_{1-10}$ organic group, more preferably H or a $C_{1-4}$ organic group, and still more preferably H or a $C_{1-4}$ alkyl group.

Examples of the metal atom include alkali metals (Group 1) and alkaline earth metals (Group 2), and preferred is Na, K, or Li.

M is preferably —H, a metal atom, or —$NR^7_4$, more preferably —H, an alkali metal (Group 1), an alkaline earth metal (Group 2), or —$NR^7_4$, still more preferably —H, —Na, —K, —Li, or —$NH_4$, further preferably —Na, —K, or —$NH_4$, particularly preferably —Na or —$NH_4$, and most preferably —$NH_4$.

A is preferably —COOM or —$SO_3M$, and more preferably —COOM.

Examples of a suitable monomer represented by the general formula (1) include a polymerized unit derived from a fluoroallyl ether compound represented by the following formula (1a):

$$CX_2{=}CFCF_2—O—(CF(CF_3)CF_2O)_{n5}—CF(CF_3)\text{-}A \quad (1a)$$

wherein each X is the same and represents F or H; n5 represents 0 or an integer of 1 to 10; and A is as defined above.

In the formula (1a), n5 is preferably 0 or an integer of 1 to 5, more preferably 0, 1, or 2, and still more preferably 0 or 1 from the viewpoint of obtaining PTFE particles having a small primary particle size. A is preferably —COOM from the viewpoint of obtaining appropriate water-solubility and surface activity, and M is preferably H or $NH_4$ from the viewpoint of being less likely to remain as impurities and improving the heat resistance of the resulting molded body.

The polymer (1) may be a homopolymer of the fluoroallyl ether compound represented by the general formula (1a) or a copolymer thereof with another monomer.

The polymerized unit (1) is preferably a polymerized unit (1A) derived from a monomer represented by the following general formula (1A):

$$CH_2{=}CF(—CF_2—O—Rf\text{-}A) \quad (1A)$$

wherein Rf and A are as described above.

The polymer (1) may be a homopolymer of the monomer represented by the general formula (1A) or a copolymer thereof with another monomer.

Specific examples of the monomer represented by the formula (1A) include a monomer represented by the following formula:

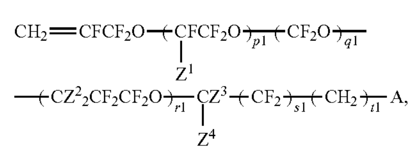

wherein $Z^1$ is F or $CF_3$; $Z^2$ and $Z^3$ are each H or F; $Z^4$ is H, F, or $CF_3$; p1+q1+r1 is an integer of 0 to 10; s1 is 0 or 1; and t1 is an integer of 0 to 5, with the proviso that when $Z^3$ and $Z^4$ are both H, p1+q1+r1+s1 is not 0. More specific preferred examples thereof include:

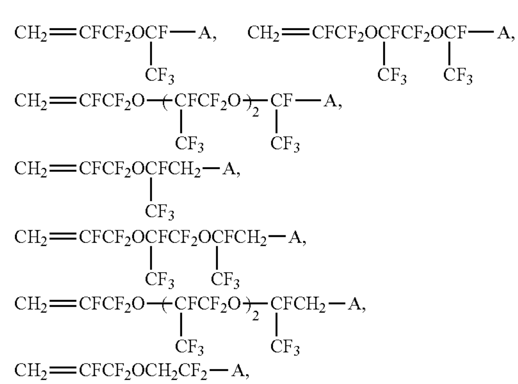

-continued $CH_2{=}CFCF_2O(CH_2CF_2CF_2O)CH_2CF_2{-}A$, $CH_2{=}CFCF_2OCH_2CF_2CH_2{-}A$, $CH_2{=}CFCF_2O(CH_2CF_2CF_2O)CH_2CF_2CH_2{-}A$, $CH_2{=}CFCF_2OCF_2CF_2{-}A$, $CH_2{=}CFCF_2O(CF_2CF_2CF_2O)CF_2CF_2{-}A$, $CH_2{=}CFCF_2OCF_2CF_2CH_2{-}A$, $CH_2{=}CFCF_2O(CF_2CF_2CF_2O)CF_2CF_2CH_2{-}A$, $CH_2{=}CFCF_2OCF_2{-}A$, $CH_2{=}CFCF_2O(CF_2CF_2O)CF_2{-}A$, $CH_2{=}CFCF_2OCF_2CH_2{-}A$, $CH_2{=}CFCF_2O(CF_2CF_2O)CF_2CH_2{-}A$, Of these, preferred are:

$CH_2{=}CFCF_2OCF(CF_3){-}A$, $CH_2{=}CFCF_2OCF(CF_3)CF_2OCF(CF_3){-}A$, $CH_2{=}CFCF_2O{-}(CF(CF_3)CF_2O)_2{-}CF(CF_3){-}A$, $CH_2{=}CFCF_2OCF(CF_3)CH_2{-}A$, $CH_2{=}CFCF_2OCF(CF_3)CF_2OCF(CF_3)CH_2{-}A$, $CH_2{=}CFCF_2O{-}(CF(CF_3)CF_2O)_2{-}CF(CF_3)CH_2{-}A$,

In the monomer represented by the general formula (1A), A in the formula (1A) is preferably —COOM. Specifically, the monomer represented by the general formula (1A) is preferably at least one selected from the group consisting of $CH_2{=}CFCF_2OCF(CF_3)COOM$ and $CH_2{=}CFCF_2OCF(CF_3)CF_2OCF(CF_3)COOM$ (wherein M is as defined above), and more preferably $CH_2{=}CFCF_2OCF(CF_3)COOM$.

Examples of the monomer represented by the general formula (1) further include a monomer represented by the following formula:

$CF_2{=}CFCF_2{-}O{-}Rf{-}A$ wherein Rf and A are as described above.

More specific examples thereof include:

$CF_2{=}CFCF_2OCF_2CF_2CF_2{-}A$, $CF_2{=}CFCF_2OCF_2CF(CF_3){-}A$, $CF_2{=}CFCF_2OCF_2CF_2CF_2CH_2{-}A$, $CF_2{=}CFCF_2OCF_2CF(CH_3)CH_2{-}A$.

The polymer (1) may be a homopolymer containing only the polymerized unit (1), or may be a copolymer of the polymerized unit (1) and a polymerized unit derived from another monomer copolymerizable with the monomer represented by the general formula (1). From the viewpoint of solubility in the polymerization medium, preferred is a homopolymer containing only the polymerized unit (1).

The other monomer is preferably a fluorine-containing ethylenic monomer having 2 or 3 carbon atoms, and examples thereof include $CF_2{=}CF_2$, $CF_2{=}CFCl$, $CH_2{=}CF_2$, $CFH{=}CH_2$, $CFH{=}CF_2$, $CF_2{=}CFCF_3$, $CH_2{=}CFCF_3$, and $CH_2{=}CHCF_3$.

Of these, preferred is at least one selected from the group consisting of tetrafluoroethylene ($CF_2{=}CF_2$), chlorotrifluoroethylene ($CF_2{=}CFCl$), and vinylidene fluoride ($CH_2{=}CF_2$) from the viewpoint of achieving good copolymerizability.

Examples of the other monomer further include a monomer represented by the following formula (n1-2):

$$CX^1X^2{=}CX^3{-}(CX^4X^5)_a{-}(O)_c{-}Rf^3 \qquad \text{(n1-2)}$$

wherein $X^1$ and $X^2$ are the same or different and are each H or F; $X^3$ is H, F, Cl, $CH_3$, or $CF_3$; $X^4$ and $X^5$ are the same or different and are each H or F; and a and c are the same or different and are each 0 or 1; $Rf^3$ is a fluorine-containing alkyl group having 1 to 40 carbon atoms or a fluorine-containing alkyl group having 2 to 100 carbon atoms and having an ether bond.

Specifically, preferred examples thereof include $CH_2{=}CFCF_2{-}O{-}Rf^3$, $CF_2{=}CF{-}O{-}Rf^3$, $CF_2{=}CFCF_2{-}O{-}Rf^3$, $CF_2{=}CF{-}Rf^3$, $CH_2{=}CH{-}Rf^3$, and $CH_2{=}CH{-}O{-}Rf^3$ (wherein $Rf^3$ is as described in the above formula (n1-2)).

Another example of the other monomer is a fluorine-containing acrylate monomer represented by the formula (n2-1):

$$CH_2{=}CX^3{-}COO{-}Rf^4 \qquad \text{(n2-1)}$$

wherein $X^9$ is H, F, or $CH_3$; and $Rf^4$ is a fluorine-containing alkyl group having 1 to 40 carbon atoms or a fluorine-containing alkyl group having 2 to 100 carbon atoms and having an ether bond. Examples of the group $Rf^4$ include:

$$-(CH_2)_{e1}-(CF_2)_{e1}-Z^8$$

wherein $Z^8$ is H, F or Cl; d1 is an integer of 1 to 4; and e1 is an integer of 1 to 10, $-CH(CF_3)_2$, $-CH_2C(CF_3)(CH_3){-}CF_3$, $-CH_2CF(CF_3){-}(OCF_2CF(CF_3))_{e2}{-}F$ wherein e2 is an integer of 1 to 5, $$-(CH_2)_{d3}-(CF_2)_{e3}-CF(CF_3)-CF_3$$

wherein d3 is an integer of 1 to 4; and e3 is an integer of 1 to 10.

Another example of the other monomer is a fluorine-containing vinyl ether represented by the formula (n2-2):

$$CH_2{=}CHO{-}Rf^5 \quad (n2\text{-}2)$$

wherein $Rf^5$ is a fluorine-containing alkyl group having 1 to 40 carbon atoms or a fluorine-containing alkyl group having 2 to 100 carbon atoms and having an ether bond.

Specific preferred examples of the monomer of the formula (n2-2) include:

$$CH_2{=}CHOCH_2-(CF_2)_{e4}-Z^9$$

wherein $Z^9$ is H or F; and e4 is an integer of 1 to 10, $$CH_2{=}CHOCH_2CH_2-(CF_2)_{e5}-F$$

wherein e5 is an integer of 1 to 10, $$CH_2{=}CHOCH_2CF(CF_3)-(OCF_2CF(CF_3))_{e5}-F$$

wherein e6 is an integer of 1 to 10.

More specific examples thereof include:

$CH_2{=}CHOCH_2CF_2CF_2H$, $CH_2{=}CHOCH_2-(CF_2CF_2)_2-H$, $CH_2{=}CHOCH_2-(CF_2CF_2)_3-H$, $CH_2{=}CHOCH_2CF_2CF_3$, $CH_2{=}CHOCH_2CF_3$, $CH_2{=}CHOCH_2CH_2-(CF_2CF_2)_4-F$, $CH_2{=}CHOCH_2CF(CF_3)OCF_2CF_2CF_3$, $CH_2{=}CHOCH_2CF(CF_3)OCF_2CF(CF_3)OCF_2CF_2CF_3$

Additional examples of the other monomer include a fluorine-containing allyl ether represented by the formula (n2-3):

$$CH_2{=}CHCH_2O{-}Rf^6 \quad (n2\text{-}3)$$

wherein $Rf^6$ is a fluorine-containing alkyl group having 1 to 40 carbon atoms or a fluorine-containing alkyl group having 2 to 100 carbon atoms and having an ether bond, and a fluorine-containing vinyl monomer represented by the formula (n2-4):

$$CH_2{=}CH{-}Rf^7 \quad (n2\text{-}4)$$

wherein $Rf^7$ is a fluorine-containing alkyl group having 1 to 40 carbon atoms or a fluorine-containing alkyl group having 2 to 100 carbon atoms and having an ether bond.

Specific examples of the monomers represented by the formulas (n2-3) and (n2-4) include:

$CH_2{=}CHCH_2OCH_2CF_2CF_2H$, $CH_2{=}CHCH_2OCH_2-(CF_2CF_2)_2-H$, $CH_2{=}CHCH_2OCH_2-(CF_2CF_2)_3-H$, $CH_2{=}CHCH_2OCH_2CF_2CF_3$, $CH_2{=}CHCH_2OCH_2CF_3$, $CH_2{=}CHCH_2OCH_2CH_2-(CF_2CF_2)_4-F$, $CH_2{=}CHCH_2OCH_2CF(CF_3)OCF_2CF_2CF_3$, $CH_2{=}CHCH_2OCH_2CF(CF_3)OCF_2CF(CF_3)OCF_2CF_2CF_3$, $CH_2{=}CH-(CF_2CF_2)_2-F$, $CH_2{=}CH-(CF_2CF_2)_4-F$,

The content of the polymerized unit (1) in the polymer (1) is preferably 1.0 mol % or more, more preferably 3.0 mol % or more, still more preferably 5.0 mol % or more, further preferably 10 mol % or more, still further preferably 20 mol % or more, and particularly preferably 30 mol % or more, based on all polymerized units. The content thereof is more preferably 40 mol % or more, still more preferably 60 mol % or more, further preferably 80 mol % or more, particularly preferably 90 mol % or more, and still further preferably substantially 100 mol %.

In the polymer (1), the content of the polymerized unit derived from another monomer copolymerizable with the monomer represented by the general formula (1) is preferably 70 mol % or less, more preferably 60 mol % or less, still more preferably 40 mol % or less, further preferably 20 mol % or less, particularly preferably 10 mol % or less, and still further preferably substantially 0 mol %, based on all polymerized units.

The number average molecular weight of the polymer (1) is preferably $0.1\times10^4$ or more, more preferably $0.2\times10^4$ or more, still more preferably $0.3\times10^4$ or more, further preferably $0.4\times10^4$ or more, still further preferably $0.5\times10^4$ or more, particularly preferably $1.0\times10^4$ or more, and most preferably $3.0\times10^4$ or more. The number average molecular weight thereof is also preferably $75.0\times10^4$ or less, more preferably $50.0\times10^4$ or less, still more preferably $30.0\times10^4$ or less, and particularly preferably $20.0\times10^4$ or less. When the number average molecular weight is too low, the stability of the aqueous solution may be insufficient. When the number average molecular weight is too high, the polymer (1) may be partially settled, precipitated, or clouded by the storage or addition of other additives.

The number average molecular weight and the weight average molecular weight described later are values calculated by gel permeation chromatography (GPC) using monodisperse polystyrene as a standard.

The weight average molecular weight of the polymer (1) is preferably $0.2\times10^4$ or more, more preferably $0.4\times10^4$ or more, still more preferably $0.6\times10^4$ or more, particularly preferably $0.8\times10^4$ or more, and still further preferably $1.0\times10^4$ or more. The weight average molecular weight thereof is also preferably $150.0\times10^4$ or less, more preferably $100.0\times10^4$ or less, still more preferably $60.0\times10^4$ or less, and particularly preferably $40.0\times10^4$ or less.

The polymer (1) may be produced by a conventionally known method, provided that any of the above monomers are used.

The method for producing a fluoropolymer of the present disclosure comprises polymerizing a fluoromonomer in an aqueous medium in the presence of a polymer (1) to provide a fluoropolymer, the polymer (1) comprising a polymerized unit (1) derived from a monomer represented by the general formula (1).

The fluoromonomer preferably has at least one double bond.

The fluoromonomer is preferably at least one selected from the group consisting of tetrafluoroethylene (TFE), hexafluoropropylene (HFP), chlorotrifluoroethylene (CTFE), vinyl fluoride, vinylidene fluoride (VDF), trifluoroethylene, fluoroalkyl vinyl ether, fluoroalkyl ethylene, trifluoropropylene, pentafluoropropylene, trifluorobutene, tetrafluoroisobutene, hexafluoroisobutene, a fluoromonomer represented by the general formula (100): $CH_2{=}CFRf^{101}$ (wherein $Rf^{101}$ is a linear or branched fluoroalkyl group having 1 to 12 carbon atoms), a fluorinated vinyl heterocyclic compound, and a monomer that provides a crosslinking site.

The fluoroalkyl vinyl ether is preferably, for example, at least one selected from the group consisting of:

a fluoromonomer represented by the general formula (110):

$$CF_2{=}CF{-}ORf^{111}$$

wherein $Rf^{111}$ represents a perfluoroorganic group;

a fluoromonomer represented by the general formula (120):

$$CF_2{=}CF{-}OCH_2{-}Rf^{121}$$

wherein $Rf^{121}$ represents a perfluoroalkyl group having 1 to 5 carbon atoms;

a fluoromonomer represented by the general formula (130):

$$CF_2{=}CFOCF_2ORf^{131}$$

wherein $Rf^{131}$ is a linear or branched perfluoroalkyl group having 1 to 6 carbon atoms, a cyclic perfluoroalkyl group having 5 to 6 carbon atoms, or a linear or branched perfluorooxyalkyl group having 2 to 6 carbon atoms and containing 1 to 3 oxygen atoms;

a fluoromonomer represented by the general formula (140):

$$CF_2{=}CFO(CF_2CF(Y^{141})O)_m(CF_2)_nF$$

wherein $Y^{141}$ represents a fluorine atom or a trifluoromethyl group; m is an integer of 1 to 4; and n is an integer of 1 to 4; and a fluoromonomer represented by the general formula (150):

$$CF_2{=}CF{-}O{-}(CF_2CFY^{151}{-}O)_n{-}(CFY^{152})_m{-}A^{151}$$

wherein $Y^{151}$ represents a fluorine atom, a chlorine atom, a $-SO_2F$ group, or a perfluoroalkyl group; the perfluoroalkyl group optionally contains ether oxygen and a $-SO_2F$ group; n represents an integer of 0 to 3; n $Y^{151}$s are the same as or different from each other; $Y^{152}$ represents a fluorine atom, a chlorine atom, or a $-SO_2F$ group; m represents an integer of 1 to 5; m $Y^{152}$s are the same as or different from each other; $A^{151}$ represents $-SO_2X^{151}$, $-COZ^{151}$, or $-POZ^{152}Z^{153}$; $X^{151}$ represents F, Cl, Br, I, $-OR^{151}$, or $-NR^{152}R^{153}$; $Z^{151}$, $Z^{152}$, and $Z^{153}$ are the same as or different from each other, and each represent $-NR^{154}R^{155}$ or $-OR^{156}$; $R^{151}$, $R^{152}$, $R^{153}$, $R^{154}$, $R^{155}$, and $R^{156}$ are the same as or different from each other, and each represent H, ammonium, an alkali metal, or an alkyl group, aryl group, or sulfonyl-containing group optionally containing a fluorine atom.

The "perfluoroorganic group" as used herein means an organic group in which all hydrogen atoms bonded to the carbon atoms are replaced by fluorine atoms. The perfluoroorganic group optionally has ether oxygen.

An example of the fluoromonomer represented by the general formula (110) is a fluoromonomer in which $Rf^{111}$ is a perfluoroalkyl group having 1 to 10 carbon atoms. The perfluoroalkyl group preferably has 1 to 5 carbon atoms.

Examples of the perfluoroorganic group in the general formula (110) include a perfluoromethyl group, a perfluoroethyl group, a perfluoropropyl group, a perfluorobutyl group, a perfluoropentyl group, and a perfluorohexyl group.

Examples of the fluoromonomer represented by the general formula (110) also include those represented by the general formula (110) in which $Rf^{111}$ is a perfluoro(alkoxyalkyl) group having 4 to 9 carbon atoms; those in which $Rf^{111}$ is a group represented by the following formula:

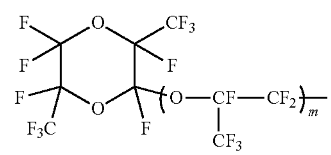

wherein m represents 0 or an integer of 1 to 4; and those in which $Rf^{111}$ is a group represented by the following formula:

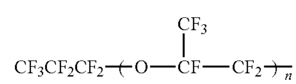

wherein n represents an integer of 1 to 4.

Of these, the fluoromonomer represented by the general formula (110) is preferably a fluoromonomer represented by the general formula (160):

$$CF_2{=}CF{-}ORf^{161}$$

wherein $Rf^{161}$ represents a perfluoroalkyl group having 1 to 10 carbon atoms. $Rf^{161}$ is preferably a perfluoroalkyl group having 1 to 5 carbon atoms.

The fluoroalkyl vinyl ether is preferably at least one selected from the group consisting of fluoromonomers represented by the general formulas (160), (130), and (140).

The fluoromonomer represented by the general formula (160) is preferably at least one selected from the group consisting of perfluoro(methyl vinyl ether), perfluoro(ethyl vinyl ether), and perfluoro(propyl vinyl ether), and is more preferably at least one selected from the group consisting of perfluoro(methyl vinyl ether) and perfluoro(propyl vinyl ether).

The fluoromonomer represented by the general formula (130) is preferably at least one selected from the group consisting of $CF_2{=}CFOCF_2OCF_3$, $CF_2{=}CFOCF_2OCF_2CF_3$, and $CF_2{=}CFOCF_2OCF_2CF_2OCF_3$.

The fluoromonomer represented by the general formula (140) is preferably at least one selected from the group consisting of $CF_2{=}CFOCF_2CF(CF_3)O(CF_2)_3F$, $CF_2{=}CFO(CF_2CF(CF_3)O)_2(CF_2)_3F$, and $CF_2{=}CFO(CF_2CF(CF_3)O)_2(CF_2)_2F$.

The fluoromonomer represented by the general formula (150) is preferably at least one selected from the group consisting of $CF_2{=}CFOCF_2CF_2SO_2F$, $CF_2{=}CFOCF_2CF(CF_3)OCF_2CF_2SO_2F$, $CF_2{=}CFOCF_2CF(CF_2CF_2SO_2F)OCF_2CF_2SO_2F$, and $CF_2{=}CFOCF_2CF(SO_2F)_2$.

The fluoromonomer represented by the general formula (100) is preferably a fluoromonomer in which $Rf^{101}$ is a linear fluoroalkyl group, and more preferably a fluoromonomer in which $Rf^{101}$ is a linear perfluoroalkyl group. $Rf^{101}$ preferably has 1 to 6 carbon atoms. Examples of the fluoromonomer represented by the general formula (100) include $CH_2{=}CFCF_3$, $CH_2{=}CFCF_2CF_3$, $CH_2{=}CFCF_2CF_2CF_3$, $CH_2{=}CFCF_2CF_2CF_2H$, and $CH_2{=}CFCF_2CF_2CF_2CF_3$, of which preferred is 2,3,3,3-tetrafluoropropylene represented by $CH_2{=}CFCF_3$.

The fluoroalkyl ethylene is preferably a fluoroalkyl ethylene represented by the general formula (170):

$$CH_2{=}CH{-}(CF_2)_n{-}X^{171}$$

(wherein $X^{171}$ is H or F; and n is an integer of 3 to 10), and more preferably at least one selected from the group consisting of $CH_2{=}CH{-}C_4F_9$ and $CH_2{=}CH{-}C_6F_{13}$.

The monomer that provides a crosslinking site is preferably at least one selected from the group consisting of:

a fluoromonomer represented by the general formula (180):

$$CX^{181}_2{=}CX^{182}{-}R_f^{181}CHR^{181}X^{183}$$

wherein $X^{181}$ and $X^{182}$ are each independently a hydrogen atom, a fluorine atom, or $CH_3$; $Rf^{181}$ is a fluoroalkylene group, a perfluoroalkylene group, a fluoro(poly)oxyalkylene group, or a perfluoro(poly)oxyalkylene group; $R^{181}$ is a hydrogen atom or $CH_3$; and $X^{183}$ is an iodine atom or a bromine atom;

a fluoromonomer represented by the general formula (190):

$$CX^{191}_2{=}CX^{192}{-}Rf^{191}X^{193}$$

wherein $X^{191}$ and $X^{192}$ are each independently a hydrogen atom, a fluorine atom, or $CH_3$; $Rf^{191}$ is a fluoroalkylene group, a perfluoroalkylene group, a fluoropolyoxyalkylene group, or a perfluoropolyoxyalkylene group; and $X^{193}$ is an iodine atom or a bromine atom;

a fluoromonomer represented by the general formula (200):

$$CF_2{=}CFO(CF_2CF(CF_3)O)_m(CF_2)_n{-}X^{201}$$

wherein m is an integer of 0 to 5; n is an integer of 1 to 3; and $X^{201}$ is a cyano group, a carboxyl group, an alkoxycarbonyl group, an iodine atom, a bromine atom, or $-CH_2I$; and a fluoromonomer represented by the general formula (210):

$$CH_2{=}CFCF_2O(CF(CF_3)CF_2O)_m(CF(CF_3))_n{-}X^{211}$$

wherein m is an integer of 0 to 5; n is an integer of 1 to 3; and $X^{211}$ is a cyano group, a carboxyl group, an alkoxycarbonyl group, an iodine atom, a bromine atom, or $-CH_2OH$; and a monomer represented by the general formula (220):

$$CR^{221}R^{222}{=}CR^{223}{-}Z^{221}{-}CR^{224}{=}CR^{225}R^{226}$$

wherein $R^{221}$, $R^{222}$, $R^{223}$, $R^{224}$, $R^{225}$, and $R^{226}$ are the same as or different from each other, and are each a hydrogen atom or an alkyl group having 1 to 5 carbon atoms; $Z^{221}$ is a linear or branched alkylene group having 1 to 18 carbon atoms and optionally having an oxygen atom, a cycloalkylene group having 3 to 18 carbon atoms, an at least partially fluorinated alkylene or oxyalkylene group having 1 to 10 carbon atoms, or a (per)fluoropolyoxyalkylene group which is represented by:

$$(Q)_p\text{-}CF_2O{-}(CF_2CF_2O)_m(CF_2O)_n{-}CF_2\text{-}(Q)_p\text{-}$$

(wherein Q is an alkylene group or an oxyalkylene group; p is 0 or 1; and m/n is 0.2 to 5) and has a molecular weight of 500 to 10,000.

$X^{183}$ and $X^{193}$ are each preferably an iodine atom. $R_f^{181}$ and $R_f^{191}$ are each preferably a perfluoroalkylene group having 1 to 5 carbon atoms. $R^{181}$ is preferably a hydrogen atom. $X^{201}$ is preferably a cyano group, an alkoxycarbonyl group, an iodine atom, a bromine atom, or $-CH_2I$. $X^{211}$ is preferably a cyano group, an alkoxycarbonyl group, an iodine atom, a bromine atom, or $-CH_2OH$.

An example of the fluorinated vinyl heterocyclic compound is a fluorinated vinyl heterocyclic compound represented by the general formula (230):

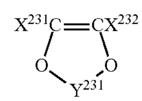

wherein $X^{231}$ and $X^{232}$ are each independently F, Cl, a methoxy group, or a fluorinated methoxy group; and $Y^{231}$ is represented by the formula $Y^{232}$ or $Y^{233}$:

$$-FC{=}CF- \quad (Y^{232})$$

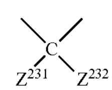

$(Y^{233})$ wherein $Z^{231}$ and $Z^{232}$ are each independently F or a fluorinated alkyl group having 1 to 3 carbon atoms.

The monomer that provides a crosslinking site is preferably at least one selected from the group consisting of $CF_2{=}CFOCF_2CF(CF_3)OCF_2CF_2CN$, $CF_2{=}CFOCF_2CF(CF_3)OCF_2CF_2COOH$, $CF_2{=}CFOCF_2CF(CF_3)OCF_2CF_2CH_2I$, $CF_2{=}CFOCF_2CF_2CH_2I$, $CH_2{=}CFCF_2OCF(CF_3)CF_2OCF(CF_3)CN$, $CH_2{=}CFCF_2OCF(CF_3)CF_2OCF(CF_3)COOH$, $CH_2{=}CFCF_2OCF(CF_3)CF_2OCF(CF_3)CH_2OH$, $CH_2{=}CHCF_2CF_2I$, $CH_2{=}CH(CF_2)_2CH{=}CH_2$, $CH_2{=}CH(CF_2)_6CH{=}CH_2$, and $CF_2{=}CFO(CF_2)_5CN$, and is more preferably at least one selected from the group consisting of $CF_2{=}CFOCF_2CF(CF_3)OCF_2CF_2CN$ and $CF_2{=}CFOCF_2CF_2CH_2I$.

In the above step, the fluoromonomer may be polymerized with a fluorine-free monomer. An example of the fluorine-free monomer is a hydrocarbon monomer reactive with the fluoromonomer. Examples of the hydrocarbon monomer include alkenes such as ethylene, propylene, butylene, and isobutylene; alkyl vinyl ethers such as ethyl vinyl ether, propyl vinyl ether, butyl vinyl ether, isobutyl vinyl ether, and cyclohexyl vinyl ether; vinyl esters such as vinyl acetate, vinyl propionate, vinyl n-butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl para-t-butylbenzoate, vinyl cyclohexanecarboxylate, monochlorovinyl acetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropionate, vinyl hydroxybutyrate, vinyl hydroxyvalerate, vinyl hydroxyisobutyrate, and vinyl hydroxycyclohexanecarboxylate; alkyl allyl ethers such as ethyl allyl ether, propyl allyl ether, butyl allyl ether, isobutyl allyl ether, and cyclohexyl allyl ether; and alkyl allyl esters such as ethyl allyl ester, propyl allyl ester, butyl allyl ester, isobutyl allyl ester, and cyclohexyl allyl ester.

The fluorine-free monomer may also be a functional group-containing hydrocarbon monomer (other than monomers that provide a crosslinking site). Examples of the functional group-containing hydrocarbon monomer include hydroxy alkyl vinyl ethers such as hydroxyethyl vinyl ether, hydroxypropyl vinyl ether, hydroxybutyl vinyl ether, hydroxyisobutyl vinyl ether, and hydroxycyclohexyl vinyl ether; fluorine-free monomers having carboxyl groups such as itaconic acid, succinic acid, succinic anhydride, fumaric acid, fumaric anhydride, crotonic acid, maleic acid, maleic anhydride, and perfluorobutenoic acid; fluorine-free monomers having a glycidyl group such as glycidyl vinyl ether and glycidyl allyl ether; fluorine-free monomers having an amino group such as aminoalkyl vinyl ether and aminoalkyl allyl ether; and fluorine-free monomers having an amide group such as (meth)acrylamide and methylol acrylamide.

In the above step, desired fluoropolymer particles can be obtained by polymerizing one or two or more of the above fluoromonomers.

In the production method of the present disclosure, the presence of at least one of the polymers (1) can efficiently provide a fluoropolymer. In the production method of the present disclosure, two or more of the polymers (1) may be used at the same time, and other compounds having a surfactant function may also be used in combination insofar as the compound is volatile or is allowed to remain in a molded body formed from the fluoropolymer or the like.

In the production method of the present disclosure, the polymerization may also be performed in the presence of a nonionic surfactant. The nonionic surfactant is preferably at least one selected from the group consisting of:

a compound represented by the general formula (240):

$$Rf^{241}—(X^{241})_n—Y^{241}$$

wherein $Rf^{241}$ is a partially fluorinated alkyl group or a fully fluorinated alkyl group having 1 to 12 carbon atoms; n is 0 or 1; $X^{241}$ is —O—, —COO—, or —OCO—; $Y^{241}$ is $—(CH_2)$ pH, $—(CH_2)$ pOH, or $—(OR^{241})_q(OR^{242})_rOH$; p is an integer of 1 to 12; q is an integer of 1 to 12; r is an integer of 0 to 12; and $R^{241}$ and $R^{242}$ are each an alkylene group having 2 to 4 carbon atoms, with the proviso that $R^{241}$ and $R^{242}$ are different from each other;

a block polymer represented by the general formula (250):

$$H(OR^{251})_u(OR^{252})_vOH$$

wherein $R^{251}$ and $R^{252}$ are each an alkylene group having 1 to 4 carbon atoms; u and v are each an integer of 1 to 5, with the proviso that $R^{251}$ and $R^{252}$ are different from each other;

a nonionic polymer having a hydrophobic group containing a hydrocarbon group having 8 to 20 carbon atoms and a hydrophilic group containing a polyalkylene oxide in the molecule; and a silicon compound represented by the general formula (260):

$$R^{261}{}_mSi—(OR^{262})_{4-m}$$

wherein $R^{26}$ is an alkyl group having 1 to 12 carbon atoms; $R^{262}$ is an alkyl group having 1 to 4 carbon atoms; and m is an integer of 1 to 3.

Specific examples of the block polymer represented by the general formula (250) include block polymers composed of at least two segments selected from the group consisting of polyoxyethylene, polyoxypropylene, and polyoxybutylene. Examples thereof include polyoxyethylene-polyoxypropylene block polymers and polyoxyethylene-polyoxybutylene block polymers, and not only A-B block polymers but also A-B-A block polymers are preferred. More preferably, use of a polyoxyethylene-polyoxypropylene block polymer or a polyoxypropylene-polyoxyethylene-polyoxypropylene block polymer allows to prepare a stable fluoropolymer dispersion at a high concentration. In addition, the content of the polyoxyethylene segment is preferably 10 to 50% in view of reducing generation of agglomerates considered to be caused by re-agglomeration, and more preferably 20 to 40% because it allows for the preparation of low viscosity fluoropolymer dispersions. The polyoxyethylene segment may have a molecular weight of, but not limited to, 1,000 to 7,000 g/mol, and in particular, the use of a polyoxyethylene segment having a molecular weight of 2,500 to 6,500 g/mol allows to prepare a dispersion having a low viscosity and excellent dispersibility.

In the production method of the present disclosure, a nucleating agent may be used. The nucleating agent is preferably used in an amount appropriately selected in accordance with the type of the nucleating agent. For example, the amount thereof is 1,000 ppm or less, more preferably 500 ppm or less, still more preferably 100 ppm or less, particularly preferably 50 ppm or less, and still further preferably 10 ppm or less, based on the aqueous medium.

The production method of the present disclosure preferably further includes adding a nucleating agent to the aqueous medium before the initiation of polymerization or when the concentration of polytetrafluoroethylene particles formed in the aqueous medium is 5.0% by mass or less. Adding the nucleating agent at the initial stage of the polymerization allows for obtaining an aqueous dispersion having a small average primary particle size and excellent stability.

The amount of the nucleating agent added before the initiation of polymerization or when the concentration of the PTFE particles formed in the aqueous medium is 5.0% by mass or less is preferably 0.001% by mass or more, more preferably 0.01% by mass or more, still more preferably 0.05% by mass or more, and further preferably 0.1% by mass or more, based on the resulting polytetrafluoroethylene. The upper limit thereof may be, but is not limited to, 2,000% by mass.

The use of the above nucleating agent allows for obtaining a fluoropolymer having a smaller primary particle size than that in the case of polymerization in the absence of the above nucleating agent.

Examples of the nucleating agent include dicarboxylic acids, perfluoropolyether (PFPE) acids or salts thereof, and hydrocarbon-containing surfactants. The nucleating agent is preferably free from an aromatic ring, and is preferably an aliphatic compound.

Although the nucleating agent is preferably added before addition of the polymerization initiator or simultaneously with addition of the polymerization initiator, it is also possible to adjust the particle size distribution by adding the nucleating agent during the polymerization.

The amount of the dicarboxylic acid is preferably 1,000 ppm or less, more preferably 500 ppm or less, and still more preferably 100 ppm or less, based on the aqueous medium.

The perfluoropolyether (PFPE) acids or salts thereof may have any chain structure in which the oxygen atoms in the main chain of the molecule are separated by saturated carbon fluoride groups having 1 to 3 carbon atoms. Two or more carbon fluoride groups may be present in the molecule. Representative structures thereof have the repeating units represented by the following formulas:

$$(\text{—CFCF}_3\text{—CF}_2\text{—O—})_n \quad \text{(VII)}$$

$$(\text{—CF}_2\text{—CF}_2\text{—CF}_2\text{—O—})_n \quad \text{(VIII)}$$

$$(\text{—CF}_2\text{—CF}_2\text{—O—})_n\text{—(—CF}_2\text{—O—})_m \quad \text{(IX)}$$

$$(\text{—CF}_2\text{—CFCF}_3\text{—O—})_n\text{—(—CF}_2\text{—O—})_m \quad \text{(X)}$$

These structures are described in Kasai, J. Appl. Polymer Sci., 57, 797(1995). As disclosed in this document, the PFPE acid or a salt thereof may have a carboxylic acid group or a salt thereof at one end or both ends. The PFPE acid or a salt thereof may also have a sulfonic acid, a phosphonic acid group, or a salt thereof at one end or both ends. The PFPE acid or a salt thereof may have different groups at each end. Regarding monofunctional PFPE, the other end of the molecule is usually perfluorinated, but may contain a hydrogen or chlorine atom. The PFPE acid or a salt thereof has at least two ether oxygen atoms, preferably at least four ether oxygen atoms, and still more preferably at least six ether oxygen atoms. Preferably, at least one carbon fluoride group separating ether oxygen atoms, more preferably at least two of such carbon fluoride groups, have 2 or 3 carbon atoms. Still more preferably, at least 50% of the carbon fluoride groups separating ether oxygen atoms has 2 or 3 carbon atoms. Also preferably, the PFPE acid or a salt thereof has at least 15 carbon atoms in total, and for example, a preferable minimum value of n or n+m in the repeating unit structure is preferably at least 5. Two or more of the PFPE acids and salts thereof having an acid group at one end or both ends may be used in the production method of the present disclosure. The PFPE acid or a salt thereof preferably has a number average molecular weight of less than 6,000 g/mol.

The hydrocarbon-containing surfactant is preferably added in an amount of 40 ppm or less, more preferably 30 ppm or less, and still more preferably 20 ppm or less, based on the aqueous medium. The amounts in ppm of the oleophilic nucleation sites present in the aqueous medium will be less than the amounts in ppm disclosed herein as being added to the aqueous medium. Thus, the amounts of oleophilic nucleation sites will each be less than the 50 ppm, 40 ppm, 30 ppm, and 20 ppm as mentioned above. Since it is considered that oleophilic nucleation sites exist as molecules, only a small amount of the hydrocarbon-containing surfactant can generate a large amount of oleophilic nucleation sites. Thus, addition of as little as 1 ppm of the hydrocarbon-containing surfactant to the aqueous medium can provide beneficial effect. The lower limit value thereof is preferably 0.01 ppm, and more preferably 0.1 ppm.

The hydrocarbon-containing surfactant encompasses nonionic surfactants and cationic surfactants, including siloxane surfactants such as those disclosed in U.S. Pat. No. 7,897,682 (Brothers et al.) and U.S. Pat. No. 7,977,438 (Brothers et al.).

The hydrocarbon-containing surfactant is preferably a nonionic surfactant (for example, a nonionic hydrocarbon surfactant). In other words, the nucleating agent is preferably a nonionic surfactant. The nonionic surfactant is preferably free from an aromatic moiety.

Examples of the nonionic surfactant include a compound represented by the following general formula (i):

$$R^3\text{—O-}A^1\text{-H} \quad \text{(i)}$$

wherein $R^3$ is a linear or branched primary or secondary alkyl group having 8 to 18 carbon atoms, and $A^1$ is a polyoxyalkylene chain.

$R^3$ preferably has 10 to 16, more preferably 12 to 16 carbon atoms. When $R^3$ has 18 or less carbon atoms, the aqueous dispersion tends to have good dispersion stability. Further, when $R^3$ has more than 18 carbon atoms, it is difficult to handle due to its high flowing temperature. When $R^3$ has less than 8 carbon atoms, the surface tension of the aqueous dispersion becomes high, so that the permeability and wettability are likely to decrease.

The polyoxyalkylene chain may be composed of oxyethylene and oxypropylene. The polyoxyalkylene chain is composed of an average repeating number of 5 to 20 oxyethylene groups and an average repeating number of 0 to 2 oxypropylene groups, and is a hydrophilic group. The number of oxyethylene units may have either a broad or narrow monomodal distribution as typically supplied, or a broader or bimodal distribution which may be obtained by blending. When the average number of repeating oxypropylene groups is more than 0, the oxyethylene groups and oxypropylene groups in the polyoxyalkylene chain may be arranged in blocks or randomly.

From the viewpoint of viscosity and stability of the aqueous dispersion, a polyoxyalkylene chain composed of an average repeating number of 7 to 12 oxyethylene groups and an average repeating number of 0 to 2 oxypropylene groups is preferred. In particular, when $A^1$ has 0.5 to 1.5 oxypropylene groups on average, low foaming properties are good, which is preferable.

More preferably, $R^3$ is (R') (R")HC—, where R" and R" are the same or different linear, branched, or cyclic alkyl groups, and the total amount of carbon atoms is at least 5, preferably 7 to 17. Preferably, at least one of R' and R" is a branched or cyclic hydrocarbon group.

Specific examples of the polyoxyethylene alkyl ether include $C_{13}H_{27}$—O—$(C_2H_4O)_{10}$—H, $C_{12}H_{25}$—O—$(C_2H_4O)_{10}$—H, $C_{10}H_{21}CH(CH_3)CH_2$—O—$(C_2H_4O)_9$—H, $C_{13}H_{27}$—O—$(C_2H_4O)_9$—$(CH(CH_3)CH_2O)$—H, $C_{16}H_{33}$—O—$(C_2H_4O)_{10}$—H, and $HC(C_5H_{11})(C_7H_{15})$—O—$(C_2H_4O)_9$—H. Examples of commercially available products of the polyoxyethylene alkyl ethers include Genapol X080 (product name, manufactured by Clariant), NOIGEN TDS series (manufactured by DKS Co., Ltd.) exemplified by NOIGEN TDS-80 (trade name), LEOCOL TD series (manufactured by Lion Corp.) exemplified by LEOCOL TD-90 (trade name), LIONOL® TD series (manufactured by Lion Corp.), T-Det A series (manufactured by Harcros Chemicals Inc.) exemplified by T-Det A 138 (trade name), and TERGITOL® 15 S series (manufactured by Dow).

The nonionic surfactant is preferably an ethoxylate of 2,6,8-trimethyl-4-nonanol having about 4 to about 18 ethylene oxide units on average, an ethoxylate of 2,6,8-trimethyl-4-nonanol having about 6 to about 12 ethylene oxide units on average, or a mixture thereof. This type of nonionic surfactant is also commercially available, for example, as TERGITOL TMN-6, TERGITOL TMN-10, and TERGITOL TMN-100X (all product names, manufactured by Dow Chemical Co., Ltd.).

The hydrophobic group of the nonionic surfactant may be any of an alkylphenol group, a linear alkyl group, and a branched alkyl group.

Examples of the polyoxyethylene alkylphenyl ether-based nonionic compound include, for example, a compound represented by the following general formula (ii):

$$R^4—C_6H_4—O\text{-}A^2\text{-}H \qquad (ii)$$

wherein $R^4$ is a linear or branched primary or secondary alkyl group having 4 to 12 carbon atoms, and $A^2$ is a polyoxyalkylene chain. Specific examples of the polyoxyethylene alkylphenyl ether-based nonionic compound include Triton X-100 (trade name, manufactured by Dow Chemical Co., Ltd.).

Examples of the nonionic surfactant also include polyol compounds. Specific examples thereof include those described in International Publication No. WO2011/014715.

Typical examples of the polyol compound include compounds having one or more sugar units as a polyol unit. The sugar units may have been modified to contain at least one long chain. Examples of suitable polyol compounds containing at least one long chain moiety include alkyl glycosides, modified alkyl glycosides, sugar esters, and combinations thereof. Examples of the sugars include, but are not limited to, monosaccharides, oligosaccharides, and sorbitanes. Examples of monosaccharides include pentoses and hexoses. Typical examples of monosaccharides include ribose, glucose, galactose, mannose, fructose, arabinose, and xylose. Examples of oligosaccharides include oligomers of 2 to 10 of the same or different monosaccharides. Examples of oligosaccharides include, but are not limited to, saccharose, maltose, lactose, raffinose, and isomaltose.

Typically, sugars suitable for use as the polyol compound include cyclic compounds containing a 5-membered ring of four carbon atoms and one heteroatom (typically oxygen or sulfur, preferably oxygen atom), or cyclic compounds containing a 6-membered ring of five carbon atoms and one heteroatom as described above, preferably, an oxygen atom. These further contain at least two or at least three hydroxy groups (—OH groups) bonded to the carbon ring atoms. Typically, the sugars have been modified in that one or more of the hydrogen atoms of a hydroxy group (and/or hydroxyalkyl group) bonded to the carbon ring atoms has been substituted by the long chain residues such that an ether or ester bond is created between the long chain residue and the sugar moiety.

The sugar-based polyol may contain a single sugar unit or a plurality of sugar units. The single sugar unit or the plurality of sugar units may be modified with long chain moieties as described above. Specific examples of sugar-based polyol compounds include glycosides, sugar esters, sorbitan esters, and mixtures and combinations thereof.

A preferred type of polyol compounds are alkyl or modified alkyl glucosides. These type of surfactants contains at least one glucose moiety. Examples of alkyl or modified alkyl glucosides include compounds represented by:

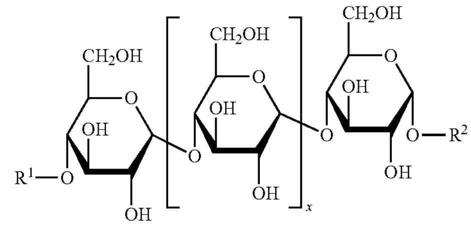

wherein x represents 0, 1, 2, 3, 4, or 5 and $R^1$ and $R^2$ each independently represent H or a long chain unit containing at least 6 carbon atoms, with the proviso that at least one of $R^1$ and $R^2$ is not H. Typical examples of $R^1$ and $R^2$ include aliphatic alcohol residues. Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof.

It is understood that the above formula represents specific examples of alkyl poly glucosides showing glucose in its pyranose form but other sugars or the same sugars but in different enantiomeric or diastereomeric forms may also be used.

Alkyl glucosides are available, for example, by acid-catalyzed reactions of glucose, starch, or n-butyl glucoside with aliphatic alcohols which typically yields a mixture of various alkyl glucosides (Alkyl polygylcoside, Rompp, Lexikon Chemie, Version 2.0, Stuttgart/New York, Georg Thieme Verlag, 1999). Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof. Alkyl glucosides are also commercially available under the trade name GLUCOPON or DISPONIL from Cognis GmbH, Dusseldorf, Germany.

Examples of other nonionic surfactants include bifunctional block copolymers supplied from BASF as Pluronic® R series, tridecyl alcohol alkoxylates supplied from BASF Corporation as Iconol® TDA series, and hydrocarbon-containing siloxane surfactants, preferably hydrocarbon surfactants. In the sense that the hydrocarbyl groups are fully substituted with hydrogen atoms where they can be substituted by halogen such as fluorine, these siloxane surfactants can also be regarded as hydrocarbon surfactants, i.e. the monovalent substituents on the hydrocarbyl groups are hydrogen.

In the case of using TFE as a fluoromonomer to produce polytetrafluoroethylene (PTFE) as a fluoropolymer, (polyfluoroalkyl)ethylene (a) and/or a comonomer (b) having a monomer reactivity ratio rTFE in copolymerization with TFE of 0.1 to 8 may be mixed in the polymerization system in an amount of 0.001 to 0.01% by mass relative to the final PTFE yield at the initiation of polymerization of TFE, so that a PTFE aqueous dispersion can be produced which has high stability enough to maintain properties such as processability and moldability in the following steps and which is capable of providing a molded article having high heat resistance.

Here, the monomer reactivity ratio in copolymerization with TFE is a value obtained by dividing the rate constant in the case that propagating radicals react with TFE by the rate constant in the case that the propagating radicals react with comonomers, in the case that the propagating radicals are terminals of the repeating unit derived from TFE. A smaller monomer reactivity ratio indicates higher reactivity of the comonomers with TFE. The reactivity ratio can be determined by copolymerizing the comonomers with TFE in varying charging compositional features, determining the compositional features in the polymer formed immediately after initiation, and calculating the reactivity ratio by Fineman-Ross equation based on the compositional features.

The copolymerization is performed using 3,600 g of deionized degassed water, 1,000 ppm of ammonium perfluorooctanoate based on the water, and 100 g of paraffin wax contained in an autoclave made of stainless steel with an internal volume of 6.0 L at a pressure of 0.78 MPaG and a temperature of 70° C. A comonomer in an amount of 0.05 g, 0.1 g, 0.2 g, 0.5 g, or 1.0 g is added into the reactor, and then 0.072 g of ammonium persulfate (20 ppm based on the water) is added thereto. To maintain the polymerization pressure at 0.78 MPaG, TFE is continuously fed thereinto. When the charged amount of TFE reaches 100 g, stirring is stopped and the pressure is released until the pressure in the reactor decreases to the atmospheric pressure. After cooling, the paraffin wax is separated to obtain an aqueous dispersion containing the resulting polymer. The aqueous dispersion is stirred so that the resulting polymer coagulates, and the polymer is dried at 150° C. The compositional features in the resulting polymer is calculated by any appropriate combination of NMR, FT-IR, elemental analysis, and X-ray fluorescence analysis depending on the types of the monomers.

In the production method of the present disclosure, a compound having a functional group capable of reacting by radical polymerization and a hydrophilic group may be used together with the polymer (1). Examples of the functional group capable of reacting by radical polymerization include groups having an unsaturated bond such as vinyl group and allyl group. More details will be described later.

Examples of the hydrophilic group include $—NH_2$, $—PO_3M$, $—OPO_3M$, $—SO_3M$, $—OSO_3M$, and —COOM, wherein M represents H, $NH_4$, or an alkali metal. Of these, the hydrophilic group is preferably $—SO_3M$ or —COOM. Examples of the alkali metal include Na and K.

Examples of the compound having a functional group capable of reacting by radical polymerization and a hydrophilic group include a surfactant represented by the general formula (270a):

$$CF_2{=}CF—(CF_2)_{n271a}—Y^{271}$$

wherein n271a represents an integer of 1 to 10; $Y^{271}$ represents $—SO_3M^{271}$ or $—COOM^{271}$; and $M^{271}$ represents H, $NH_4$, or an alkali metal;

a surfactant represented by the general formula (270b):

$$CF_2{=}CF—(CF_2C(CF_3)F)_{n271b}—Y^{271}$$

wherein n271b represents an integer of 1 to 5; and $Y^{271}$ is as defined above;

a surfactant represented by the general formula (270c):

$$CF_2{=}CF—O—(CFX^{271})_{n271c}—Y^{271}$$

wherein $X^{271}$ represents F or $CF_3$; n271c represents an integer of 1 to 10; and $Y^{271}$ is as defined above;

a surfactant represented by the general formula (270d):

$$CF_2{=}CF—O—(CF_2CFX^{271}O)_{n271d}—CF_2CF_2—Y^{271}$$

wherein n271d represents an integer of 1 to 10; and $Y^{271}$ and $X^{271}$ are as defined above; and a compound represented by the general formula (270e):

$$CX^{272}{}_2{=}CFCF_2—O—(CF(CF_3)CF_2O)_{n271e}—CF(CF_3)—Y^{271}$$

wherein each $X^{272}$ is the same and represents F or H; n271e represents 0 or an integer of 1 to 10; and $Y^{271}$ is as defined above.

Also, in the production method of the present disclosure, in addition to the polymer (1) and other compounds having a surfactant function used as necessary, an additive may also be used to stabilize the compounds. Examples of the additive include a buffer, a pH adjuster, a stabilizing aid, and a dispersion stabilizer.

The stabilizing aid is preferably paraffin wax, fluorine-containing oil, a fluorine-containing solvent, silicone oil, or the like. The stabilizing aids may be used alone or in combination of two or more. The stabilizing aid is more preferably paraffin wax. The paraffin wax may be in the form of liquid, semi-solid, or solid at room temperature, and is preferably a saturated hydrocarbon having 12 or more carbon atoms. The paraffin wax usually preferably has a melting point of 40 to 65° C., and more preferably 50 to 65° C.

The amount of the stabilizing aid used is preferably 0.1 to 12% by mass, and more preferably 0.1 to 8% by mass, based on the mass of the aqueous medium used. It is desirable that the stabilizing aid is sufficiently hydrophobic so that the stabilizing aid is completely separated from the PTFE dispersion after polymerization of PTFE, and does not serve as a contaminating component.

In the production method of the present disclosure, the polymerization is performed by charging a polymerization reactor with an aqueous medium, the polymer (1), monomers, and optionally other additives, stirring the contents of the reactor, maintaining the reactor at a predetermined polymerization temperature, and adding a predetermined amount of a polymerization initiator to thereby initiate the polymerization reaction. After the initiation of the polymerization reaction, the components such as the monomers, the polymerization initiator, a chain transfer agent, and the polymer (1) may additionally be added depending on the purpose. The polymer (1) may be added after the polymerization reaction is initiated.

The polymerization is usually performed at a polymerization temperature of 5 to 120° C. and a polymerization pressure of 0.05 to 10 MPaG. The polymerization temperature and the polymerization pressure are determined as appropriate in accordance with the types of the monomers used, the molecular weight of the target fluoropolymer, and the reaction rate.

The total amount of the polymer (1) added is preferably 0.0001 to 10% by mass based on 100% by mass of the aqueous medium. The lower limit thereof is more preferably 0.001% by mass, while the upper limit thereof is more preferably 1% by mass. Less than 0.0001% by mass of the surfactant may cause insufficient dispersibility. More than 10% by mass of the surfactant may fail to give the effects corresponding to its amount; on the contrary, such an amount of the surfactant may cause a reduction in the polymerization rate or even stop the reaction. The amount of the compound added is appropriately determined in accordance with factors such as the types of the monomers used and the molecular weight of the target fluoropolymer.

The method for producing a fluoropolymer of the present disclosure preferably further includes a step of continuously adding the polymer (1). Adding the polymer (1) continuously means, for example, adding the polymer (1) not all at once, but adding over time and without interruption or adding in portions. The polymer (1) may be added as an aqueous solution containing the polymer (1) and water.

In the method for producing a fluoropolymer of the present disclosure, the step of continuously adding the polymer (1) is preferably a step of starting to add the polymer (1) to the aqueous medium when the solid content of the fluoropolymer formed in the aqueous medium is 0.5% by mass or less. The polymer (1) is more preferably started to be added when the solid content is 0.3% by mass or less, still more preferably started to be added when the solid content is 0.2% by mass or less, further preferably started to be added when the solid content is 0.1% by mass or less, and particularly preferably started to be added when the polymerization is initiated. The solid content is a concentration based on the total amount of the aqueous medium and the fluoropolymer.

In the step of continuously adding the polymer (1), the polymer (1) is preferably added in an amount of 0.0001 to 10% by mass, based on 100% by mass of the aqueous medium. The lower limit thereof is preferably 0.001% by mass, more preferably 0.01% by mass, and still more preferably 0.1% by mass. The upper limit thereof is more preferably 1.0% by mass, and still more preferably 0.50% by mass. Less than 0.0001% by mass of the surfactant may cause insufficient dispersibility. More than 10% by mass of the surfactant may fail to give the effects corresponding to its amount; on the contrary, such an amount of the surfactant may cause a reduction in the polymerization rate or even stop the reaction. The amount of the compound added is appropriately determined in accordance with factors such as the types of the monomers used and the molecular weight of the target fluoropolymer.

The polymerization initiator may be any polymerization initiator capable of generating radicals within the polymerization temperature range, and known oil-soluble and/or water-soluble polymerization initiators may be used. The polymerization initiator may be combined with a reducing agent, for example, to form a redox agent, which initiates the polymerization. The concentration of the polymerization initiator is appropriately determined depending on the types of the monomers, the molecular weight of the target fluoropolymer, and the reaction rate.

The polymerization initiator to be used may be an oil-soluble radical polymerization initiator or a water-soluble radical polymerization initiator.

The oil-soluble radical polymerization initiator may be a known oil-soluble peroxide, and representative examples thereof include dialkyl peroxycarbonates such as diisopropyl peroxydicarbonate and di-sec-butyl peroxydicarbonate; peroxy esters such as t-butyl peroxyisobutyrate and t-butyl peroxypivalate; and dialkyl peroxides such as di-t-butyl peroxide, as well as di[perfluoro (or fluorochloro) acyl] peroxides such as di(ω-hydro-dodecafluoroheptanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl) peroxide, di(pentachlorotetradecafluorodecanoyl)peroxide, and di(undecachlorodotoriacontafluorodocosanoyl)peroxide.

The water-soluble radical polymerization initiator may be a known water-soluble peroxide, and examples thereof include ammonium salts, potassium salts, and sodium salts of persulfuric acid, perboric acid, perchloric acid, perphosphoric acid, and percarbonic acid, t-butyl permaleate, and t-butyl hydroperoxide. A reducing agent such as a sulfite or a sulfurous acid salt may be contained together, and the amount thereof may be 0.1 to 20 times the amount of the peroxide.

For example, in a case where the polymerization is performed at a low temperature of 30° C. or lower, the polymerization initiator used is preferably a redox initiator obtained by combining an oxidizing agent and a reducing agent. Examples of the oxidizing agent include persulfates, organic peroxides, potassium permanganate, manganese triacetate, and ammonium cerium nitrate. Examples of the reducing agent include sulfites, bisulfites, bromates, diimines, and oxalic acid. Examples of the persulfates include ammonium persulfate and potassium persulfate. Examples of the sulfites include sodium sulfite and ammonium sulfite. In order to increase the decomposition rate of the initiator, the combination of the redox initiator may preferably contain a copper salt or an iron salt. An example of the copper salt is copper(II) sulfate and an example of the iron salt is iron(II) sulfate.

Examples of the redox initiator include potassium permanganate/oxalic acid, ammonium persulfate/bisulfite/iron sulfate, manganese triacetate/oxalic acid, ammonium cerium nitrate/oxalic acid, and bromate/bisulfite, and potassium permanganate/oxalic acid is preferred. In the case of using a redox initiator, either an oxidizing agent or a reducing agent may be charged into a polymerization tank in advance, followed by adding the other continuously or intermittently thereto to initiate the polymerization. For example, in the case of using potassium permanganate/oxalic acid, preferably, oxalic acid is charged into a polymerization tank and potassium permanganate is continuously added thereto.

The polymerization initiator may be added in any amount, and the initiator in an amount that does not significantly decrease the polymerization rate (e.g., concentration of several ppm in water) or more may be added at once in the initial stage of polymerization, or may be added successively or continuously. The upper limit thereof falls within a range where the reaction temperature is allowed to increase while the polymerization reaction heat is removed through the device surfaces. The upper limit thereof is more preferably within a range where the polymerization reaction heat can be removed through the device surfaces.

The aqueous medium is a reaction medium in which the polymerization is performed, and means a liquid containing water. The aqueous medium may be any medium containing water, and it may be one containing water and, for example, any of fluorine-free organic solvents such as alcohols, ethers, and ketones, and/or fluorine-containing organic solvents having a boiling point of 40° C. or lower.

In the polymerization, known chain transfer agents, radical scavengers, and decomposers may be added to adjust the polymerization rate and the molecular weight depending on the purpose.

Examples of the chain transfer agent include esters such as dimethyl malonate, diethyl malonate, methyl acetate, ethyl acetate, butyl acetate, and dimethyl succinate, as well as isopentane, methane, ethane, propane, methanol, isopropanol, acetone, various mercaptans, various halogenated hydrocarbons such as carbon tetrachloride, and cyclohexane.

The chain transfer agent to be used may be a bromine compound or an iodine compound. An example of a polymerization method using a bromine compound or an iodine compound is a method of performing polymerization of a fluoromonomer in an aqueous medium substantially in the absence of oxygen and in the presence of a bromine compound or an iodine compound (iodine transfer polymerization). Representative examples of the bromine compound or the iodine compound to be used include compounds represented by the general formula:

$R^aI_xBr_y$ wherein x and y are each an integer of 0 to 2 and satisfy $1 \leq x+y \leq 2$; and $R^a$ is a saturated or unsaturated fluorohydrocarbon or chlorofluorohydrocarbon group having 1 to 16 carbon atoms, or a hydrocarbon group having 1 to 3 carbon atoms, each of which optionally contains an oxygen atom. By using a bromine compound or an iodine compound, iodine or bromine is introduced into the polymer, and serves as a crosslinking point.

Examples of the iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and a monoiodo- and monobromo-substitution product, diiodo- and monobromo-substitution product, and (2-iodoethyl)- and (2-bromoethyl)-substitution product of benzene. These compounds may be used singly or in any combination with each other.

Of these, 1,4-diiodoperfluorobutane, 1,6-diiodoperfluorohexane, and 2-iodoperfluoropropane are preferably used from the viewpoints of polymerization reactivity, crosslinkability, availability, and the like.

The amount of the chain transfer agent used is usually 1 to 50,000 ppm, preferably 1 to 20,000 ppm, based on the total amount of the fluoromonomer fed.

The chain transfer agent may be added to the reaction vessel at once before initiation of the polymerization, may be added at once after initiation of the polymerization, may be added in multiple portions during the polymerization, or may be added continuously during the polymerization.

The production method of the present disclosure preferably further includes a step of adding a polymerization terminator (radical scavenger) (hereinafter, also referred to as "polymerization terminator addition step"). The polymerization terminator addition step is performed during the polymerization.

The polymerization terminator used may be a compound having no reinitiation ability after addition or chain transfer to a radical in the polymerization system. Specifically, a compound having the function of readily causing a chain transfer reaction with a primary radical or propagating radical and then generating a stable radical that does not react with a monomer or of readily causing an addition reaction with a primary radical or propagating radical to generate a stable radical is used.

The activity of what is commonly referred to as a chain transfer agent is characterized by the chain transfer constant and the reinitiation efficiency, but among the chain transfer agents, those having almost 0% reinitiation efficiency are called polymerization terminators. The polymerization terminator in the present disclosure is preferably at least one selected from the group consisting of aromatic hydroxy compounds, aromatic amines, N,N-diethylhydroxylamine, quinone compounds, terpenes, thiocyanates, and cupric chloride ($CuCl_2$).

Examples of the aromatic hydroxy compound include unsubstituted phenols, polyhydric phenols, salicylic acid, m- or p-salicylic acid, gallic acid, and naphthol. Examples of the unsubstituted phenol include o-, m-, or p-nitrophenol, o-, m-, or p-aminophenol, and p-nitrosophenol. Examples of the polyhydric phenol include catechol, resorcin, hydroquinone, pyrogallol, phloroglucin, and naphthoresorcinol.

Examples of the aromatic amines include o-, m-, or p-phenylenediamine and benzidine.

Examples of the quinone compound include hydroquinone, o-, m- or p-benzoquinone, 1,4-naphthoquinone, and alizarin.

Examples of the thiocyanate include ammonium thiocyanate ($NH_4SCN$), potassium thiocyanate (KSCN), and sodium thiocyanate (NaSCN).

Of these, the polymerization terminator is preferably a quinone compound, and more preferably hydroquinone.

From the viewpoint of reducing the standard specific gravity, the polymerization terminator is preferably added before 90% by mass of total tetrafluoroethylene consumed in the polymerization reaction is polymerized. It is more preferable that the polymerization terminator is added before 85% by mass, even more preferably 80% by mass of the total tetrafluoroethylene is polymerized.

Further, it is preferable that the polymerization terminator is added after 5% by mass of the total fluoromonomer consumed in the polymerization reaction is polymerized, and more preferable that the polymerization terminator is added after 10% by mass thereof is polymerized.

The amount of the polymerization terminator added is preferably an amount corresponding to 0.1 to 20 ppm of the mass of the aqueous medium used, and more preferably an amount corresponding to 3 to 10 ppm.

The production method of the present disclosure preferably further includes adding a decomposer to the aqueous medium. By adding a decomposer, the radical concentration during the polymerization can be adjusted. Examples of the decomposer include sulfites, bisulfites, bromates, diimines, oxalic acid, copper salts, and iron salts. Examples of the sulfites include sodium sulfite and ammonium sulfite. An example of the copper salt is copper(II) sulfate and an example of the iron salt is iron(II) sulfate.

The amount of the decomposer added is in the range of 25 to 300% by mass based on the amount of the oxidizing agent combined as a polymerization initiator (for example, a redox initiator). The amount thereof is preferably 25 to 150% by mass, and still more preferably 50 to 100% by mass.

Further, it is preferable that the decomposer is added after 5% by mass of the total tetrafluoroethylene consumed in the polymerization reaction is polymerized, and more preferable that the decomposer is added after 10% by mass thereof is polymerized.

The amount of the polymerization terminator added is preferably an amount corresponding to 0.1 to 20 ppm of the mass of the aqueous medium used, and more preferably an amount corresponding to 3 to 10 ppm.

In the production method of the present disclosure, the fluoromonomer is preferably polymerized substantially in the absence of a fluorine-containing surfactant.

Conventionally, fluorine-containing surfactants have been used for the polymerization of fluoropolymers, but the production method of the present disclosure allows for obtaining fluoropolymers without using the fluorine-containing surfactants by using the polymer (1).

The expression "substantially in the absence of a fluorine-containing surfactant" as used herein means that the amount of the fluorine-containing surfactant in the aqueous medium is 10 ppm or less, preferably 1 ppm or less, more preferably 100 ppb or less, still more preferably 10 ppb or less, and further preferably 1 ppb or less.

Examples of the fluorine-containing surfactant include anionic fluorine-containing surfactants.

The anionic fluorine-containing surfactant may be, for example, a fluorine atom-containing surfactant having 20 or less carbon atoms in total in the portion excluding the anionic group.

The fluorine-containing surfactant may also be a surfactant containing fluorine having a molecular weight of 800 or less in the anionic moiety.

The "anionic moiety" means the portion of the fluorine-containing surfactant excluding the cation. For example, in the case of $F(CF_2)_{n1}COOM$ represented by the formula (I) described later, the anionic moiety is the "$F(CF_2)_{n1}COO$" portion.

Examples of the fluorine-containing surfactant also include fluorine-containing surfactants having a Log POW of 3.5 or less. The Log POW is a partition coefficient between 1-octanol and water, which is represented by Log P (wherein P represents the ratio between the concentration of the fluorine-containing surfactant in octanol and the concentration of the fluorine-containing surfactant in water in a phase-separated octanol/water (1:1) liquid mixture containing the fluorine-containing surfactant).

Log POW is determined as follows. Specifically, HPLC is performed on standard substances (heptanoic acid, octanoic acid, nonanoic acid, and decanoic acid) each having a known octanol/water partition coefficient using TOSOH ODS-120T column (ϕ4.6 mm×250 mm, Tosoh Corp.) as a column and acetonitrile/0.6% by mass $HClO_4$ aqueous solution=1/1 (vol/vol %) as an eluent at a flow rate of 1.0 ml/min, a sample amount of 300 μL, and a column temperature of 40° C.; with a detection light of UV 210 nm. For each standard substance, a calibration curve is drawn with respect to the elution time and the known octanol/water partition coefficient. Based on the calibration curve, Log POW is calculated from the elution time of the sample liquid in HPLC.

Specific examples of the fluorine-containing surfactant include those disclosed in U.S. Patent Application Publication No. 2007/0015864, U.S. Patent Application Publication No. 2007/0015865, U.S. Patent Application Publication No. 2007/0015866, and U.S. Patent Application Publication No. 2007/0276103, U.S. Patent Application Publication No. 2007/0117914, U.S. Patent Application Publication No. 2007/0142541, U.S. Patent Application Publication No. 2008/0015319, U.S. Pat. Nos. 3,250,808, 3,271,341, Japanese Patent Laid-Open No. 2003-119204, International Publication No. WO2005/042593, International Publication No. WO2008/060461, International Publication No. WO2007/046377, International Publication No. WO2007/119526, International Publication No. WO2007/046482, International Publication No. WO2007/046345, U.S. Patent Application Publication No. 2014/0228531, International Publication No. WO2013/189824, and International Publication No. WO2013/189826.

Examples of the anionic fluorine-containing surfactant include a compound represented by the following general formula ($N^0$):

$$X^{n0}\text{—}Rf^{n0}\text{—}Y^0 \qquad (N^0)$$

wherein $X^{n0}$ is H, Cl, or F; $Rf^{n0}$ is a linear, branched, or cyclic alkylene group having 3 to 20 carbon atoms in which some or all of H are replaced by F; the alkylene group optionally containing one or more ether bonds in which some of H are replaced by Cl; and $Y^0$ is an anionic group.

The anionic group $Y^0$ may be —COOM, —$SO_2M$, or —$SO_3M$, and may be —COOM or —$SO_3M$.

M is H, a metal atom, $NR^7_4$, imidazolium optionally having a substituent, pyridinium optionally having a substituent, or phosphonium optionally having a substituent, wherein $R^7$ is H or an organic group.

Examples of the metal atom include alkali metals (Group 1) and alkaline earth metals (Group 2), such as Na, K, or Li.

$R^7$ may be H or a $C_{1-10}$ organic group, may be H or a $C_{1-4}$ organic group, and may be H or a $C_{1-4}$ alkyl group.

M may be H, a metal atom, or $NR^7_4$, may be H, an alkali metal (Group 1), an alkaline earth metal (Group 2), or $NR^7_4$, and may be H, Na, K, Li, or $NH_4$.

$Rf^{n0}$ may be one in which 50% or more of H has been replaced by fluorine.

Examples of the compound represented by the general formula ($N^0$) include:

a compound represented by the following general formula ($N^1$):

$$X^{n0}\text{—}(CF_2)_{m1}\text{—}Y^0 \qquad (N^1)$$

wherein $X^{n0}$ is H, Cl, and F; m1 is an integer of 3 to 15; and $Y^0$ is as defined above;

a compound represented by the following general formula ($N^2$):

$$Rf^{n1}\text{—O—}(CF(CF_3)CF_2O)_{m2}CFX^{n1}\text{—}Y^0 \qquad (N^2)$$

wherein $Rf^{n1}$ is a perfluoroalkyl group having 1 to 5 carbon atoms; m2 is an integer of 0 to 3; $X^{n1}$ is F or $CF_3$; and $Y^0$ is as defined above;

a compound represented by the following general formula ($N^3$):

$$Rf^{n2}(CH_2)_{m3}\text{—}Rf^{n3})_qY^0 \qquad (N^3)$$

wherein $Rf^{n2}$ is a partially or fully fluorinated alkyl group having 1 to 13 carbon atoms and optionally containing an ether bond; m3 is an integer of 1 to 3; $Rf^{n3}$ is a linear or branched perfluoroalkylene group having 1 to 3 carbon atoms; q is 0 or 1; and $Y^0$ is as defined above;

a compound represented by the following general formula ($N^4$):

$$Rf^{n4}\text{—O—}(CY^{n1}Y^{n2})_pCF_2\text{—}Y^0 \qquad (N^4)$$

wherein $Rf^{n4}$ is a linear or branched partially or fully fluorinated alkyl group having 1 to 12 carbon atoms and optionally containing an ether bond; and $Y^{n1}$ and $Y^{n2}$ are the same or different and are each H or F; p is 0 or 1; and $Y^0$ is as defined above; and a compound represented by the following general formula ($N^5$).

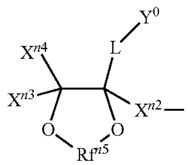

($N^0$)

wherein $X^{n2}$, $X^{n3}$, and $X^{n4}$ may be the same or different and are each H, F, or a linear or branched partially or fully fluorinated alkyl group having 1 to 6 carbon atoms and optionally containing an ether bond; $Rf^{n5}$ is a linear or branched partially or fully fluorinated alkylene group having 1 to 3 carbon atoms and optionally containing an ether bond; L is a linking group; and $Y^0$ is as defined above, with the proviso that the total carbon number of $X^{n2}$, $X^{n3}$, $X^{n4}$, and $Rf^{n5}$ is 18 or less.

More specific examples of the compound represented by the above general formula ($N^0$) include a perfluorocarboxylic acid (I) represented by the following general formula (I), an ω—H perfluorocarboxylic acid (II) represented by the following general formula (II), a perfluoropolyethercarboxylic acid (III) represented by the following general formula (III), a perfluoroalkylalkylenecarboxylic acid (IV) represented by the following general formula (IV), a perfluoroalkoxyfluorocarboxylic acid (V) represented by the following general formula (V), a perfluoroalkylsulfonic acid (VI) represented by the following general formula (VI), an ω—H perfluorosulfonic acid (VII) represented by the following general formula (VII), a perfluoroalkylalkylene sulfonic acid (VIII) represented by the following general formula (VIII), an alkylalkylene carboxylic acid (IX) represented by the following general formula (IX), a fluorocarboxylic acid (X) represented by the following general formula (X), an alkoxyfluorosulfonic acid (XI) represented by the following general formula (XI), and a compound (XII) represented by the following general formula (XII).

The perfluorocarboxylic acid (I) is represented by the following general formula (I):

$$F(CF_2)_{n1}COOM \quad (I)$$

wherein n1 is an integer of 3 to 14; and M is H, a metal atom, $NR^7_4$, imidazolium optionally having a substituent, pyridinium optionally having a substituent, or phosphonium optionally having a substituent, wherein $R^7$ is H or an organic group.

The ω-H perfluorocarboxylic acid (II) is represented by the following general formula (II):

$$H(CF_2)_{n2}COOM \quad (II)$$

wherein n2 is an integer of 4 to 15; and M is as defined above.

The perfluoropolyethercarboxylic acid (III) is represented by the following general formula (III):

$$Rf^1—O—(CF(CF_3)CF_2O)_{n3}CF(CF_3)COOM \quad (III)$$

wherein $Rf^1$ is a perfluoroalkyl group having 1 to 5 carbon atoms; n3 is an integer of 0 to 3; and M is as defined above.

The perfluoroalkylalkylenecarboxylic acid (IV) is represented by the following general formula (IV):

$$Rf^2(CH_2)_{n4}Rf^3COOM \quad (IV)$$

wherein $Rf^2$ is a perfluoroalkyl group having 1 to 5 carbon atoms; $Rf^3$ is a linear or branched perfluoroalkylene group having 1 to 3 carbon atoms; n4 is an integer of 1 to 3; and M is as defined above.

The alkoxyfluorocarboxylic acid (V) is represented by the following general formula (V):

$$Rf^4—O—CY^1Y^2CF_2—COOM \quad (V)$$

wherein $Rf^4$ is a linear or branched partially or fully fluorinated alkyl group having 1 to 12 carbon atoms and optionally containing an ether bond; $Y^1$ and $Y^2$ are the same or different and are each H or F; and M is as defined above.

The perfluoroalkylsulfonic acid (VI) is represented by the following general formula (VI):

$$F(CF_2)_{n5}SO_3M \quad (VI)$$

wherein n5 is an integer of 3 to 14; and M is as defined above.

The ω—H perfluorosulfonic acid (VII) is represented by the following general formula (VII):

$$H(CF_2)_{n6}SO_3M \quad (VII)$$

wherein n6 is an integer of 4 to 14; and M is as defined above.

The perfluoroalkylalkylenesulfonic acid (VIII) is represented by the following general formula (VIII):

$$Rf^5(CH_2)_{n7}SO_3M \quad (VIII)$$

wherein $Rf^5$ is a perfluoroalkyl group having 1 to 13 carbon atoms; n7 is an integer of 1 to 3; and M is as defined above.

The alkylalkylenecarboxylic acid (IX) is represented by the following general formula (IX):

$$Rf^6(CH_2)_{n8}COOM \quad (IX)$$

wherein $Rf^6$ is a linear or branched partially or fully fluorinated alkyl group having 1 to 13 carbon atoms and optionally containing an ether bond; n8 is an integer of 1 to 3; and M is as defined above.

The fluorocarboxylic acid (X) is represented by the following general formula (X):

$$Rf^7—O—Rf^8—O—CF_2—COOM \quad (X)$$

wherein $Rf^7$ is a linear or branched partially or fully fluorinated alkyl group having 1 to 6 carbon atoms and optionally containing an ether bond; $Rf^8$ is a linear or branched partially or fully fluorinated alkyl group having 1 to 6 carbon atoms; and M is as defined above.

The alkoxyfluorosulfonic acid (XI) is represented by the following general formula (XI):

$$Rf^9—O—CY^1Y^2CF_2—SO_3M \quad (XI)$$

wherein $Rf^9$ is a linear or branched partially or fully fluorinated alkyl group having 1 to 12 carbon atoms and optionally containing an ether bond and optionally containing chlorine; $Y^1$ and $Y^2$ are the same or different and are each H or F; and M is as defined above.

The compound (XII) is represented by the following general formula (XII):

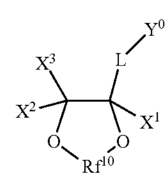

(XII)

wherein $X^1$, $X^2$, and $X^3$ may be the same or different and are H, F, and a linear or branched partially or fully fluorinated alkyl group having 1 to 6 carbon atoms and optionally containing an ether bond; $Rf^{10}$ is a perfluoroalkylene group having 1 to 3 carbon atoms; L is a linking group; and $Y^0$ is an anionic group.

$Y^0$ may be —COOM, —$SO_2M$, or —$SO_3M$, and may be —$SO_3M$ or COOM, where M is as defined above.

Examples of L include a single bond, a partially or fully fluorinated alkylene group having 1 to 10 carbon atoms and optionally containing an ether bond.

As described above, examples of the anionic fluorine-containing surfactant include a carboxylic acid-based surfactant and a sulfonic acid-based surfactant.

The method for producing a fluoropolymer may be a method for producing a fluoropolymer including: (I) polymerizing the fluoromonomer in an aqueous medium in the presence of the polymer (1) to provide an aqueous dispersion of particles of a fluorine-containing polymer (A); and (II) seed-polymerizing the fluoromonomer to the particles of the fluorine-containing polymer (A) in the aqueous dispersion of the particles of the fluorine-containing polymer (A).

The fluoropolymer suitably produced by the production method of the present disclosure may be any fluoropolymer different from the polymer (1), and examples thereof include a TFE polymer in which TFE is the monomer having the highest mole fraction (hereinafter, "most abundant monomer") among the monomers in the polymer, a VDF polymer in which VDF is the most abundant monomer, and a CTFE polymer in which CTFE is the most abundant monomer.

The TFE polymer may suitably be a TFE homopolymer, or may be a copolymer containing (1) TFE, (2) one or two or more fluorine-containing monomers each of which is different from TFE and has 2 to 8 carbon atoms, in particular VDF, HFP, or CTFE, and (3) another monomer. Examples of (3) the another monomer include fluoro(alkyl vinyl ethers) having an alkyl group having 1 to 5 carbon atoms, particularly 1 to 3 carbon atoms; fluorodioxoles; perfluoroalkyl ethylenes; and ω-hydroperfluoroolefins.

The TFE polymer may also be a copolymer of TFE and one or two or more fluorine-free monomers. Examples of the fluorine-free monomers include alkenes such as ethylene and propylene; vinyl esters; and vinyl ethers. The TFE polymer may also be a copolymer of TFE, one or two or more fluorine-containing monomers having 2 to 8 carbon atoms, and one or two or more fluorine-free monomers.

The VDF polymer may suitably be a VDF homopolymer (PVDF), or may be a copolymer containing (1) VDF, (2) one or two or more fluoroolefins each of which is different from VDF and has 2 to 8 carbon atoms, in particular TFE, HFP, or CTFE, and (3) a perfluoro(alkyl vinyl ether) having an alkyl group having 1 to 5 carbon atoms, particularly 1 to 3 carbon atoms, or the like.

The CTFE polymer may suitably be a CTFE homopolymer, or may be a copolymer containing (1) CTFE, (2) one or two or more fluoroolefins each of which is different from CTFE and has 2 to 8 carbon atoms, in particular TFE or HFP, and (3) a perfluoro(alkyl vinyl ether) having an alkyl group having 1 to 5 carbon atoms, particularly 1 to 3 carbon atoms.

The CTFE polymer may also be a copolymer of CTFE and one or two or more fluorine-free monomers, and examples of the fluorine-free monomers include alkenes such as ethylene and propylene; vinyl esters; and vinyl ethers.

The fluoropolymer produced by the production method of the present disclosure may be vitreous, plastic, or elastomeric. The fluoropolymer is amorphous or partially crystallized, and may be subjected to compression firing, melt fabrication, or non-melt fabrication.

The production method of the present disclosure can suitably provide (I) non melt-processible fluororesins, including tetrafluoroethylene polymers (TFE polymers (PTFE)); (II) melt-fabricable fluororesins, including ethylene/TFE copolymers (ETFE), TFE/HFP copolymers (FEP), TFE/perfluoro(alkyl vinyl ether) copolymers (e.g., PFA, MFA), TFE/VDF copolymers, and electrolyte polymer precursors; and (III) fluoroelastomers, including TFE/propylene copolymers, TFE/propylene/third monomer copolymers (the third monomer may be VDF, HFP, CTFE, fluoroalkyl vinyl ether, or the like), TFE/fluoroalkyl vinyl ether copolymers; HFP/ethylene copolymers, HFP/ethylene/TFE copolymers; PVDF; thermoplastic elastomers such as VDF/HFP copolymers, HFP/ethylene copolymers, and VDF/TFE/HFP copolymers; and fluorine-containing segmented polymers disclosed in Japanese Patent Publication No. 61-49327.

The fluoropolymer is preferably a fluororesin, more preferably a fluororesin having a fluorine substitution percentage, calculated by the following formula, of 50% or higher, still more preferably a fluororesin having the fluorine substitution percentage of higher than 50%, further preferably a fluororesin having the fluorine substitution percentage of 55% or higher, further preferably a fluororesin having the fluorine substitution percentage of 60% or higher, further preferably a fluororesin having the fluorine substitution percentage of 75% or higher, particularly preferably a fluororesin having the fluorine substitution percentage of 80% or higher, and most preferably a fluororesin having the fluorine substitution percentage of 90 to 100%, i.e., a perfluororesin.

Fluorine substitution percentage (%)=(number of fluorine atoms bonded to carbon atoms constituting fluoropolymer)/((number of hydrogen atoms bonded to carbon atoms constituting fluoropolymer)+(number of fluorine atoms and chlorine atoms bonded to carbon atoms constituting fluoropolymer))×100 (Formula)

The perfluororesin is more preferably a fluororesin having the fluorine substitution percentage of 95 to 100%, still more preferably PTFE, FEP, or PFA, and particularly preferably PTFE.

(I) The non melt-processible fluororesins, (II) the melt-fabricable fluororesins, and (III) the fluoroelastomers suitably produced by the production method of the present disclosure are preferably produced in the following manner.

(I) Non Melt-Processible Fluororesins

In the production method of the present disclosure, polymerization of TFE is usually performed at a polymerization temperature of 10 to 150° C. and a polymerization pressure of 0.05 to 5 MPaG. For example, the polymerization temperature is more preferably 30° C. or higher, and still more preferably 50° C. or higher. Further, the polymerization temperature is more preferably 120° C. or lower, and still more preferably 100° C. or lower. Further, the polymerization pressure is more preferably 0.3 MPaG or higher, still more preferably 0.5 MPaG or higher, and more preferably 5.0 MPaG or lower, still more preferably 3.0 MPaG or lower. In particular, from the viewpoint of improving the yield of fluoropolymer, the polymerization pressure is preferably 1.0 MPaG or more, more preferably 1.2 MPaG or more, still more preferably 1.5 MPaG or more, and more preferably 2.0 MPaG or more.

In an embodiment, the polymerization reaction is initiated by charging pure water into a pressure-resistant reaction vessel equipped with a stirrer, deoxidizing the system, charging TFE, increasing the temperature to a predetermined level, and adding a polymerization initiator. When the pressure decreases as the reaction progresses, additional TFE is fed continuously or intermittently to maintain the initial pressure. When the amount of TFE fed reaches a predetermined level, feeding is stopped, and then TFE in the reaction vessel is purged and the temperature is returned to room temperature, whereby the reaction is completed. Additional TFE may be added continuously or intermittently to prevent pressure drop.

In production of the TFE polymer (PTFE), various known modifying monomers may be used in combination. The TFE polymer as used herein is a concept that encompasses not only a TFE homopolymer but also a non melt-processible copolymer of TFE and a modifying monomer (hereinafter, referred to as a "modified PTFE").

Examples of the modifying monomer include perhaloolefins such as HFP, CTFE, perfluorovinyl ether; fluoro(alkyl vinyl ethers) having an alkyl group having 1 to 5 carbon atoms, particularly 1 to 3 carbon atoms; cyclic fluorinated monomers such as fluorodioxole; perhaloalkyl ethylenes such as (perfluoroalkyl)ethylene; and ω-hydroperhaloolefins. The modifying monomer may be added all at once in the initial stage, or may be added continuously or intermittently in portions depending the purpose and the manner of TFE feeding.

Examples of the perfluorovinyl ether include, but are not limited to, a perfluoro unsaturated compound represented by the following general formula (A):

$$CF_2{=}CF{-}ORf \qquad (A)$$

wherein Rf represents a perfluoro organic group. The "perfluoro organic group" as used herein means an organic group in which all hydrogen atoms bonded to the carbon atoms are replaced by fluorine atoms. The perfluoro organic group optionally has ether oxygen.

Examples of the perfluorovinyl ether include perfluoro (alkyl vinyl ether) (PAVE) in which Rf is a perfluoroalkyl group having 1 to 10 carbon atoms in the general formula (A). The perfluoroalkyl group preferably has 1 to 5 carbon atoms.

Examples of the perfluoroalkyl group in PAVE include a perfluoromethyl group, a perfluoroethyl group, a perfluoropropyl group, a perfluorobutyl group, a perfluoropentyl group, and a perfluorohexyl group.

Examples of the perfluorovinyl ether further include those represented by the general formula (A) in which Rf is a perfluoro(alkoxyalkyl) group having 4 to 9 carbon atoms; those in which Rf is a group represented by the following formula:

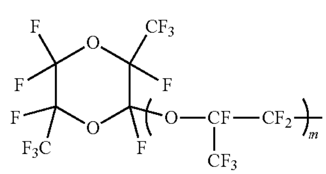

wherein m represents 0 or an integer of 1 to 4; and those in which Rf is a group represented by the following formula:

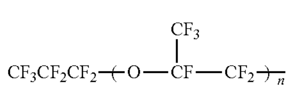

wherein n represents an integer of 1 to 4.

Examples of the (perfluoroalkyl)ethylene (PFAE) include, but are not limited to, (perfluorobutyl)ethylene (PFBE) and (perfluorohexyl)ethylene.

The modifying monomer is also preferably exemplified by a comonomer (3) having a monomer reactivity ratio of 0.1 to 8. The presence of the comonomer (3) makes it possible to obtain modified PTFE particles having a small particle size, and to thereby obtain an aqueous dispersion having high dispersion stability.

Here, the monomer reactivity ratio in copolymerization with TFE is a value obtained by dividing the rate constant in the case that propagating radicals react with TFE by the rate constant in the case that the propagating radicals react with comonomers, in the case that the propagating radicals are less than the repeating unit derived from TFE. A smaller monomer reactivity ratio indicates higher reactivity of the comonomers with TFE. The monomer reactivity ratio can be calculated by determining the compositional features of the polymer produced immediately after the initiation of copolymerization of TFE and comonomers and using the Fineman-Ross equation.

The copolymerization is performed using 3,600 g of deionized degassed water, 1,000 ppm of ammonium perfluorooctanoate based on the water, and 100 g of paraffin wax contained in an autoclave made of stainless steel with an internal volume of 6.0 L at a pressure of 0.78 MPaG and a temperature of 70° C. A comonomer in an amount of 0.05 g, 0.1 g, 0.2 g, 0.5 g, or 1.0 g is added into the reactor, and then 0.072 g of ammonium persulfate (20 ppm based on the water) is added thereto. To maintain the polymerization pressure at 0.78 MPaG, TFE is continuously fed thereinto. When the charged amount of TFE reaches 1,000 g, stirring is stopped and the pressure is released until the pressure in the reactor decreases to the atmospheric pressure. After cooling, the paraffin wax is separated to obtain an aqueous dispersion containing the resulting polymer. The aqueous dispersion is stirred so that the resulting polymer coagulates, and the polymer is dried at 150° C. The compositional features in the resulting polymer are calculated by appropriate combination of NMR, FT-IR, elemental analysis, and X-ray fluorescence analysis depending on the types of the monomers.

The comonomer (3) having a monomer reactivity ratio of 0.1 to 8 is preferably at least one selected from the group consisting of comonomers represented by the formulas (3a) to (3d):

$$CH_2{=}CH{-}Rf^1 \qquad (3a)$$

wherein $Rf^1$ is a perfluoroalkyl group having 1 to 10 carbon atoms;

$$CF_2{=}CF{-}O{-}Rf^2 \qquad (3b)$$

wherein $Rf^2$ is a perfluoroalkyl group having 1 to 2 carbon atoms;

$$CF_2{=}CF{-}O{-}(CF_2)_nCF{=}CF_2 \qquad (3c)$$

wherein n is 1 or 2; and (3d)

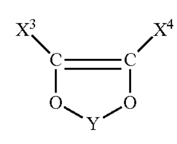

wherein $X^3$ and $X^4$ are each F, Cl, or a methoxy group; and Y is represented by the formula Y1 or Y2;

$$—CF{=}CF— \quad (Y1)$$

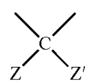
(Y2)

in the formula Y2, Z and Z' are each F or a fluorinated alkyl group having 1 to 3 carbon atoms.

The content of the comonomer (3) is preferably in the range of 0.00001 to 1.0% by mass with respect to the modified PTFE. The lower limit thereof is more preferably 0.0001% by mass, still more preferably 0.001% by mass, further preferably 0.005% by mass, and particularly preferably 0.009% by mass. The upper limit thereof is more preferably 0.50% by mass, still more preferably 0.40% by mass, further preferably 0.30% by mass, still further preferably 0.10% by mass, and particularly preferably 0.05% by mass.

The modifying monomer is preferably at least one selected from the group consisting of hexafluoropropylene, vinylidene fluoride, fluoro(alkyl vinyl ether), (perfluoroalkyl)ethylene, ethylene, and modifying monomers having a functional group capable of reacting by radical polymerization and a hydrophilic group, in view of obtaining an aqueous dispersion of polytetrafluoroethylene particles having a small average primary particle size, a small aspect ratio, and excellent stability.

From the viewpoint of reactivity with TFE, the modifying monomer preferably contains at least one selected from the group consisting of hexafluoropropylene, perfluoro(alkyl vinyl ether), and (perfluoroalkyl)ethylene.

More preferably, the modifying monomer contains at least one selected from the group consisting of hexafluoropropylene, perfluoro(methyl vinyl ether), perfluoro(propyl vinyl ether), (perfluorobutyl)ethylene, (perfluorohexyl)ethylene, and (perfluorooctyl)ethylene.

The total amount of the hexafluoropropylene unit, perfluoro(alkyl vinyl ether) unit and (perfluoroalkyl)ethylene unit is preferably in the range of 0.00001 to 1.0% by mass based on the modified PTFE. The lower limit of the total amount thereof is more preferably 0.001% by mass, still more preferably 0.005% by mass, and particularly preferably 0.009% by mass. The upper limit thereof is more preferably 0.50% by mass, still more preferably 0.40% by mass, further preferably 0.30% by mass, still further preferably 0.10% by mass, and particularly preferably 0.05% by mass.

In the production method of the present disclosure, a modifying monomer having a functional group capable of reacting by radical polymerization and a hydrophilic group (hereinafter referred to as "modifying monomer (A)") may be used together with the surfactant. The modifying monomer (A) may be a compound containing at least one vinyl group and having a surfactant function. Examples of the hydrophilic group in the modifying monomer (A) include $—NH_2$, $—PO_3M$, $—OPO_3M$, $—SO_3M$, $—OSO_3M$, and $—COOM$, wherein M represents H, a metal atom, $NR^7_4$, imidazolium optionally having a substituent, pyridinium optionally having a substituent, or phosphonium optionally having a substituent, wherein $R^7$ is H or an organic group, and may be the same or different, and any two thereof may be bonded to each other to form a ring. Of these, the hydrophilic group is preferably $—SO_3M$ or $—COOM$. $R^7$ is preferably H or a $C_{1-10}$ organic group, more preferably H or a $C_{1-4}$ organic group, and still more preferably H or a $C_{1-4}$ alkyl group.

Examples of the metal atom include monovalent and divalent metal atoms, alkali metals (Group 1) and alkaline earth metals (Group 2), and preferred is Na, K, or Li.

Examples of the "functional group capable of reacting by radical polymerization" in the modifying monomer (A) include groups having an ethylenically unsaturated bond. Examples of the group having an ethylenically unsaturated bond include a linking group as Ra described later. Preferred are groups having an unsaturated bond, such as $—CH{=}CH_2$, $—CF{=}CH_2$, $—CH{=}CF_2$, $—CF{=}CF_2$, $—CH_2—CH{=}CH_2$, $—CF_2—CF{=}CH_2$, $—CF_2—CF{=}CF_2$, $—(C{=}O)—CH{=}CH_2$, $—(C{=}O)—CF{=}CH_2$, $—(C{=}O)—CH{=}CF_2$, $—(C{=}O)—CF{=}CF_2$, $—(C{=}O)—C(CH_3){=}CH_2$, $—(C{=}O)—C(CF_3){=}CH_2$, $—(C{=}O)—C(CH_3){=}CF_2$, $—(C{=}O)—C(CF_3){=}CF_2$, $—O—CH_2—CH{=}CH_2$, $—O—CF_2—CF{=}CH_2$, $—O—CH_2—CH{=}CF_2$, and $—O—CF_2—CF{=}CF_2$.

The modifying monomer (A) is preferably a compound represented by the general formula (4):

$$CX^iX^k{=}CX^jR^a—(CZ^1Z^2)_kY^3 \quad (4)$$

wherein $X^i$, $X^j$, and $X^k$ are each independently F, Cl, H, or $CF_3$; $Y^3$ is a hydrophilic group; $R^a$ is a linking group; $Z^1$ and $Z^2$ are each independently H, F, or $CF_3$; and k is 0 or 1.

Examples of the hydrophilic group include $—NH_2$, $—PO_3M$, $—OPO_3M$, $—SO_3M$, $—OSO_3M$, and $—COOM$, wherein M represents H, a metal atom, $NR^7_4$, imidazolium optionally having a substituent, pyridinium optionally having a substituent, or phosphonium optionally having a substituent, wherein $R^7$ is H or an organic group, and may be the same or different, and any two thereof may be bonded to each other to form a ring. Of these, the hydrophilic group is preferably $—SO_3M$ or $—COOM$. $R^7$ is preferably H or a $C_{1-10}$ organic group, more preferably H or a $C_{1-4}$ organic group, and still more preferably H or a $C_{1-4}$ alkyl group.

Examples of the metal atom include monovalent and divalent metal atoms, alkali metals (Group 1) and alkaline earth metals (Group 2), and preferred is Na, K, or Li.

The use of the modifying monomer (A) allows for obtaining an aqueous dispersion having a smaller average primary particle size and superior stability. Also, the aspect ratio of the primary particles can be made smaller.

$R^a$ is a linking group. The "linking group" as used herein refers to a divalent linking group. The linking group may be a single bond and preferably contains at least one carbon atom, and the number of carbon atoms may be 2 or more, 4 or more, 8 or more, 10 or more, or 20 or more. The upper limit thereof is not limited, but may be 100 or less, and may be 50 or less, for example.

The linking group may be linear or branched, cyclic or acyclic, saturated or unsaturated, substituted or unsubstituted, and optionally contains one or more heteroatoms selected from the group consisting of sulfur, oxygen, and nitrogen, and optionally contains one or more functional groups selected from the group consisting of esters, amides, sulfonamides, carbonyls, carbonates, urethanes, ureas and carbamates. The linking group may be free from carbon atoms and may be a catenary heteroatom such as oxygen, sulfur, or nitrogen.

$R^a$ is preferably a catenary heteroatom such as oxygen, sulfur, or nitrogen, or a divalent organic group.

When R$^a$ is a divalent organic group, the hydrogen atom bonded to the carbon atom may be replaced by a halogen other than fluorine, such as chlorine, and may or may not contain a double bond. Further, Ra may be linear or branched, and may be cyclic or acyclic. Ra may also contain a functional group (e.g., ester, ether, ketone, amine, halide, etc.).

R$^a$ may also be a fluorine-free divalent organic group or a partially fluorinated or perfluorinated divalent organic group.

R$^a$ may be, for example, a hydrocarbon group in which a fluorine atom is not bonded to a carbon atom, a hydrocarbon group in which some of the hydrogen atoms bonded to a carbon atom are replaced by fluorine atoms, a hydrocarbon group in which all of the hydrogen atoms bonded to the carbon atoms are replaced by fluorine atoms, —(C═O)—, —(C═O)—O—, or a hydrocarbon group containing —(C═O)—, and these groups optionally contain an oxygen atom, optionally contain a double bond, and optionally contain a functional group.

Ra is preferably —(C═O)—, —(C═O)—O—, or a hydrocarbon group having 1 to 100 carbon atoms that optionally contains an ether bond and optionally contains a carbonyl group, wherein some or all of the hydrogen atoms bonded to the carbon atoms in the hydrocarbon group may be replaced by fluorine.

R$^a$ is preferably at least one selected from —(CH$_2$)$^a$—, (CF$_2$)$_a$—, —O—(CF$_2$)$_a$—, —(CF$_2$)$_a$—O—(CF$_2$)$_b$—, —O(CF$_2$)$_a$—O—(CF$_2$)$_b$—, (CF$_2$)$_a$—[O—(CF$_2$)$_b$]$_c$—, —O(CF$_2$)$_a$—[O—(CF$_2$)$_b$]$_c$—, —[(CF$_2$)$_a$—O]$_b$—[(CF$_2$)$_c$—O]$_d$—, —O[(CF$_2$)$_a$—O]$_b$—[(CF$_2$)$_c$—O]$_d$—, —O—[CF$_2$CF(CF$_3$)O]$_a$—(CF$_2$)$_b$—, —(C═O)—, —(C═O)—O—, —(C═O)—(CH$_2$)$_a$—, —(C═O)—(CF$_2$)$_a$—, (C═O)—O—(CH$_2$)$_a$—, —(C═O)—O—(CF$_2$)$_a$—, —(C═O)—[(CH$_2$)$_a$—O]$_b$, —(C═O)—[(CF$_2$)$_a$—O]$_b$, —(C═O)—O[(CH$_2$)$_a$—O]$_b$, —(C═O)—O[(CF$_2$)$_a$—O]$_b$—, —(C═O)—O[(CH$_2$)$_a$—O]$_b$(CH$_2$)$_c$—, —(C═O)—O[(CF$_2$)$_a$—O]$_b$(CF$_2$)$_c$—, —(C═O)—(CH$_2$)$_a$—O—(CH$_2$)$_b$—, —(C═O)—(CF$_2$)$_a$—O—(CF$_2$)$_b$—, —(C═O)—O—(CH$_2$)$_a$—O—(CH$_2$)$_b$—, —(C═O)—O—(CF$_2$)$_a$—O—(CF$_2$)$_b$—, —(C═O)—O—C$_6$H$_4$—, and combinations thereof.

In the formula, a, b, c, and d are independently at least 1 or more. a, b, c and d may independently be 2 or more, 3 or more, 4 or more, 10 or more, or 20 or more. The upper limits of a, b, c, and d are 100, for example.

Specific examples suitable for Ra include —CF$_2$—O—, —CF$_2$—O—CF$_2$—, —CF$_2$—O—CH$_2$—, —CF$_2$—O—CH$_2$CF$_2$—, —CF$_2$—O—CF$_2$CF$_2$—, —CF$_2$—O—CF$_2$CH$_2$—, —CF$_2$—O—CF$_2$CF$_2$CH$_2$—, —CF$_2$—O—CF(CF$_3$)—, —CF$_2$—O—CF(CF$_3$)CF$_2$—, —CF$_2$—O—CF(CF$_3$)CF$_2$—O—, —CF$_2$—O—CF(CF$_3$)CH$_2$—, —(C═O)—, —(C═O)—O—, —(C═O)—(CH$_2$)—, —(C═O)—(CF$_2$)—, —(C═O)—O—(CH$_2$)—, —(C═O)—O—(CF$_2$)—, —(C═O)—[(CH$_2$)$_2$—O]$_n$—, (C═O)—[(CF$_2$)$_2$—O]$_n$—, —(C═O)—O[(CH$_2$)$_2$—O]$_n$—, —(C═O)—O[(CF$_2$)$_2$—O]$_n$—, —(C═O)—O[(CH$_2$)$_2$—O]$_n$—(CH$_2$)—, —(C═O)—O[(CF$_2$)$_2$—O]$_n$—(CF$_2$)—, —(C═O)—(CH$_2$)$_2$—O—(CH$_2$)—, —(C═O)—(CF$_2$)$_2$—O—(CF$_2$)—, —(C═O)—O—(CH$_2$)$_2$—O—(CH$_2$)—, —(C═O)—O—(CF$_2$)$_2$—O—(CF$_2$)—, and —(C═O)—O—C$_6$H$_4$—. In particular, preferred for Ra among these is —CF$_2$—O—, —CF$_2$—O—CF$_2$—, —CF$_2$—O—CF$_2$CF$_2$—, —CF$_2$—O—CF(CF$_3$)—, —CF$_2$—O—CF(CF$_3$)CF$_2$—, —CF$_2$—O—CF(CF$_3$)CF$_2$—O—, —(C═O)—, —(C═O)—O—, —(C═O)—(CH$_2$)—, —(C═O)—O—(CH$_2$)—, —(C═O)—O[(CH$_2$)$_2$—O]$_n$—, —(C═O)—O[(CH$_2$)$_2$—O]$_n$—(CH$_2$)—, —(C═O)—(CH$_2$)$_2$—O—(CH$_2$)—, or —(C═O)—O—C$_6$H$_4$—.

In the formula, n is an integer of 1 to 10.

—R$^a$—(CZ$^1$Z$^2$)$_k$ in the general formula (4) is preferably —CF$_2$—O—CF$_2$—, —CF$_2$—O—CF(CF$_3$)—, —CF$_2$—O—C(CF$_3$)$_2$—, —CF$_2$—O—CF$_2$—CF$_2$—, —CF$_2$—O—CF$_2$—CF(CF$_3$)—, —CF$_2$—O—CF$_2$—C(CF$_3$)$_2$—, —CF$_2$—O—CF$_2$CF$_2$—CF$_2$—, —CF$_2$—O—CF$_2$CF$_2$—CF(CF$_3$)—, —CF$_2$—O—CF$_2$CF$_2$—C(CF$_3$)$_2$—, —CF$_2$—O—CF(CF$_3$)—CF$_2$—, —CF$_2$—O—CF(CF$_3$)—CF(CF$_3$)—, —CF$_2$—O—CF(CF$_3$)—C(CF$_3$)$_2$—, —CF$_2$—O—CF(CF$_3$)—CF$_2$—, —CF$_2$—O—CF(CF$_3$)—CF(CF$_3$)—, —CF$_2$—O—CF(CF$_3$)—C(CF$_3$)$_2$—, —CF$_2$—O—CF(CF$_3$)CF$_2$—CF$_2$—, —CF$_2$—O—CF(CF$_3$)CF$_2$—CF(CF$_3$)—, —CF$_2$—O—CF(CF$_3$)CF$_2$—C(CF$_3$)$_2$—, —CF$_2$—O—CF(CF$_3$)CF$_2$—O—CF$_2$—, —CF$_2$—O—CF(CF$_3$)CF$_2$—O—CF(CF$_3$)—, —CF$_2$—O—CF(CF$_3$)CF$_2$—O—C(CF$_3$)$_2$—, —(C═O)—, —(C═O)—O—, —(C═O)—(CH$_2$)—, (C═O)—(CF$_2$)—, —(C═O)—O—(CH$_2$)—, —(C═O)—O—(CF$_2$)—, —(C═O)—[(CH$_2$)$_2$—O]$_n$—(CH$_2$)—, —(C═O)—[(CF$_2$)$_2$—O]$_n$—(CF$_2$)—, —(C═O)—[(CH$_2$)$_2$—O]$_n$—(CH$_2$)—(CH$_2$)—, —(C═O)—[(CF$_2$)$_2$—O]$_n$—(CF$_2$)—(CF$_2$)—, —(C═O)—O[(CH$_2$)$_2$—O]$_n$—(CF$_2$)—, —(C═O)—O[(CH$_2$)$_2$—O]$_n$—(CH$_2$)—(CH$_2$)—, (C═O)—O[(CF$_2$)$_2$—O]$_n$—(CF$_2$)—, —(C═O)—O[(CF$_2$)$_2$—O]$_n$—(CF$_2$)—(CF$_2$)—, (C═O)—(CH$_2$)$_2$—O—(CH$_2$)—(CH$_2$)—, —(C═O)—(CF$_2$)$_2$—O—(CF$_2$)—(CF$_2$)—, (C═O)—O—(CH$_2$)$_2$—O—(CH$_2$)—(CH$_2$)—, —(C═O)—O—(CF$_2$)$_2$—O—(CF$_2$)—(CF$_2$)—, —(C═O)—O—(CH$_2$)$_2$—O—(CH$_2$)—C(CF$_3$)$_2$—, —(C═O)—O—(CF$_2$)$_2$—O—(CF$_2$)—C(CF$_3$)$_2$—, or —(C═O)—O—C$_6$H$_4$—C(CF$_3$)$_2$—, and is more preferably —CF$_2$—O—CF(CF$_3$)—, —CF$_2$—O—CF$_2$—CF(CF$_3$)—, —CF$_2$—O—CF$_2$CF$_2$—CF(CF$_3$)—, —CF$_2$—O—CF(CF$_3$)—CF(CF$_3$)—, —CF$_2$—O—CF(CF$_3$)CF$_2$—CF(CF$_3$)—, —CF$_2$—O—CF(CF$_3$)CF$_2$—O—CF(CF$_3$)—, —(C═O)—, —(C═O)—O—(CH$_2$)—, —(C═O)—O—(CH$_2$)—(CH$_2$)—, —(C═O)—O[(CH$_2$)$_2$—O]$_n$—(CH$_2$)—(CH$_2$)—, —(C═O)—O—(CH$_2$)$_2$—O—(CH$_2$)—C(CF$_3$)$_2$—, or —(C═O)—O—C$_6$H$_4$—C(CF$_3$)$_2$—.

In the formula, n is an integer of 1 to 10.

Specific examples of the compound represented by the general formula (4) include compounds represented by the following formulas:

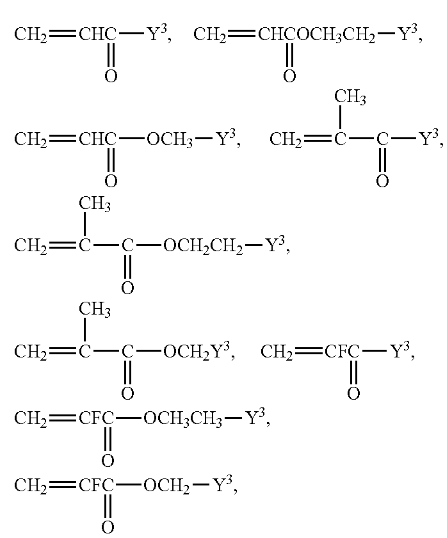

-continued

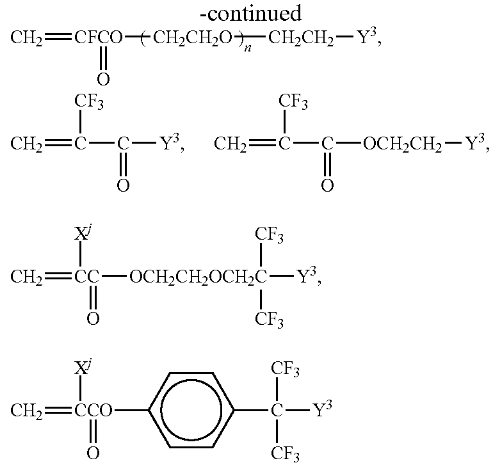

(1)

(11)

wherein $X^1$ and $Y^3$ are as described above; and n is an integer of 1 to 10.

$R^a$ is preferably a divalent group represented by the following general formula (r1):

$$—(C{=}O)_h—(O)_i—CF_2—O—(CX^6{}_2)_e—\{O—CF(CF_3)\}_f—(O)_g— \quad (r1)$$

wherein $X^6$ is each independently H, F, or $CF_3$; e is an integer of 0 to 3; f is an integer of 0 to 3; g is 0 or 1; h is 0 or 1; and i is 0 or 1, and is also preferably a divalent group represented by the following general formula (r2):

$$—(C{=}O)_h—(O)_i—CF_2O—(CX^7{}_2)_e—(O)_g— \quad (r2)$$

wherein $X^7$ is each independently H, F, or $CF_3$; e is an integer of 0 to 3; g is 0 or 1; h is 0 or 1; and i is 0 or 1.

$—R^a—CZ^1Z^2—$ in the general formula (4) is also preferably a divalent group represented by the following formula (t1):

$$—(C{=}O)_h—(O)_i—CF_2—O—(CX^6{}_2)_e—\{O—CF(CF_3)\}_f—(O)_g—CZ^1Z^2— \quad (t1)$$

wherein $X^6$ is each independently H, F, or $CF_3$; e is an integer of 0 to 3; f is an integer of 0 to 3; g is 0 or 1; h is 0 or 1; i is 0 or 1; and $Z^1$ and $Z^2$ are each independently F or $CF_3$, and is more preferably a group in which one of $Z^1$ and $Z^2$ is F and the other is $CF_3$ in the formula (t1).

Also, in the general formula (4), $—R^a—CZ^1Z^2—$ is preferably a divalent group represented by the following formula (t2):

$$—(C{=}O)_h—(O)_i—CF_2—O—(CX^7{}_2)_e—(O)_g—CZ^1Z^2— \quad (t2)$$

wherein $X^7$ is each independently H, F, or $CF_3$; e is an integer of 0 to 3; g is 0 or 1; h is 0 or 1; i is 0 or 1; and $Z^1$ and $Z^2$ are each independently H, F, or $CF_3$, and is more preferably a group in which one of $Z^1$ and $Z^2$ is F and the other is $CF_3$ in the formula (t2).

The compound represented by the general formula (4) also preferably has a C—F bond and does not have a C—H bond, in the portion excluding the hydrophilic group ($Y^3$). In other words, in the general formula (4), $X^i$, $X^j$, and $X^k$ are all F, and Ra is preferably a perfluoroalkylene group having 1 or more carbon atoms; the perfluoroalkylene group may be either linear or branched, may be either cyclic or acyclic, and may contain at least one catenary heteroatom. The perfluoroalkylene group may have 2 to 20 carbon atoms or 4 to 18 carbon atoms.

The compound represented by the general formula (4) may be partially fluorinated. In other words, the compound represented by the general formula (4) also preferably has at least one hydrogen atom bonded to a carbon atom and at least one fluorine atom bonded to a carbon atom, in the portion excluding the hydrophilic group ($Y^3$).

The compound represented by the general formula (4) is also preferably a compound represented by the following formula (4a):

$$CF_2{=}CF—O—Rf^0—Y^3 \quad (4a)$$

wherein $Y^3$ is a hydrophilic group; and $Rf^0$ is a perfluorinated divalent linking group which is perfluorinated and may be a linear or branched, cyclic or acyclic, saturated or unsaturated, substituted or unsubstituted, and optionally contains one or more heteroatoms selected from the group consisting of sulfur, oxygen, and nitrogen.

The compound represented by the general formula (4) is also preferably a compound represented by the following formula (4b):

$$CH_2{=}CH—O—Rf^0—Y^3 \quad (4b)$$

wherein $Y^3$ is a hydrophilic group; and $Rf^0$ is a perfluorinated divalent linking group as defined in the formula (4a).

In the general formula (4), $Y^3$ is preferably $—OSO_3M$. Examples of the polymerized units derived from the compound represented by the general formula (4) when $Y^3$ is $—OSO_3M$ include $—[CF_2CF(OCF_2CF_2CH_2OSO_3M)]-$, $—[CH_2CH((CF_2)_4CH_2OSO_3M)]-$, $—[CF_2CF(O(CF_2)_4CH_2OSO_3M)]-$, $—[CF_2CF(OCF_2CF(CF_3)CH_2OSO_3M)]-$, $—[CF_2CF(OCF_2CF(CF_3)OCF_2CF_2CH_2OSO_3M)]-$, $—[CH_2CH(CF_2)_4CH_2OSO_3M)]-$, $—[CF_2CF(OCF_2CF_2SO_2N(CH_3)CH_2CH_2OSO_3M)]-$, $—[CH_2CH(CF_2CF_2CH_2OSO_3M)]-$, $—[CF_2CF(OCF_2CF_2CF_2CF_2SO_2N(CH_3)CH_2CH_2OSO_3M)]-$, and $—[CH_2CH(CF_2CF_2CH_2OSO_3M)]-$. In the formula, M is as described above.

In the general formula (4), $Y^3$ is preferably $—SO_3M$. Examples of the polymerized units derived from the compound represented by the general formula (4) when $Y^3$ is $—SO_3M$ include $—[CF_2CF(OCF_2CF_2SO_3M)]-$, $—[CF_2CF(O(CF_2)_4SO_3M)]-$, $—[CF_2CF(OCF_2CF(CF_3)SO_3M)]-$, $—[CF_2CF(OCF_2CF(CF_3)OCF_2CF_2SO_3M)]-$, $—[CH_2CH(CF_2CF_2SO_3M)]-$, $—[CF_2CF(OCF_2CF(CF_3)OCF_2CF_2CF_2CF_2SO_3M)]-$, $—[CH_2CH((CF_2)_4SO_3M)]-$, $—[CH_2CH(CF_2CF_2SO_3M)]-$, and $—[CH_2CH((CF_2)_4SO_3M)]-$. In the formula, M is as described above.

In the general formula (4), $Y^3$ is preferably $—COOM$. Examples of the polymerized units derived from the compound represented by the general formula (4) when $Y^3$ is $—COOM$ include $—[CF_2CF(OCF_2CF_2COOM)]-$, $—[CF_2CF(O(CF_2)_5COOM)]-$, $—[CF_2CF(OCF_2CF(CF_3)COOM)]-$, $—[CF_2CF(OCF_2CF(CF_3)O(CF_2)_nCOOM)]-$ (n is greater than 1), $—[CH_2CH(CF_2CF_2COOM)]-$, $—[CH_2CH((CF_2)_4COOM)]-$, $—[CH_2CH(CF_2CF_2COOM)]-$, $—[CH_2CH((CF_2)_4COOM)]-$, $—[CF_2CF(OCF_2CF_2SO_2NR'CH_2COOM)]-$, $—[CF_2CF(O(CF_2)_4SO_2NR'CH_2COOM)]-$, $—[CF_2CF(OCF_2CF(CF_3)SO_2NR'CH_2COOM)]-$, $—[CF_2CF(OCF_2CF(CF_3)OCF_2CF_2SO_2NR'CH_2COOM)]-$, $—[CH_2CH(CF_2CF_2SO_2NR'CH_2COOM)]-$, $—[CF_2CF(OCF_2CF(CF_3)OCF_2CF_2CF_2CF_2SO_2NR'CH_2COOM)]-$, $—[CH_2CH((CF_2)_4SO_2NR'CH_2COOM)]-$, $—[CH_2CH(CF_2CF_2SO_2NR'CH_2COOM)]-$, and $—[CH_2CH$ $((CF_2)_4SO_2NR'CH_2COOM)]$-. In the formula, R' is H or a $C_{1-4}$ alkyl group, and M is as described above.

In the general formula (4), $Y^3$ is preferably —$OPO_3M$. Examples of the polymerized units derived from the compound represented by the general formula (4) when $Y^3$ is —$OPO_3M$ include —$[CF_2CF(OCF_2CF_2CH_2OP(O)(OM)_2)]$-, —$[CF_2CF(O(CF_2)_4CH_2OP(O)(OM)_2)]$-, —$[CF_2CF(OCF_2CF(CF_3)CH_2OP(O)(OM)_2)]$-, —$[CF_2CF(OCF_2CF(CF_3)OCF_2CF_2CH_2OP(O)(OM)_2)]$-, -$[CF_2CF(OCF_2CF_2SO_2N(CH_3)CH_2CH_2OP(O)(OM)_2)]$-, —$[CF_2CF(OCF_2CF_2CF_2CF_2SO_2N(CH_3)CH_2CH_2OP(O)(OM)_2)]$-, —$[CH_2CH(CF_2CF_2CH_2OP(O)(OM)_2)]$-, —$[CH_2CH((CF_2)_4CH_2OP(O)(OM)_2)]$-, —$[CH_2CH(CF_2CF_2CH_2OP(O)(OM)_2)]$-, and —$[CH_2CH((CF_2)_4CH_2OP(O)(OM)_2)]$-. In the formula, M is as described above.

In the general formula (4), $Y^3$ is preferably —$PO_3M$. Examples of the polymerized units derived from the compound represented by the general formula (4) when $Y^3$ is —$PO_3M$ include —$[CF_2CF(OCF_2CF_2P(O)(OM)_2)]$-, —$[CF_2CF(O(CF_2)_4P(O)(OM)_2)]$-, —$[CF_2CF(OCF_2CF(CF_3)P(O)(OM)_2)]$-, —$[CF_2CF(OCF_2CF(CF_3)OCF_2CF_2P(O)(OM)_2)]$-, —$[CH_2CH(CF_2CF_2P(O)(OM)_2)]$-, —$[CH_2CH((CF_2)_4P(O)(OM)_2)]$-, —$[CH_2CH(CF_2CF_2P(O)(OM)_2)]$-, and —$[CH_2CH((CF_2)_4P(O)(OM)_2)]$-, wherein M is as described above.

The compound represented by the general formula (4) is preferably at least one selected from the group consisting of:

a monomer represented by the following general formula (5):

$$CX_2{=}CY(—CZ_2—O—Rf—Y^3) \quad (5)$$

wherein X is the same or different and is —H or —F; Y is —H, —F, an alkyl group, or a fluorine-containing alkyl group; Z is the same or different and —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above;

a monomer represented by the following general formula (6):

$$CX_2{=}CY(—O—Rf—Y^3) \quad (6)$$

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above; and a monomer represented by the following general formula (7):

$$CX_2{=}CY(—Rf—Y^3) \quad (7)$$

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above.

In the general formula (5), each X is —H or —F. X may be both —H, may be both —F, or at least one thereof may be —H. For example, one thereof may be —F and the other may be —H, or both may be —H.

In the general formula (5), Y is —H, —F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably —H, —F, or —$CF_3$, and more preferably —F.

In the general formula (5), Z is the same or different and is —H, —F, an alkyl group, or a fluoroalkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Z is preferably —H, —F, or —$CF_3$, and more preferably —F.

In the general formula (5), at least one of X, Y, and Z preferably contains a fluorine atom. For example, X, Y, and Z may be —H, —F, and —F, respectively.

In the general formula (5), Rf is a fluorine-containing alkylene group having 1 to 40 carbon atoms or a fluorine-containing alkylene group having 2 to 100 carbon atoms and having an ether bond. The fluorine-containing alkylene group having 2 to 100 carbon atoms and having an ether bond is an alkylene group which does not include a structure in which an oxygen atom is an end and contains an ether bond between carbon atoms.

The fluorine-containing alkylene group preferably has 2 or more carbon atoms. The fluorine-containing alkylene group also preferably has 30 or less carbon atoms, more preferably 20 or less carbon atoms, and still more preferably 10 or less carbon atoms. Examples of the fluorine-containing alkylene group include —$CF_2$—, —$CH_2CF_2$—, —$CF_2CF_2$—, —$CF_2CH_2$—, —$CF_2CF_2CH_2$—, —$CF(CF_3)$—, —$CF(CF_3)CF_2$—, and —$CF(CF_3)CH_2$—. The fluorine-containing alkylene group is preferably a perfluoroalkylene group.

The fluorine-containing alkylene group having an ether bond preferably has 3 or more carbon atoms. The fluorine-containing alkylene group having an ether bond also preferably has 60 or less carbon atoms, more preferably 30 or less carbon atoms, and still more preferably 12 or less carbon atoms.

For example, the fluorine-containing alkylene group having an ether bond is also preferably a divalent group represented by the following formula:

$$-\!\left(\underset{\displaystyle Z^1}{\underset{|}{C}}FCF_2O\right)_{p1}\!\left(CF_2O\right)_{q1}\!\left(CZ^2{}_2CF_2CF_2O\right)_{r1}\underset{\displaystyle Z^4}{\underset{|}{C}}Z^3\!\left(CF_2\right)_{s1}\!\left(CH_2\right)_{t1}-$$

wherein Z' is F or $CF_3$; $Z^2$ and $Z^3$ are each H or F; $Z^4$ is H, F, or $CF_3$; p1+q1+r1 is an integer of 0 to 10; s1 is 0 or 1; and t1 is an integer of 0 to 5, with the proviso that when $Z^3$ and $Z^4$ are both H, p1+q1+r1+s1 is not 0.

Specific examples of the fluorine-containing alkylene group having an ether bond include $—CF(CF_3)CF_2—O—CF(CF_3)—$, $—(CF(CF_3)CF_2—O)_n—CF(CF_3)—$ (where n is an integer of 1 to 10), $—CF(CF_3)CF_2—O—CF(CF_3)CH_2—$, $—(CF(CF_3)CF_2—O)_n—CF(CF_3)CH_2—$ (where n is an integer of 1 to 10), $—CH_2CF_2CF_2O—CH_2CF_2CH_2—$, $—CF_2CF_2CF_2O—CF_2CF_2—$, $—CF_2CF_2CF_2O—CF_2CF_2CH_2—$, $—CF_2CF_2O—CF_2—$, $—CF_2CF_2O—CF_2CH_2—$, and $—CF(CF_3)CH_2—$.

The fluorine-containing alkylene group having an ether bond is preferably a perfluoroalkylene group.

In the general formula (5), $Y^3$ is —COOM, $—SO_3M$, or $—OSO_3M$, wherein M is H, a metal atom, $NR^7{}_4$, imidazolium optionally having a substituent, pyridinium optionally having a substituent, or phosphonium optionally having a substituent, wherein $R^7$ is H or an organic group, and may be the same or different, and any two thereof may be bonded to each other to form a ring.

$R^7$ is preferably H or a $C_{1-10}$ organic group, more preferably H or a $C_{1-4}$ organic group, and still more preferably H or a $C_{1-4}$ alkyl group.

Examples of the metal atom include alkali metals (Group 1) and alkaline earth metals (Group 2), and preferred is Na, K, or Li.

M is preferably —H, a metal atom, or $—NR^7{}_4$, more preferably —H, an alkali metal (Group 1), an alkaline earth metal (Group 2), or $—NR^7{}_4$, still more preferably —H, —Na, —K, —Li, or $—NH_4$, further preferably —Na, —K, or $—NH_4$, particularly preferably —Na or $—NH_4$, and most preferably $—NH_4$.

$Y^3$ is preferably —COOM or $—SO_3M$, and more preferably —COOM.

Examples of suitable monomers represented by the general formula (5) include a fluoroallyl ether compound represented by the following formula (5a):

$$CX^h{}_2{=}CFCF_2—O—(CF(CF_3)CF_2O)_{n5}—CF(CF_3)—Y^3 \quad (5a)$$

wherein each $X^h$ is the same, and represents F or H; n5 represents 0 or an integer of 1 to 10; and $Y^3$ is as defined above.

In the general formula (5a), n5 is preferably 0 or an integer of 1 to 5, more preferably 0, 1, or 2, and still more preferably 0 or 1 from the viewpoint of obtaining PTFE particles having a small primary particle size. $Y^3$ is preferably —COOM from the viewpoint of obtaining appropriate water-solubility and surface activity, and M is preferably H or $NH_4$ from the viewpoint of being less likely to remain as impurities and improving the heat resistance of the resulting composition and the stretched body obtained from the composition.

The monomer represented by the general formula (5) is preferably a monomer (5b) represented by the following general formula (5b):

$$CH_2{=}CF(—CF_2—O—Rf—Y^3) \quad (5b)$$

wherein Rf and $Y^3$ are as described above.

Specific examples of the monomer represented by the general formula (5b) include a monomer represented by the following formula:

$$CH_2{=}CFCF_2O\!\left(\underset{\displaystyle Z^1}{\underset{|}{C}}FCF_2O\right)_{p1}\!\left(CF_2O\right)_{q1}\!\left(CZ^2{}_2CF_2CF_2O\right)_{r1}\underset{\displaystyle Z^4}{\underset{|}{C}}Z^3\!\left(CF_2\right)_{s1}\!\left(CH_2\right)_{t1}Y^3,$$

wherein $Z^1$ is F or $CF_3$; $Z^2$ and $Z^3$ are each H or F; $Z^4$ is H, F, or $CF_3$; p1+q1+r1 is an integer of 0 to 10; s1 is 0 or 1; t1 is an integer of 0 to 5; and $Y^3$ is as described above, with the proviso that when $Z^3$ and $Z^4$ are both H, p1+q1+r1+s1 is not 0. More specific preferred examples thereof include:

$CH_2{=}CFCF_2OCF(CF_3)—Y^3$, $CH_2{=}CFCF_2OCF(CF_3)CF_2OCF(CF_3)—Y^3$, $CH_2{=}CFCF_2O—(CF(CF_3)CF_2O)_2—CF(CF_3)—Y^3$, $CH_2{=}CFCF_2OCF(CF_3)CH_2—Y^3$, $CH_2{=}CFCF_2OCF(CF_3)CF_2OCF(CF_3)CH_2—Y^3$, $CH_2{=}CFCF_2O—(CF(CF_3)CF_2O)_2—CF(CF_3)CH_2—Y^3$, $CH_2{=}CFCF_2OCH_2CF_2—Y^3$, $CH_2{=}CFCF_2O(CH_2CF_2CF_2O)CH_2CF_2—Y^3$, $CH_2{=}CFCF_2OCH_2CF_2CH_2—Y^3$, $CH_2{=}CFCF_2O(CH_2CF_2CF_2O)CH_2CF_2CH_2—Y^3$, $CH_2{=}CFCF_2OCF_2CF_2—Y^3$, $CH_2{=}CFCF_2O(CF_2CF_2CF_2O)CF_2CF_2—Y^3$, $CH_2{=}CFCF_2OCF_2CF_2CH_2—Y^3$, $CH_2{=}CFCF_2O(CF_2CF_2CF_2O)CF_2CF_2CH_2—Y^3$, $CH_2{=}CFCF_2OCF_2—Y^3$, $CH_2{=}CFCF_2O(CF_2CF_2O)CF_2—Y^3$, $CH_2{=}CFCF_2OCF_2CH_2—Y^3$, $CH_2{=}CFCF_2O(CF_2CF_2O)CF_2CH_2—Y^3$.

Of these, preferred are:

$CH_2{=}CFCF_2OCF(CF_3)—Y^3$, $CH_2{=}CFCF_2OCF(CF_3)CF_2OCF(CF_3)—Y^3$, $CH_2{=}CFCF_2O—(CF(CF_3)CF_2O)_2—CF(CF_3)—Y^3$,

-continued

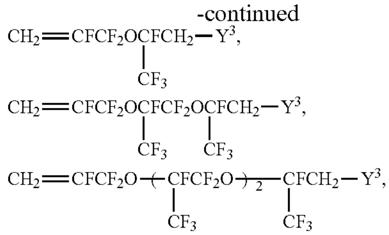

In the monomer represented by the general formula (5b), $Y^3$ in the formula (5b) is preferably —COOM. Specifically, the monomer represented by the general formula (5b) is preferably at least one selected from the group consisting of $CH_2{=}CFCF_2OCF(CF_3)COOM$ and $CH_2{=}CFCF_2OCF(CF_3)CF_2OCF(CF_3)COOM$ (wherein M is as defined above), and more preferably $CH_2{=}CFCF_2OCF(CF_3)COOM$.

The monomer represented by the general formula (5) is preferably a monomer (5c) represented by the following general formula (5c):

$$CX^2{}_2{=}CFCF_2\text{—}O\text{—}(CF(CF_3)CF_2O)_{n5}\text{—}CF(CF_3)\text{—}Y^3 \qquad (5c)$$

wherein each $X^2$ is the same, and each represent F or H; n5 represents 0 or an integer of 1 to 10; and $Y^3$ is as defined above.

In the formula (5c), n5 is preferably 0 or an integer of 1 to 5, more preferably 0, 1, or 2, and still more preferably 0 or 1 from the viewpoint of stability of the resulting aqueous dispersion. $Y^3$ is preferably $—COOM^1$ from the viewpoint of obtaining appropriate water-solubility and stability of the aqueous dispersion, and $M^1$ is preferably H or $NH_4$ from the viewpoint of being less likely to remain as impurities and improving the heat resistance of the resulting molded body.

Examples of the perfluorovinylalkyl compound represented by the formula (5c) include $CH_2{=}CFCF_2OCF(CF_3)COOM^1$ and $CH_2{=}CFCF_2OCF(CF_3)CF_2OCF(CF_3)COOM^1$, wherein $M^1$ is as defined above.

Examples of the monomer represented by the general formula (5) further include a monomer represented by the following general formula (5d) and a monomer represented by the following general formula (5e):

$$CF_2{=}CFCF_2\text{—}O\text{—}Rf\text{—}Y^3 \qquad (5d)$$

$$CF_2{=}CF\text{—}Rf\text{—}Y^3 \qquad (5e)$$

wherein Rf and $Y^3$ are as described above.

More specific examples thereof include:

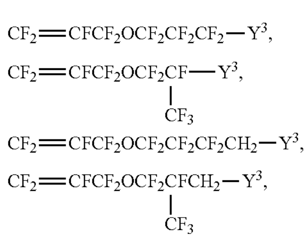

In the general formula (6), each X is —H or —F. X may be both —F, or at least one thereof may be —H. For example, one thereof may be —F and the other may be —H, or both may be —H.

In the general formula (6), Y is —H, —F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably —H, —F, or $—CF_3$, and more preferably —F.

In the general formula (6), at least one of X and Y preferably contains a fluorine atom. For example, X, Y, and Z may be —H, —F, and —F, respectively.

In the general formula (6), Rf is a fluorine-containing alkylene group having 1 to 40 carbon atoms or a fluorine-containing alkylene group having 2 to 100 carbon atoms and having an ether bond. The fluorine-containing alkylene group having 2 to 100 carbon atoms and having an ether bond is an alkylene group which does not include a structure in which an oxygen atom is an end and contains an ether bond between carbon atoms.

The fluorine-containing alkylene group preferably has 2 or more carbon atoms. The fluorine-containing alkylene group also preferably has 30 or less carbon atoms, more preferably 20 or less carbon atoms, and still more preferably 10 or less carbon atoms. Examples of the fluorine-containing alkylene group include $—CF_2—$, $—CH_2CF_2—$, $—CF_2CF_2—$, $—CF_2CH_2—$, $—CF_2CF_2CH_2—$, $—CF(CF_3)—$, $—CF(CF_3)CF_2—$, and $—CF(CF_3)CH_2—$. The fluorine-containing alkylene group is preferably a perfluoroalkylene group.

The monomer represented by the general formula (6) is preferably at least one selected from the group consisting of monomers represented by the following general formulas (6a), (6b), (6c), and (6d):

$$CF_2{=}CF\text{—}O\text{—}(CF_2)_{n1}\text{—}Y^3 \qquad (6a)$$

wherein n1 represents an integer of 1 to 10; $Y^3$ represents $—SO_3M^1$ or $—COOM^1$; $M^1$ represents H, a metal atom, $NR^7{}_4$, imidazolium optionally having a substituent, pyridinium optionally having a substituent, or phosphonium optionally having a substituent; and $R^7$ represents H or an organic group;

$$CF_2{=}CF\text{—}O\text{—}(CF_2C(CF_3)F)_{n2}Y^3 \qquad (6b)$$

wherein n2 represents an integer of 1 to 5, and $Y^3$ is as defined above;

$$CF_2{=}CF\text{—}O\text{—}(CFX^1)_{n3}\text{—}Y^3 \qquad (6c)$$

wherein $X^1$ represents F or $CF_3$; n3 represents an integer of 1 to 10; and $Y^3$ is as defined above; and $$CF_2{=}CF\text{—}O\text{—}(CF_2CFX^1O)_{n4}\text{—}CF_2CF_2\text{—}Y^3 \qquad (6d)$$

wherein n4 represents an integer of 1 to 10; and $Y^3$ and $X^1$ are as defined above.

In the formula (6a), n1 is preferably an integer of 5 or less, and more preferably an integer of 2 or less. $Y^3$ is preferably $—COOM^1$ from the viewpoint of obtaining appropriate water-solubility and stability of the aqueous dispersion, and $M^1$ is preferably H or $NH_4$ from the viewpoint of being less likely to remain as impurities and improving the heat resistance of the resulting molded body.

Examples of the perfluorovinylalkyl compound represented by the formula (6a) include $CF_2{=}CF\text{—}O\text{—}CF_2COOM^1$, wherein $M^1$ is as defined above.

In the formula (6b), n2 is preferably an integer of 3 or less from the viewpoint of stability of the resulting aqueous dispersion, $Y^3$ is preferably —COOM[1] from the viewpoint of obtaining appropriate water-solubility and stability of the aqueous dispersion, and $M^1$ is preferably H or $NH_4$ from the viewpoint of being less likely to remain as impurities and improving the heat resistance of the resulting molded body.

In the formula (6c), n3 is preferably an integer of 5 or less from the viewpoint of water-solubility, $Y^3$ is preferably —COOM[1] from the viewpoint of obtaining appropriate water-solubility and stability of the aqueous dispersion, and $M^1$ is preferably H or $NH_4$ from the viewpoint of improving dispersion stability.

In the formula (6d), $X^1$ is preferably —$CF_3$ from the viewpoint of stability of the aqueous dispersion, n4 is preferably an integer of 5 or less from the viewpoint of water-solubility, $Y^3$ is preferably —COOM[1] from the viewpoint of obtaining appropriate water-solubility and stability of the aqueous dispersion, and $M^1$ is preferably H or $NH_4$.

Examples of the perfluorovinyl ether compound represented by the formula (6d) include $CF_2{=}CFOCF_2CF(CF_3)OCF_2CF_2COOM^1$, wherein $M^1$ represents H, $NH_4$, or an alkali metal.

In the general formula (7), Rf is preferably a fluorine-containing alkylene group having 1 to 40 carbon atoms. In the general formula (7), at least one of X and Y preferably contains a fluorine atom.

The monomer represented by the general formula (7) is preferably at least one selected from the group consisting of:

a monomer represented by the following general formula (7a):

$$CF_2{=}CF—(CF_2)_{n1}—Y^3 \quad (7a)$$

wherein n1 represents an integer of 1 to 10; and $Y^3$ is as defined above; and a monomer represented by the following general formula (7b):

$$CF_2{=}CF—(CF_2C(CF_3)F)_{n2}—Y^3 \quad (7b)$$

wherein n2 represents an integer of 1 to 5; and $Y^3$ is as defined above.

$Y^3$ is preferably —$SO_3M^1$ or —COOM[1], and $M^1$ is preferably H, a metal atom, $NR^7_4$, imidazolium optionally having a substituent, pyridinium optionally having a substituent, or phosphonium optionally having a substituent. $R^7$ represents H or an organic group.

In the formula (7a), n1 is preferably an integer of 5 or less, and more preferably an integer of 2 or less. $Y^3$ is preferably —COOM[1] from the viewpoint of obtaining appropriate water-solubility and stability of the aqueous dispersion, and $M^1$ is preferably H or $NH_4$ from the viewpoint of being less likely to remain as impurities and improving the heat resistance of the resulting molded body.

Examples of the perfluorovinylalkyl compound represented by the formula (7a) include $CF_2{=}CFCF_2COOM^1$, wherein $M^1$ is as defined above.

In the formula (7b), n2 is preferably an integer of 3 or less from the viewpoint of stability of the resulting aqueous dispersion, $Y^3$ is preferably —COOM[1] from the viewpoint of obtaining appropriate water-solubility and stability of the aqueous dispersion, and $M^1$ is preferably H or $NH_4$ from the viewpoint of being less likely to remain as impurities and improving the heat resistance of the resulting molded body.

The content of the modifying monomer (A) is preferably in the range of 0.00001 to 1.0% by mass. The lower limit thereof is more preferably 0.0001% by mass, still more preferably 0.001% by mass, further preferably 0.005% by mass, and particularly preferably 0.009% by mass. The upper limit thereof is preferably 0.90% by mass, more preferably 0.50% by mass, still more preferably 0.40% by mass, further preferably 0.30% by mass, still further preferably 0.10% by mass, and particularly preferably 0.05% by mass.

In production of the TFE polymer, the polymer (1) can be used within the use range described for the production method of the present disclosure. The polymer (1) may be added in any concentration within the range, and is usually added at a critical micelle concentration (CMC) or lower at the initiation of polymerization. Too large an amount of the polymer (1) added may cause generation of needle-shaped particles having a large aspect ratio and gelling of the aqueous dispersion, impairing the stability. The lower limit of the amount of the polymer (1) used is preferably 0.0001% by mass, more preferably 0.001% by mass, still more preferably 0.01% by mass, and particularly preferably 0.1% by mass, based on the aqueous medium. The upper limit of the amount of the polymer (1) used is preferably 10% by mass, more preferably 5% by mass, still more preferably 3% by mass, and particularly preferably 2% by mass, based on the aqueous medium.

The polymer (1) may be added to the reaction vessel at once before initiation of the polymerization, may be added at once after initiation of the polymerization, may be added in multiple portions during the polymerization, or may be added continuously during the polymerization.

In production of the TFE polymer, the polymerization initiator used may be an organic peroxide such as a persulfate (e.g., ammonium persulfate), disuccinic acid peroxide, or diglutaric acid peroxide alone or in the form of a mixture thereof. An organic peroxide may be used together with a reducing agent such as sodium sulfite to form a redox system. Further, during the polymerization, a radical scavenger such as hydroquinone or catechol may be added or a decomposer for peroxides such as ammonium sulfite may be added to adjust the radical concentration in the system.

The redox polymerization initiator is preferably a redox initiator obtained by combining an oxidizing agent and a reducing agent. Examples of the oxidizing agent include persulfates, organic peroxides, potassium permanganate, manganese triacetate, and ammonium cerium nitrate. Examples of the reducing agent include sulfites, bisulfites, bromates, diimines, and oxalic acid. Examples of the persulfates include ammonium persulfate and potassium persulfate. Examples of the sulfites include sodium sulfite and ammonium sulfite. In order to increase the decomposition rate of the initiator, the combination of the redox initiator may preferably contain a copper salt or an iron salt. An example of the copper salt is copper(II) sulfate and an example of the iron salt is iron(II) sulfate. Examples of the redox initiator include potassium permanganate/oxalic acid, ammonium persulfate/bisulfite/iron sulfate, manganese triacetate/oxalic acid, ammonium cerium nitrate/oxalic acid, and bromate/bisulfite, and potassium permanganate/oxalic acid is preferred. In the case of using a redox initiator, either an oxidizing agent or a reducing agent may be charged into a polymerization tank in advance, followed by adding the other continuously or intermittently thereto to initiate the polymerization. For example, in the case of potassium permanganate/oxalic acid, preferably, oxalic acid is charged into a polymerization tank and potassium permanganate is continuously added thereto.

In production of the TFE polymer, a known chain transfer agent may be used. Examples thereof include saturated hydrocarbons such as methane, ethane, propane, and butane, halogenated hydrocarbons such as chloromethane, dichloromethane, and difluoroethane, alcohols such as methanol and ethanol, and hydrogen. The chain transfer agent is preferably one in a gas state at a normal temperature and normal pressure.

The amount of the chain transfer agent used is usually 1 to 10,000 ppm, preferably 1 to 5,000 ppm, based on the total amount of TFE fed. The amount used may be 1 to 1,000 ppm, or 1 to 500 ppm.

In production of the TFE polymer, a saturated hydrocarbon that is substantially inert to the reaction, that is in a liquid state under the reaction conditions, and that has 12 or more carbon atoms may be used as a dispersion stabilizer for the reaction system in an amount of 2 to 10 parts by mass based on 100 parts by mass of the aqueous medium. Ammonium carbonate, ammonium phosphate, or the like may be added as a buffer to adjust the pH during the reaction.

At completion of the polymerization for the TFE polymer, an aqueous dispersion having a solid concentration of 1.0 to 70% by mass and an average primary particle size of 50 to 500 nm can be obtained. The aqueous dispersion contains the polymer (1) and the fluoropolymer. Also, the use of the polymer (1) allows for obtaining an aqueous dispersion having particles of the TFE polymer having a fine particle size as small as 0.5 μm or smaller.

The lower limit of the solid concentration is preferably 5% by mass, more preferably 8% by mass. The upper limit thereof may be, but is not limited to, 40% by mass or 35% by mass.

The lower limit of the average primary particle size is preferably 100 nm, more preferably 150 nm. The upper limit thereof is preferably 400 nm, more preferably 350 nm.

Fine powder can be produced by coagulating the aqueous dispersion. The aqueous dispersion of the TFE polymer can be formed into fine powder through coagulation, washing, and drying. The resulting fine powder may be used for various applications. Coagulation of the aqueous dispersion of the TFE polymer is usually performed by diluting the aqueous dispersion obtained by polymerization of polymer latex, for example, with water to a polymer concentration of 10 to 20% by mass, optionally adjusting the pH to a neutral or alkaline, and stirring the polymer more vigorously than during the reaction in a vessel equipped with a stirrer. The coagulation may be performed under stirring while adding a water-soluble organic compound such as methanol or acetone, an inorganic salt such as potassium nitrate or ammonium carbonate, or an inorganic acid such as hydrochloric acid, sulfuric acid, or nitric acid as a coagulating agent. The coagulation may be continuously performed using a device such as an inline mixer.

From the viewpoint of productivity, the concentration of the non-agglomerated TFE polymer in the discharge water generated by the agglomeration is preferably low, more preferably less than 0.4% by mass, and particularly preferably less than 0.3% by mass.

Pigment-containing or filler-containing TFE polymer fine powder in which pigments and fillers are uniformly mixed can be obtained by adding pigments for coloring and various fillers for improving mechanical properties before or during the coagulation.

The wet powder obtained by coagulating the TFE polymer in the aqueous dispersion is usually dried by means of vacuum, high-frequency waves, hot air, or the like while keeping the wet powder in a state in which the wet powder is less fluidized, preferably in a stationary state. Friction between the powder particles especially at high temperature usually has unfavorable effects on the TFE polymer in the form of fine powder. This is because the particles made of such a TFE polymer are easily formed into fibrils even with a small shearing force and lose its original, stable particulate structure.

The drying is performed at a drying temperature of 10 to 250° C., preferably 100 to 250° C. The drying temperature may be 200° C. or lower.

The resulting fine powder of the TFE polymer is preferred for molding, and suitable applications thereof include tubes for hydraulic systems or fuel systems of aircraft or automobiles, flexible hoses for chemicals or vapors, and electric wire coating.

The aqueous dispersion of the TFE polymer obtained by the polymerization is preferably mixed with a nonionic surfactant to stabilize and further concentrate the aqueous dispersion, and then further mixed with, depending on its purpose, an organic or inorganic filler to form a composition and used in a variety of applications. The composition, when applied to a metal or ceramic base material, can provide a coating surface having non-stickiness, a low coefficient of friction, and excellent gloss, smoothness, abrasion resistance, weather resistance, and heat resistance, which is suitable for coating of rolls and cooking utensils and impregnation of glass cloth.

The aqueous dispersion may also be used to prepare an organosol of the TFE polymer. The organosol may contain the TFE polymer and an organic solvent, and examples of the organic solvent include ether-based solvents, ketone-based solvents, alcohol-based solvents, amide-based solvents, ester-based solvents, aliphatic hydrocarbon-based solvents, aromatic hydrocarbon-based solvents, and halogenated hydrocarbon-based solvents. Preferably used are N-methyl-2-pyrrolidone and dimethylacetamide. The organosol may be prepared by the method disclosed in International Publication No. WO2012/002038, for example.

The aqueous dispersion of the TFE polymer or the fine powder of the TFE polymer is also preferably used as a processing aid. When used as a processing aid, the aqueous dispersion or the fine powder is mixed with a host polymer, for example, to improve the melt strength of the host polymer in melt fabrication and to improve the mechanical strength, electric properties, incombustibility, anti-drop performance during combustion, and slidability of the resulting polymer.

The aqueous dispersion of the TFE polymer or the fine powder of the TFE polymer is also preferably used as a binder for batteries or used for dustproof applications.

The aqueous dispersion of the TFE polymer or the fine powder of the TFE polymer is also preferably combined with a resin other than the TFE polymer to form a processing aid before use. The aqueous dispersion or the fine powder is suitable as a material of the PTFEs disclosed in, for example, Japanese Patent Laid-Open No. 11-49912, U.S. Pat. No. 5,804,654, Japanese Patent Laid-Open No. 11-29679, and Japanese Patent Laid-Open No. 2003-2980. Processing aids containing the aqueous dispersion or the fine powder are not inferior in any way to the processing aids disclosed in the publications.

The aqueous dispersion of the TFE polymer is also preferably mixed with an aqueous dispersion of a melt-fabricable fluororesin so that the components coagulate to form co-coagulated powder. The co-coagulated powder is suitable as a processing aid.

Examples of the melt-fabricable fluororesin include FEP, PFA, ETFE, and ethylene/TFE/HFP copolymers (EFEPs), of which FEP is preferred.

The aqueous dispersion also preferably contains a melt-fabricable fluororesin. Examples of the melt-fabricable fluororesin include FEP, PFA, ETFE, and EFEP. The aqueous dispersion containing the melt-fabricable fluororesin may be used as a coating material. The melt-fabricable fluororesin enables sufficient fusion of the TFE polymer particles, improving the film-formability and providing the resulting film with gloss.

The fluorine-free resin to which the co-coagulated powder is added may be in the form of powder, pellets, or emulsion. In order to achieve sufficient mixing of the resins, the addition is preferably performed by a known method such as extrusion kneading or roll kneading under a shearing force.

The aqueous dispersion of the TFE polymer is also preferably used as a dust suppression treatment agent. The dust suppression treatment agent may be used in a method for suppressing dust from a dust-generating substance by mixing the dust suppression treatment agent with the dust-generating substance and subjecting the mixture to a compression-shear action at a temperature of 20 to 200° C. to fibrillate the TFE polymer, for example, methods disclosed in Japanese Patent No. 2,827,152 and Japanese Patent No. 2,538,783.

The aqueous dispersion of the TFE polymer can suitably be used for the dust suppression treatment agent composition disclosed in International Publication No. WO2007/004250, and can also suitably be used for the method of dust suppression treatment disclosed in International Publication No. WO2007/000812.

The dust control treatment agent is suitably used for dust suppression treatment in the fields of building-products, soil stabilizers, solidifying materials, fertilizers, landfill of incineration ash and harmful substance, and explosion proof equipment, cosmetics, and sands for pet excretion represented by cat sand.

The aqueous dispersion of the TFE polymer is also preferably used as a material for producing TFE polymer fibers by a dispersion spinning method. The dispersion spinning method is a method in which the aqueous dispersion of the TFE polymer and an aqueous dispersion of a matrix polymer are mixed and the mixture is extruded to form an intermediate fiber structure, and then the intermediate fiber structure is fired to decompose the matrix polymer and sinter the TFE polymer particles, thereby providing TFE polymer fibers.

The polymer (1) may also be used to produce a high-molecular-weight PTFE. In other words, even without using a conventional fluorinated surfactant, the production method of the present disclosure using the polymer (1) can surprisingly produce PTFE having a molecular weight equivalent to that of PTFE obtained by a production method using a conventional fluorinated surfactant.

The high-molecular-weight PTFE powder obtained by polymerization has stretchability and non melt processability, and is also useful as a material for a stretched body (porous body). When the stretched body is in the form of a film (PTFE stretched film or PTFE porous film), the stretched body can be formed by stretching by a known PTFE stretching method. Stretching allows easy formation of fibrils of PTFE, resulting in a high-molecular-weight PTFE porous body (film) including nodes and fibers.

Preferably, roll-stretching a sheet-shaped or rod-shaped paste extrudate in an extruding direction can provide a uniaxially stretched film.

Further stretching in a transverse direction using a tenter, for example, can provide a biaxially stretched film.

Prebaking treatment is also preferably performed before stretching.

The present disclosure also relates to a method for producing a stretched body, which includes stretching a polytetrafluoroethylene obtained by the production method. The stretching can be performed by any conventionally known methods and conditions for stretching PTFE.

The present disclosure also provides a method for producing a stretched body, which includes polymerizing tetrafluoroethylene in an aqueous medium in the presence of a polymer (1) to provide a polytetrafluoroethylene, the polymer (1) comprising a polymerized unit (1) derived from a monomer represented by the following general formula (1), and stretching the obtained polytetrafluoroethylene.

$$CX_2{=}CY(\text{—}CZ_2\text{—}O\text{—}Rf\text{-}A) \quad (1)$$

wherein X is the same or different and is —H or —F; Y is —H, —F, an alkyl group, or a fluorine-containing alkyl group; Z is the same or different and is —H, —F, an alkyl group, or a fluoroalkyl group; Rf is a fluorine-containing alkylene group having 1 to 40 carbon atoms or a fluorine-containing alkylene group having 2 to 100 carbon atoms and having an ether bond; and A is —COOM, —$SO_3M$, or —$OSO_3M$, wherein M is —H, a metal atom, —$NR^7_4$, imidazolium optionally having a substituent, pyridinium optionally having a substituent, or phosphonium optionally having a substituent, wherein $R^7$ is H or an organic group, with the proviso that at least one of X, Y, and Z contains a fluorine atom.

This PTFE stretched body is a porous body having a high porosity, and can suitably be used as a filter material for a variety of microfiltration filters such as air filters and chemical filters and a support member for polymer electrolyte films.

The PTFE stretched body is also useful as a material of products used in the fields of textiles, of medical treatment, of electrochemistry, of sealants, of air filters, of ventilation/internal pressure adjustment, of liquid filters, and of consumer goods.

The following provides examples of specific applications.

—Electrochemical Field

Examples of the applications in this field include prepregs for dielectric materials, EMI-shielding materials, and heat conductive materials. More specifically, examples thereof include printed circuit boards, electromagnetic interference shielding materials, insulating heat conductive materials, and insulating materials.

—Sealant Field

Examples of the applications in this field include gaskets, packings, pump diaphragms, pump tubes, and sealants for aircraft.

—Air Filter Field

Examples of the applications in this field include ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), adsorbent-attached filters (for HDD embedment), adsorbent-attached vent filters (for HDD embedment), vent filters (for HDD embedment, for example) filters for cleaners (for cleaners), general-purpose multilayer felt materials, cartridge filters for GT (for interchangeable items for GT), and cooling filters (for housings of electronic devices).

—Ventilation/Internal Pressure Adjustment Field

Examples of the applications in this field include materials for freeze drying such as vessels for freeze drying, ventilation materials for automobiles for electronic circuits and lamps, applications relating to vessels such as vessel caps, protective ventilation for electronic devices, including small devices such as tablet terminals and mobile phone terminals, and ventilation for medical treatment.

—Liquid Filter Field

Examples of the applications in this field include liquid filters for semiconductors (for production of semiconductors), hydrophilic PTFE filters (for production of semiconductors), filters for chemicals (for chemical treatment), filters for pure water production lines (for production of pure water), and back-washing liquid filters (for treatment of industrial discharge water).

—Consumer Goods Field

Examples of the applications in this field include clothes, cable guides (movable wires for motorcycles), clothes for motor cyclists, cast liners (medical supporters), filters for cleaners, bagpipes (musical instrument), cables (signal cables for guitars, etc.), and strings (for string instrument).

—Textile Field

Examples of the applications in this field include PTFE fibers (fiber materials), machine threads (textiles) weaving yarns (textiles), and ropes.

—Medical Treatment Field

Examples of the applications in this field include implants (stretched articles), artificial blood vessels, catheters, general surgical operations (tissue reinforcing materials), products for head and neck (dura mater alternatives), oral health (tissue regenerative medicine), and orthopedics (bandages).

The polymer (1) may also be used to produce a low-molecular-weight PTFE.

The low-molecular-weight PTFE may be produced by polymerization, or may be produced by reducing the molecular weight of a high-molecular-weight PTFE obtained by polymerization by a known method (e.g., thermolysis, radiolysis).

A low-molecular-weight PTFE having a molecular weight of 600,000 or less (also referred to as PTFE micropowder) has excellent chemical stability and a very low surface energy, and is less likely to generate fibrils, and is therefore suitably used as an additive for improving the lubricity and the texture of the coating surface in production of plastics, inks, cosmetics, coating materials, greases, parts of office automation equipment, and toners (e.g., see Japanese Patent Laid-Open No. 10-147617).

A low-molecular-weight PTFE may also be obtained by dispersing a polymerization initiator and the polymer (1) in an aqueous medium in the presence of a chain transfer agent, and then polymerizing TFE alone or TFE and a monomer copolymerizable with TFE.

In the case of using the low-molecular-weight PTFE obtained by the polymerization in the form of powder, the powder particles may be obtained by coagulating the aqueous dispersion.

The high-molecular-weight PTFE as used herein means a non melt-processible and fibrillatable PTFE. The low-molecular-weight PTFE as used herein means a melt-fabricable and non-fibrillatable PTFE.

The term "non melt-processible" means a feature of polymer that the melt flow rate thereof cannot be measured at a temperature higher than the crystal melting point in conformity with ASTM D-1238 and D-2116.

The presence or absence of the fibrillation ability can be determined by "paste extrusion", a representative method of molding a "high-molecular-weight PTFE powder" which is a powder of a TFE polymer. Usually, the high-molecular-weight PTFE can be paste-extruded when it is fibrillatable. When a non-fired molded product obtained by paste extrusion shows substantially no strength or elongation (for example, when it shows an elongation of 0% and is broken when stretched), it can be regarded as non-fibrillatable.

The high-molecular-weight PTFE preferably has a standard specific gravity (SSG) of 2.130 to 2.280. The standard specific gravity is determined by the water replacement method in conformity with ASTM D-792 using a sample molded in conformity with ASTM D4895-89. The "high-molecular-weight" as used herein means that the standard specific gravity is within the above range.

The low-molecular-weight PTFE has a complex viscosity at 380° C. of $1\times10^2$ to $7\times10^5$ Pa·s. The "low-molecular-weight" as used herein means that the complex viscosity is within the above range.

The high-molecular-weight PTFE has a complex viscosity significantly higher than that of the low-molecular-weight PTFE, and the complex viscosity thereof is difficult to measure accurately. The complex viscosity of the low-molecular-weight PTFE is measurable, but the low-molecular-weight PTFE has difficulty in providing a molded article to be used in measurement of the standard specific gravity. Thus, it is difficult to measure its accurate standard specific gravity. Accordingly, in the present disclosure, the standard specific gravity is used as an index of the molecular weight of the high-molecular-weight PTFE, while the complex viscosity is used as an index of the molecular weight of the low-molecular-weight PTFE. It should be noted that there is no known measuring method for directly specifying the molecular weight of either the high-molecular-weight PTFE or the low-molecular-weight PTFE.

The high-molecular-weight PTFE preferably has a peak temperature of 333 to 347° C., more preferably 335 to 345° C. The low-molecular-weight PTFE preferably has a peak temperature of 322 to 333° C., more preferably 324 to 332° C. The peak temperature is the temperature corresponding to the maximum value on a heat-of-fusion curve with a temperature-increasing rate of 10° C./min using a differential scanning calorimeter (DSC) for a PTFE which has never been heated up to 300° C. or higher.

Preferably, the high-molecular-weight PTFE has at least one endothermic peak in a range of 333 to 347° C. on a heat-of-fusion curve with a temperature-increasing rate of 10° C./min using a differential scanning calorimeter (DSC) for a PTFE which has never been heated up to 300° C. or higher, and has an enthalpy of fusion of 62 mJ/mg or higher at 290 to 350° C. calculated from the heat-of-fusion curve.

The PTFE fine powder obtained by using the polymer (1) may also be used to produce unfired tape (green tape)

The polymer (1), by-products by-produced from the polymer (1), residual monomers, and the like may be collected from discharge water generated in the coagulation or the washing and/or from off gas generated in the drying, and then purified to reuse the polymer (1) the by-products by-produced from the polymer (1), the residual monomers, and the like. The collection and the purification may be performed by known methods, although not limited thereto. For example, they may be performed by the methods disclosed in National Publication of International Patent Application No. 2011-520020.

(II) Melt-Fabricable Fluororesins (1) In the production method of the present disclosure, the polymerization for FEP is preferably performed at a polymerization temperature of 10 to 150° C. and a polymerization pressure of 0.3 to 6.0 MPaG.

FEP preferably has a monomer composition ratio (% by mass) of TFE:HFP=(60 to 98):(2 to 40), more preferably (60 to 95):(5 to 40), and still more preferably (85 to 92):(8 to 15). The FEP may be modified with a perfluoro(alkyl vinyl ether) as a third component within a range of 0.1 to 2% by mass of all monomers.

In the polymerization for FEP, the polymer (1) may be used within the use range of the production method of the present disclosure, and is usually added in an amount of 0.0001 to 10% by mass based on 100% by mass of the aqueous medium.

In the polymerization for FEP, the chain transfer agent used is preferably cyclohexane, methanol, ethanol, propanol, ethane, propane, butane, pentane, hexane, carbon tetrachloride, chloroform, methylene chloride, methyl chloride, or the like, and the pH buffer used is preferably ammonium carbonate, disodium hydrogen phosphate, or the like.

The aqueous dispersion of FEP obtained by the production method of the present disclosure may optionally be subjected to post-treatment such as concentration, and then the concentrate may be dried and powdered, and the powder may be melt-extruded into pellets. The aqueous medium in the FEP aqueous dispersion may optionally contain an additive such as a nonionic surfactant and may contain a water-soluble organic solvent such as a water-soluble alcohol or may be free from a water-soluble organic solvent.

The melt extrusion may be performed under any appropriately set extrusion conditions usually capable of providing pellets.

In the production method of the present disclosure, although the resulting FEP may contain an end group such as $—CF_3$ or $—CF_2H$ on at least one of the polymer main chain and a polymer side chain, it is preferred that the content of thermally unstable groups such as —COOH, $—CH_2OH$, —COF, —CF═CF—, $—CONH_2$, or $—COOCH_3$ (hereinafter, referred to as an "unstable end group") is low or absent.

The unstable end group is chemically unstable, and thus not only reduces the heat resistance of the resin but also causes increase in the attenuation of the resulting electric wire.

The production method of the present disclosure is preferably performed in such a way that a polymer in which the total number of unstable end groups and $—CF_2H$ end groups at the completion of the polymerization is 50 or less per $1×10^6$ carbon atoms is produced. The number of such groups is more preferably less than 20, still more preferably 5 or less, per $1×10^6$ carbon atoms. There may also be neither unstable end groups nor $—CF_2H$ end groups, i.e. all end groups may be $—CF_3$ end groups.

The unstable end groups and the $—CF_2H$ end groups may be fluorinated and converted into the $—CF_3$ end groups and thereby stabilized. Examples of the fluorination method include, but not limited to, methods of exposing the polymer to a fluorine radical source that generates fluorine radicals under fluorination conditions. Examples of the fluorine radical source include fluorine gas, $CoF_3$, $AgF_2$, $UF_6$, $OF_2$, $N_2F_2$, $CF_3OF$, and halogen fluorides such as $IF_5$ and $ClF_3$. Of these, preferred is a method of bringing a fluorination gas and the FEP obtained by the present disclosure into direct contact with each other. In order to control the reaction, the contact is preferably performed using a diluted fluorine gas having a fluorine gas concentration of 10 to 50% by mass. The diluted fluorine gas is obtainable by diluting fluorine gas with an inert gas such as nitrogen gas or argon gas. The fluorine gas treatment may be performed at a temperature of 100 to 250° C. The treatment temperature is not limited to this range and may be appropriately set in accordance with the situation. The fluorine gas treatment is preferably performed by feeding a diluted fluorine gas into the reactor continuously or intermittently. This fluorination may be performed on dry powder after the polymerization or on melt-extruded pellets.

The FEP obtained by the production method of the present disclosure has good moldability and is less likely to cause molding defects, as well as has properties such as heat resistance, chemical resistance, solvent resistance, insulation, and electric properties.

The FEP powder may be produced by a method of drying the FEP obtained by the above-described production method of the present disclosure to powder the FEP.

The powder may be fluorinated. The fluorinated powder may be produced by a method of feeding a fluorine gas to the powder obtained by the above-described method for producing a powder to fluorinate the powder to obtain a fluorinated powder.

The FEP pellets may be produced by a method of pelletizing the FEP obtained by the above-described production method of the present disclosure.

The pellets may be fluorinated. The fluorinated pellets may be produced by a method of feeding a fluorine gas to the pellets obtained by the above-described method for producing pellets to fluorinate the pellets to obtain fluorinated pellets.

Thus, this FEP may be used in production of a variety of molded articles such as coating materials for electric wires, foamed electric wires, cables, and wires, tubes, films, sheets, and filaments.

(2) In the production method of the present disclosure, the polymerization for a TFE/perfluoro(alkyl vinyl ether) copolymer such as PFA or MFA is usually preferably performed at a polymerization temperature of 10 to 100° C. and a polymerization pressure of 0.3 to 6.0 MPaG.

The TFE/perfluoro(alkyl vinyl ether) copolymer preferably has a monomer composition ratio (mol %) of TFE: perfluoro(alkyl vinyl ether)=(90 to 99.7):(0.3 to 10), more preferably (97 to 99):(1 to 3). The perfluoro(alkyl vinyl ether) used is preferably one represented by the formula: $CF_2$═$CFORf^4$, wherein $Rf^4$ is a perfluoroalkyl group having 1 to 6 carbon atoms.

In the polymerization for the TFE/perfluoro(alkyl vinyl ether) copolymer, the polymer (1) may be used within the use range of the production method of the present disclosure, and is usually preferably added in an amount of 0.0001 to 10% by mass based on 100% by mass of the aqueous medium.

In the polymerization for the TFE/perfluoro(alkyl vinyl ether) copolymer, the chain transfer agent used is preferably cyclohexane, methanol, ethanol, propanol, propane, butane, pentane, hexane, carbon tetrachloride, chloroform, methylene chloride, methyl chloride, methane, ethane, or the like, and the pH buffer used is preferably ammonium carbonate, disodium hydrogen phosphate, or the like.

The aqueous dispersion of the TFE/perfluoro(alkyl vinyl ether) copolymer such as PFA or MFA obtained by the production method of the present disclosure may optionally be subjected to post-treatment such as concentration, and then the concentrate may be dried and powdered, and the powder may be melt-extruded into pellets. The aqueous medium in the aqueous dispersion may optionally contain an additive such as a nonionic surfactant and may contain a water-soluble organic solvent such as a water-soluble alcohol or may be free from a water-soluble organic solvent.

The melt extrusion may be performed under any appropriately set extrusion conditions usually capable of providing pellets.

In order to improve the heat resistance of the copolymer and to reinforce a chemical permeation suppression effect of a molded article, the copolymer is preferably subjected to a fluorine gas treatment.

The fluorine gas treatment is performed by bringing fluorine gas into contact with a chemical permeation suppressant. However, since the reaction with fluorine is extremely exothermic, it is preferable to dilute fluorine with an inert gas such as nitrogen. The amount of fluorine in the fluorine gas/inert gas mixture is 1 to 100% by weight, preferably 10 to 25% by weight. The treatment temperature is 150 to 250° C., preferably 200 to 250° C. and the fluorine gas treatment duration is 3 to 16 hours, preferably 4 to 12 hours. The fluorine gas treatment is performed at a gas pressure in the range of 1 to 10 atm, preferably atmospheric pressure. In the case of using a reactor at atmospheric pressure, the fluorine gas/inert gas mixture may be continuously passed through the reactor. This results in conversion of unstable ends of the copolymer into —$CF_3$ ends, thermally stabilizing the copolymer.

The copolymer and the composition thereof may be molded by compression molding, transfer molding, extrusion molding, injection molding, blow molding, or the like as in the case of conventional PFA.

Such a molding technique can provide a desired molded article. Examples of the molded article include sheets, films, packings, round bars, square bars, pipes, tubes, round tanks, square tanks, tanks, wafer carriers, wafer boxes, beakers, filter housings, flowmeters, pumps, valves, cocks, connectors, nuts, electric wires, and heat-resistant electric wires.

Preferred among these are tubes, pipes, tanks, connectors, and the like to be used for a variety of chemical reaction devices, semiconductor manufacturing devices, and acidic or alkaline chemical feeding devices each requiring chemical impermeability.

The aqueous dispersion of a TFE/perfluoro(alkyl vinyl ether) copolymer such as PFA or MFA may also be appropriately mixed with a nonionic surfactant, and optionally polyethersulfone, polyamide-imide, and/or polyimide and metal powder are dissolved or dispersed in an organic solvent. Thereby, a primer composition can be obtained. This primer composition may be used for a method of applying a fluororesin to a metal surface. The method includes applying the primer composition to a metal surface, applying a melt-fabricable fluororesin composition to the resulting primer layer, and firing the melt-fabricable fluororesin composition layer together with the primer layer.

(3) In the production method of the present disclosure, the polymerization for ETFE is preferably performed at a polymerization temperature of 10 to 100° C. and a polymerization pressure of 0.3 to 2.0 MPaG.

The ETFE preferably has a monomer composition ratio (mol %) of TFE:ethylene=(50 to 99):(50 to 1). The ETFE may be modified with a third monomer within a range of 0 to 20% by mass of all monomers. The composition ratio thereof is preferably TFE:ethylene:third monomer=(63 to 94):(27 to 2):(1 to 10). The third monomer is preferably perfluorobutyl ethylene, perfluorobutyl ethylene, 3,3,4,4,5,5,6,6,7,7,8,8,8-tridecafluorooct-1-ene, 2,3,3,4,4,5,5-heptafluoro-1-pentene ($CH_2$=$CFCF_2CF_2CF_2H$), or 2-trifluoromethyl-3,3,3-trifluoropropene ($(CF_3)_2C$=$CH_2$).

In the polymerization for ETFE, the polymer (1) may be used within the use range of the production method of the present disclosure, and is usually added in an amount of 0.0001 to 10% by mass based on 100% by mass of the aqueous medium.

In the polymerization for ETFE, the chain transfer agent used is preferably cyclohexane, methanol, ethanol, propanol, ethane, propane, butane, pentane, hexane, carbon tetrachloride, chloroform, methylene chloride, methyl chloride, or the like.

The aqueous dispersion of ETFE obtained by the production method of the present disclosure may optionally be subjected to post-treatment such as concentration, and then the concentrate may be dried and powdered, and the powder may be melt-extruded into pellets. The aqueous medium in the aqueous dispersion may optionally contain an additive such as a nonionic surfactant and may contain a water-soluble organic solvent such as a water-soluble alcohol or may be free from a water-soluble organic solvent.

The melt extrusion may be performed under any appropriately set extrusion conditions usually capable of providing pellets.

The ETFE may be extrusion-molded into a sheet. In other words, powder or pellets of ETFE in a molten state may be continuously extruded through a die and then cooled to provide a sheet-shaped molded article. The ETFE may be mixed with an additive.

Known additives may be incorporated as appropriate. Specific examples thereof include ultraviolet absorbers, photostabilizers, antioxidants, infrared absorbers, flame retarders, flame-retardant fillers, organic pigments, inorganic pigments, and dyes. From the viewpoint of excellent weather resistance, inorganic additives are preferred.

The content of the additive in the ETFE sheet is preferably 20% by mass or less, and particularly preferably 10% by mass or less, based on the total mass of the ETFE sheet.

The ETFE sheet has excellent mechanical strength and appearance, and thus can suitably be used for film materials (e.g., roof materials, ceiling materials, outer wall materials, inner wall materials, and coating materials) of film-structured buildings (e.g., sports facilities, gardening facilities, and atriums).

In addition to the film materials of film-structured buildings, the ETFE sheet is also useful for, for example, outdoor boards (e.g., noise-blocking walls, windbreak fences, breakwater fences, roof panels of carports, shopping arcades, footpath walls, and roof materials), shatter-resistant window films, heat-resistant waterproof sheets, building materials (e.g., tent materials of warehouse tents, film materials for shading, partial roof materials for skylights, window materials alternative to glass, film materials for flame-retardant partitions, curtains, outer wall reinforcement, waterproof films, anti-smoke films, non-flammable transparent partitions, road reinforcement, interiors (e.g., lighting, wall surfaces, and blinds), exteriors (e.g., tents and signboards)), living and leisure goods (e.g., fishing rods, rackets, golf clubs, and screens), automobile materials (e.g., hoods, damping materials, and bodies), aircraft materials, shipment materials, exteriors of home appliances, tanks, vessel inner walls, filters, film materials for construction works, electronic materials (e.g., printed circuit boards, circuit boards, insulating films, and release films), surface materials for solar cell modules, mirror protection materials for solar thermal energy, and surface materials for solar water heaters.

(4) The production method of the present disclosure may be used to produce an electrolyte polymer precursor. In the production method of the present disclosure, the polymerization for the electrolyte polymer precursor is preferably performed at a polymerization temperature of 10 to 100° C. and a polymerization pressure of 0.1 to 2.0 MPaG. The electrolyte polymer precursor contains a vinyl ether monomer as described below and can be converted into an ion-exchangeable polymer through a hydrolysis treatment.

An example of the vinyl ether monomer to be used for the electrolyte polymer precursor is a fluoromonomer represented by the general formula (150):

$$CF_2{=}CF{-}O{-}(CF_2CFY^{151}{-}O)_n{-}(CFY^{152})_m{-}A^{151}$$

wherein $Y^{151}$ represents a fluorine atom, a chlorine atom, a $-SO_2F$ group, or a perfluoroalkyl group; the perfluoroalkyl group optionally containing ether oxygen and a $-SO_2F$ group; n represents an integer of 0 to 3; n $Y^{151}$s are the same as or different from each other; $Y^{152}$ represents a fluorine atom, a chlorine atom, or a $-SO_2F$ group; m represents an integer of 1 to 5; m $Y^{152}$s are the same as or different from each other; $A^{151}$ represents $-SO_2X^{151}$, $-COZ^{151}$, or $-POZ^{152}Z^{153}$; $X^{151}$ represents F, Cl, Br, I, $-OR^{151}$, or $-NR^{152}R^{153}$; $Z^{151}$, $Z^{152}$, and $Z^{153}$ are the same as or different from each other, and each represent $-NR^{154}R^{155}$ or $-OR^{156}$, and $R^{151}$, $R^{152}$, $R^{153}$, $R^{154}$, $R^{155}$, and $R^{156}$ are the same as or different from each other, and each represent H, ammonium, an alkali metal, or an alkyl group, aryl group, or sulfonyl-containing group optionally containing a fluorine atom. The electrolyte polymer precursor preferably has a monomer composition ratio (mol %) of TFE:vinyl ether=(50 to 99):(50 to 1), more preferably TFE:vinyl ether=(50 to 93):(50 to 7).

The electrolyte polymer precursor may be modified with a third monomer within a range of 0 to 20% by mass of all monomers. Examples of the third monomer include multifunctional monomers such as CTFE, vinylidene fluoride, perfluoroalkyl vinyl ether, and divinylbenzene.

The electrolyte polymer precursor thereby obtained may be molded into a film, followed by hydrolysis using an alkali solution and a treatment using a mineral acid, and thereby used as a polymer electrolyte film for fuel cells, electrolysis devices, redox flow batteries, and the like.

The electrolyte polymer precursor may be hydrolyzed using an alkali solution while the dispersed state thereof is maintained, thereby providing an electrolyte polymer dispersion.

This dispersion may be then heated up to 120° C. or higher in a pressurized vessel and thereby dissolved in, for example, a solvent mixture of water and an alcohol, i.e., converted into a solution state.

The solution thereby obtained may be used as a binder for electrodes. Also, the solution may be combined with a variety of additives and cast to form a film, and the film may be used for antifouling films, organic actuators, or the like.

(5) TFE/VDF copolymer

In the production method of the present disclosure, the polymerization for the TFE/VDF copolymer may be performed at any polymerization temperature, for examples, 0 to 100° C. The polymerization pressure is determined as appropriate in accordance with the other polymerization conditions such as the polymerization temperature, and may be usually 0 to 9.8 MPaG.

The TFE/VDF copolymer preferably has a monomer composition ratio (mol %) of TFE:VDF=(5 to 90):(95 to 10). The TFE/VDF copolymer may be modified with a third monomer within a range of 0 to 50 mol % of all monomers. The composition ratio thereof is preferably TFE:ethylene: third monomer=(30 to 85):(10 to 69.9):(0.1 to 10).

The third monomer is preferably a monomer represented by the formula:

$$CX^{11}X^{12}{=}CX^{13}(CX^{14}X^{15})_{n11}X^{16}$$

wherein $X^{11}$ to $X^{16}$ are the same as or different from each other, and each represent H, F, or Cl; n11 represents an integer of 0 to 8, with the proviso that the third monomer is other than TFE and VDF; or a monomer represented by the formula:

$$CX^{21}X^{22}{=}CX^{23}{-}O(CX^{24}X^{25})_{n21}X^{26}$$

wherein $X^{21}$ to $X^{26}$ are the same as or different from each other, and each represent H, F, or Cl; and n21 represents an integer of 0 to 8.

The third monomer may be a fluorine-free ethylenic monomer. From the viewpoint of maintaining the heat resistance and the chemical resistance, the fluorine-free ethylenic monomer is preferably selected from ethylenic monomers having 6 or less carbon atoms. Examples thereof include ethylene, propylene, 1-butene, 2-butene, vinyl chloride, vinylidene chloride, alkyl vinyl ethers (e.g., methyl vinyl ether, ethyl vinyl ether, and propyl vinyl ether), maleic acid, itaconic acid, 3-butenoic acid, 4-pentenoic acid, vinylsulfonic acid, acrylic acid, and methacrylic acid.

In the polymerization for the TFE/VDF copolymer, the polymer (1) may be used within the use range of the production method of the present disclosure, and is usually added in an amount of 0.0001 to 5% by mass based on 100% by mass of the aqueous medium.

The TFE/VDF copolymer obtained by the polymerization may be amidated by bringing it into contact with a nitrogen compound capable of generating ammonia water, ammonia gas, or ammonia.

The TFE/VDF copolymer obtained by the above-described method may also preferably be used as a material for providing TFE/VDF copolymer fibers by a spinning-drawing method. The spinning-drawing method is a method for obtaining a TFE/VDF copolymer fiber by melt spinning a TFE/VDF copolymer, cooling and solidifying it to obtain an undrawn yarn, and then running the undrawn yarn in a heating cylinder to draw the undrawn yarn.

The TFE/VDF copolymer may be dissolved in an organic solvent to provide a solution of the TFE/VDF copolymer. Examples of the organic solvent include nitrogen-containing organic solvents such as N-methyl-2-pyrrolidone, N,N-dimethyl acetamide, and dimethyl formamide; ketone-based solvents such as acetone, methyl ethyl ketone, cyclohexanone, and methyl isobutyl ketone; ester-based solvents such as ethyl acetate and butyl acetate; ether-based solvents such as tetrahydrofuran and dioxane; and general-purpose organic solvents having a low boiling point such as solvent mixtures thereof. The solution may be used as a binder for batteries.

The aqueous dispersion of the TFE/VDF copolymer may preferably be used to coat a porous base material formed from a polyolefin resin to provide a composite porous film. The aqueous dispersion may also preferably contain inorganic particles and/or organic particles dispersed therein and be used to coat a porous base material to provide a composite porous film. The composite porous film thereby obtained may be used as a separator for lithium secondary batteries.

The powder of the melt-fabricable fluororesin is suitably used as a powdery coating material. When applied to a base material, the powdery coating material made of the melt-fabricable fluororesin powder can provide a film having a smooth surface. The melt-fabricable fluororesin powder having an average particle size of 1 μm or greater and smaller than 100 μm is particularly suitable as a powdery coating material used for electrostatic coating. The melt-fabricable fluororesin powder having an average particle size of 100 μm or greater and 1,000 μm or smaller is particularly suitable as a powdery coating material used for rotational coating or rotational molding.

The melt-fabricable fluororesin powder can be produced by a method of drying the melt-fabricable fluororesin obtained by the production method of the present disclosure described above to powder the melt-fabricable fluororesin. The method for producing the melt-fabricable fluororesin powder is also one aspect of the present disclosure.

(III) Fluoroelastomers

In the production method of the present disclosure, the polymerization reaction for the fluoroelastomer is initiated by charging pure water and the polymer (1) into a pressure-resistant reaction vessel equipped with a stirrer, deoxidizing the system, charging the monomers, increasing the temperature to a predetermined level, and adding a polymerization initiator. The pressure decreases as the reaction progresses, and additional monomers are fed continuously or intermittently to maintain the initial pressure. When the amount of the monomers fed reaches a predetermined level, feeding is stopped, and the monomers in the reaction vessel are purged and the temperature is returned to room temperature, whereby the reaction is completed. In this case, polymer latex can be continuously taken out of the reaction vessel.

In particular, in the case of producing a thermoplastic elastomer as the fluoroelastomer, it is also possible to use a method in which fluoropolymer fine particles are synthesized at a high concentration defined as described above and then diluted for further polymerization as disclosed in International Publication No. WO00/01741, whereby the final polymerization rate can be increased as compared with ordinary polymerization.

The polymerization for the fluoroelastomer may be performed under conditions appropriately selected from the viewpoints of physical properties of the target polymer and control of the polymerization rate, and is performed at a polymerization temperature of usually −20 to 200° C., preferably 5 to 150° C., and a polymerization pressure of usually 0.5 to 10 MPaG, preferably 1 to 7 MPaG. The polymerization medium preferably has a pH usually maintained at 2.5 to 13 using a pH adjuster to be described later by a known method, for example.

Examples of the monomer used in the polymerization for the fluoroelastomer include vinylidene fluoride, as well as fluorine-containing ethylenically unsaturated monomers having fluorine atoms at least as much as the carbon atoms therein and copolymerizable with vinylidene fluoride. Examples of the fluorine-containing ethylenically unsaturated monomers include trifluoropropene, pentafluoropropene, hexafluorobutene, and octafluorobutene. Of these, hexafluoropropene is particularly preferred because of the properties of the elastomer obtained when hexafluoropropene blocks the crystal growth of the polymer. Examples of the fluorine-containing ethylenically unsaturated monomers also include trifluoroethylene, TFE, and CTFE. Fluorine-containing monomers containing one or two or more chlorine and/or bromine substituents may also be used. Perfluoro (alkyl vinyl ethers) such as perfluoro(methyl vinyl ether) may also be used. TFE and HFP are preferred for producing fluoroelastomer.

The fluoroelastomer preferably has a monomer composition ratio (% by mass) of vinylidene fluoride:HFP:TFE=(20 to 70):(20 to 48):(0 to 32), more preferably (20 to 70):(30 to 48):(0 to 32), and still more preferably (32 to 64):(30 to 48):(0 to 27). The fluoroelastomer having this composition ratio exhibits good elastomeric characteristics, chemical resistance, and thermal stability.

In the polymerization for the fluoroelastomer, the polymer (1) may be used within the use range of the production method of the present disclosure, and is usually added in an amount of 0.0001 to 20% by mass, preferably 10% by mass or less, and more preferably 2% by mass or less, based on 100% by mass of the aqueous medium.

In the polymerization for the fluoroelastomer, the polymerization initiator used may be a known inorganic radical polymerization initiator. Examples of particularly useful inorganic radical polymerization initiators include conventionally known water-soluble inorganic peroxides, such as persulfates, perphosphates, perborates, percarbonates or permanganates of sodium, potassium, and ammonium. The radical polymerization initiator may be further activated with a reducing agent such as sulfite, bisulfite, metabisulfite, hyposulfite, thiosulfate, phosphite, or hypophosphite of sodium, potassium, or ammonium or an easily oxidizable metal compound such as an iron(I) salt, a copper(I) salt, or a silver salt. A preferred inorganic radical polymerization initiator is ammonium persulfate. More preferred is combination use of ammonium persulfate and sodium bisulfite in a redox system.

The concentration of the polymerization initiator added is appropriately determined in accordance with the molecular weight of the target fluoropolymer and the polymerization reaction rate, and is set to 0.0001 to 10% by mass, preferably 0.01 to 5% by mass, based on 100% by mass of the total amount of the monomers.

In the polymerization for the fluoroelastomer, a known chain transfer agent may be used, and examples thereof include hydrocarbons, esters, ethers, alcohols, ketones, chlorine compounds, and carbonates. A hydrocarbon, an ester, an ether, an alcohol, a chlorine compound, an iodine compound, or the like may be used as the thermoplastic elastomer, for example. Of these, preferred are acetone and isopropyl alcohol. From the viewpoint of reducing a reaction rate drop in polymerization for a thermoplastic elastomer, isopentane, diethyl malonate, and ethyl acetate are preferred. Diiodine compounds such as $I(CF_2)_4I$, $I(CF_2)_6I$, and $ICH_2I$ are preferred because they can iodize ends of the polymer and allow the resulting polymer to serve as a reactive polymer.

The amount of the chain transfer agent used is usually $0.5\times10^{-3}$ to $5\times10^{-3}$ mol %, preferably $1.0\times10^{-3}$ to $3.5\times10^{-3}$ mol %, based on the total amount of the monomers fed.

Paraffin wax may preferably be used as a stabilizer on the polymerization for the fluoroelastomer, for example. A phosphate, sodium hydroxide, potassium hydroxide, or the like may preferably be used as a pH adjuster in the polymerization for a thermoplastic elastomer, for example.

At completion of the polymerization, the fluoroelastomer obtained by the production method of the present disclosure has a solid concentration of 1.0 to 40% by mass, an average particle size of 0.03 to 1 μm, preferably 0.05 to 0.5 μm, and a number average molecular weight of 1,000 to 2,000,000.

The fluoroelastomer obtained by the production method of the present disclosure may optionally be mixed with a dispersion stabilizer such as a hydrocarbon surfactant or be concentrated, for example, to form a dispersion suitable for rubber molding. The dispersion is subjected to treatments such as pH adjustment, solidification, and heating. The treatments are performed as follows.

The pH adjustment is performed such that a mineral acid such as nitric acid, sulfuric acid, hydrochloric acid, or phosphoric acid and/or a carboxylic acid or the like having 5 or less carbon atoms and having pK=4.2 or lower is added to adjust the pH to 2 or lower.

The solidification is performed by adding an alkaline earth metal salt. Examples of the alkaline earth metal salt include nitrates, chlorates, and acetates of calcium or magnesium.

Although the pH adjustment and the solidification may be performed in any order, the pH adjustment is preferably performed prior to performing the solidification.

These operations are followed by washing with the same volume of water as the fluoroelastomer to remove a small amount of impurities such as buffer solution and salts present in the fluoroelastomer and drying of the fluoroelastomer. The drying is usually performed at about 70 to 200° C. while the air is circulated in a drying furnace at high temperature.

The fluoroelastomer may be either a partially fluorinated elastomer or a perfluoroelastomer.

Examples of the partially fluorinated elastomer include vinylidene fluoride (VdF)-based fluoroelastomers, tetrafluoroethylene (TFE)/propylene (Pr)-based fluoroelastomers, tetrafluoroethylene (TFE)/propylene/vinylidene fluoride (VdF)-based fluoroelastomers, ethylene/hexafluoropropylene (HFP)-based fluoroelastomers, ethylene/hexafluoropropylene (HFP)/vinylidene fluoride (VdF)-based fluoroelastomers, and ethylene/hexafluoropropylene (HFP)/tetrafluoroethylene (TFE)-based fluoroelastomers. Of these, the partially fluorinated elastomer is preferably at least one selected from the group consisting of vinylidene fluoride-based fluoroelastomers and tetrafluoroethylene/propylene-based fluoroelastomers.

The vinylidene fluoride-based fluoroelastomer is preferably a copolymer containing 45 to 85 mol % of vinylidene fluoride and 55 to 15 mol % of at least one monomer copolymerizable with and different from vinylidene fluoride. The vinylidene fluoride-based fluoroelastomer is more preferably a copolymer containing 50 to 80 mol % of vinylidene fluoride and 50 to 20 mol % of at least one monomer copolymerizable with and different from vinylidene fluoride.

Examples of the at least one monomer copolymerizable with and different from vinylidene fluoride include monomers such as tetrafluoroethylene (TFE), hexafluoropropylene (HFP), fluoroalkyl vinyl ethers, chlorotrifluoroethylene (CTFE), trifluoroethylene, trifluoropropylene, pentafluoropropylene, trifluorobutene, tetrafluoroisobutene, hexafluoroisobutene, vinyl fluoride, a fluoromonomer represented by the general formula (100): $CH_2{=}CFRf^{101}$ (wherein $Rf^{101}$ is a linear or branched fluoroalkyl group having 1 to 12 carbon atoms), a fluoromonomer represented by the general formula (170): $CH_2{=}CH—(CF_2)_n—X^{171}$ (wherein $X^{171}$ is H or F; and n is an integer of 3 to 10), and a monomer that provides a crosslinking site; and non-fluorinated monomers such as ethylene, propylene, and alkyl vinyl ethers. These may be used alone or in any combination thereof. Of these, preferred is at least one selected from the group consisting of TFE, HFP, fluoroalkyl vinyl ether, and CTFE. The fluoroalkyl vinyl ether is preferably a fluoromonomer represented by the general formula (160).

Specific examples of the vinylidene fluoride-based fluoroelastomers include VdF/HFP-based rubber, VdF/HFP/TFE-based rubber, VdF/CTFE-based rubber, VdF/CTFE/TFE-based rubber, rubber based on VDF and a fluoromonomer represented by the general formula (100), rubber based on VDF, a fluoromonomer represented by the general formula (100), and TFE, rubber based on VDF and perfluoro(methyl vinyl ether) (PMVE), VDF/PMVE/TFE-based rubber, and VDF/PMVE/TFE/HFP-based rubber. The rubber based on VDF and a fluoromonomer represented by the general formula (100) is preferably VDF/$CH_2{=}CFCF_3$-based rubber. The rubber based on VDF, a fluoromonomer represented by the formula (100), and TFE is preferably VDF/TFE/$CH_2{=}CFCF_3$-based rubber.

The VDF/$CH_2{=}CFCF_3$-based rubber is preferably a copolymer containing 40 to 99.5 mol % of VDF and 0.5 to 60 mol % of $CH_2{=}CFCF_3$, more preferably a copolymer containing 50 to 85 mol % of VDF and 20 to 50 mol % of $CH_2{=}CFCF_3$.

The tetrafluoroethylene/propylene-based fluoroelastomer is preferably a copolymer containing 45 to 70 mol % of tetrafluoroethylene, 55 to 30 mol % of propylene, and 0 to 5 mol % of a fluoromonomer that provides a crosslinking site.

The fluoroelastomer may be a perfluoroelastomer. The perfluoroelastomer is preferably at least one selected from the group consisting of perfluoroelastomers containing TFE, such as a copolymer containing TFE and a fluoromonomer represented by the general formula (160), (130), or (140) and a copolymer containing TFE, a fluoromonomer represented by the general formula (160), (130), or (140), and a monomer that provides a crosslinking site.

In the case of the TFE/PMVE copolymer, the composition ratio thereof is preferably 45 to 90/10 to 55 (mol %), more preferably 55 to 80/20 to 45, and still more preferably 55 to 70/30 to 45.

In the case of the copolymer of TFE, PMVE, and a monomer that provides a crosslinking site, the composition ratio thereof is preferably 45 to 89.9/10 to 54.9/0.01 to 4 (mol %), more preferably 55 to 77.9/20 to 49.9/0.1 to 3.5, and still more preferably 55 to 69.8/30 to 44.8/0.2 to 3.

In the case of the copolymer of TFE and a fluoromonomer represented by the general formula (160), (130), or (140) having 4 to 12 carbon atoms, the composition ratio thereof is preferably 50 to 90/10 to 50 (mol %), more preferably 60 to 88/12 to 40, and still more preferably 65 to 85/15 to 35.

In the case of the copolymer of TFE, a fluoromonomer represented by the general formula (160), (130), or (140) having 4 to 12 carbon atoms, and a monomer that provides a crosslinking site, the composition ratio thereof is preferably 50 to 89.9/10 to 49.9/0.01 to 4 (mol %), more preferably 60 to 87.9/12 to 39.9/0.1 to 3.5, and still more preferably 65 to 84.8/15 to 34.8/0.2 to 3.

When these copolymers have compositional features outside these ranges, the properties as a rubber elastic body are lost, and the properties tend to be close to those of a resin.

The perfluoroelastomer is preferably at least one selected from the group consisting of copolymers of TFE, a fluoromonomer represented by the general formula (140), and a fluoromonomer that provides a crosslinking site, copolymers of TFE and a perfluorovinyl ether represented by the general formula (140), copolymers of TFE and a fluoromonomer represented by the general formula (160), and copolymers of TFE, a fluoromonomer represented by the general formula (160), and a monomer that provides a crosslinking site.

Examples of the perfluoroelastomer further include the perfluoroelastomers disclosed in documents such as International Publication No. WO97/24381, Japanese Patent Publication No. 61-57324, Japanese Patent Publication No. 04-81608, and Japanese Patent Publication No. 05-13961.

From the viewpoint of achieving an excellent compression set at high temperature, the fluoroelastomer preferably has a glass transition temperature of −70° C. or higher, more preferably −60° C. or higher, and still more preferably −50° C. or higher. From the viewpoint of achieving good cold resistance, the glass transition temperature is preferably 5° C. or lower, more preferably 0° C. or lower, and still more preferably −3° C. or lower.

The glass transition temperature can be determined as follows. Specifically, using a differential scanning calorimeter (DSC822e, manufactured by Mettler-Toledo International Inc.), 10 mg of a sample is heated at a rate of 10° C./min to give a DSC curve, and the temperature is read at the midpoint of two intersections between each of the extension lines of the base lines before and after the secondary transition of the DSC curve and the tangent line at the inflection point of the DSC curve.

From the viewpoint of achieving good heat resistance, the fluoroelastomer preferably has a Mooney viscosity ML(1+20) at 170° C. of 30 or higher, more preferably 40 or higher, and still more preferably 50 or higher. From the viewpoint of achieving good processability, the Mooney viscosity is preferably 150 or lower, more preferably 120 or lower, and still more preferably 110 or lower.

From the viewpoint of achieving good heat resistance, the fluoroelastomer preferably has a Mooney viscosity ML(1+20) at 140° C. of 30 or higher, more preferably 40 or higher, and still more preferably 50 or higher. From the viewpoint of achieving good processability, the Mooney viscosity is preferably 180 or lower, more preferably 150 or lower, and still more preferably 110 or lower.

From the viewpoint of achieving good heat resistance, the fluoroelastomer preferably has a Mooney viscosity ML(1+10) at 100° C. of 10 or higher, more preferably 20 or higher, and still more preferably 30 or higher. From the viewpoint of achieving good processability, the Mooney viscosity is preferably 120 or lower, more preferably 100 or lower, and still more preferably 80 or lower.

The Mooney viscosity can be determined using a Mooney viscometer MV2000E manufactured by Alpha Technologies Inc. at 170° C., 140° C., or 100° C. in conformity with JIS K 6300.

The fluoroelastomer obtained by the production method of the present disclosure may be in any form as long as it is obtainable by the polymerization. The fluoroelastomer may be in the form of an aqueous dispersion as polymerized, or may be used in the form of a gum or a crumb obtained by conventionally known coagulation, drying, and any other treatment on the aqueous dispersion as polymerized. The surfactant used in the production method of the present disclosure can improve the stability of the aqueous dispersion, and is more preferably used in a polymerization method in which substances insoluble in water such as an initiator, including an organic peroxide, and a chain transfer agent, including an iodine or bromine compound, are added during the polymerization defined as described above.

The gum is a small particulate mass of the fluoroelastomer. The crumb is an amorphous mass of the fluoroelastomer resulting from fusion of particles that cannot maintain the form of small particles as gum at room temperature.

The fluoroelastomer may be mixed with an additive such as a curing agent and a filler to be processed into a fluoroelastomer composition.

Examples of the curing agent include polyols, polyamines, organic peroxides, organotins, bis(aminophenol)tetraamine, and bis(thioaminophenol).

The fluoroelastomer composition is made of the above fluoroelastomer, and thus is substantially free from an emulsifier and is excellent in that it is easily crosslinked during molding.

The fluoroelastomer may be molded to form a fluoroelastomer molded body. The molding may be performed by any method such as a known method using the above-mentioned curing agent.

The fluoroelastomer molded body is suitable for seals, gaskets, electric wire coatings, hoses, tubes, laminated products, and accessories, particularly parts for semiconductor manufacturing devices and automobile parts.

The polymerization usually provides an aqueous dispersion containing the fluoropolymer. The fluoropolymer is usually at a concentration of 8 to 50% by mass in the aqueous dispersion obtained by the polymerization. In the aqueous dispersion, the lower limit of the concentration of the fluoropolymer is preferably 10% by mass, more preferably 15% by mass, while the upper limit thereof is preferably 40% by mass, more preferably 35% by mass.

The aqueous dispersion obtained by the polymerization may be concentrated or subjected to dispersion stabilization treatment to form a dispersion, or may be subjected to coagulation or agglomeration, and collected and dried into powder or other solid.

The polymer (1) may also be suitably used as a dispersant for dispersing the fluoropolymer obtained by the polymerization in an aqueous medium.

The polymerization usually provides an aqueous dispersion containing particles of the fluoropolymer, the polymer (1), and the aqueous medium. The aqueous dispersion contains particles of the fluoropolymer dispersed in an aqueous medium in the presence of the surfactant.

The polymer (1) is preferably 0.0001 to 15% by mass based on the aqueous dispersion. When the amount of the polymer (1) is less than 0.0001% by mass, the dispersion stability may deteriorate, and when the amount thereof is more than 15% by mass, dispersion effects commensurate with the amount thereof may not be obtained, which is impractical. The lower limit of the surfactant is more preferably 0.001% by mass, while the upper limit thereof is more preferably 10% by mass, still more preferably 2% by mass.

The aqueous dispersion may be any of an aqueous dispersion obtained by the polymerization described above, a dispersion obtained by concentrating this aqueous dispersion or subjecting the aqueous dispersion to dispersion stabilization treatment, and an aqueous dispersion obtained by dispersing powder of the fluoropolymer into an aqueous medium in the presence of the polymer (1).

The aqueous dispersion may also be produced as a purified aqueous dispersion by a method including a step (I) of bringing the aqueous dispersion obtained by the polymerization into contact with an anion exchange resin or a mixed bed containing an anion exchange resin and a cation exchange resin in the presence of a nonionic surfactant (I), and/or a step (II) of concentrating the aqueous dispersion obtained by this step such that the solid concentration is 30 to 70% by mass based on 100% by mass of the aqueous dispersion (II). The nonionic surfactant may be, but is not limited to, any of those to be described later. The anion exchange resin to be used may be, but is not limited to, a known one. The contact with the anion exchange resin may be performed by a known method.

A method for producing the aqueous dispersion may include subjecting the aqueous dispersion obtained by the polymerization to the step (I), and subjecting the aqueous dispersion obtained in the step (I) to the step (II) to produce a purified aqueous dispersion. The step (II) may also be carried out without carrying out the step (I) to produce a purified aqueous dispersion. Further, the step (I) and the step (II) may be repeated or combined.

Examples of the anion exchange resin include known ones such as a strongly basic anion exchange resin containing as a functional group a —$N^+X^-$ $(CH_3)_3$ group (wherein X represents Cl or OH) or a strongly basic anion exchange resin containing a —$N^+X^-$ $(CH_3)_3(C_2H_4OH)$ group (wherein X is as described above). Specific examples thereof include those described in International Publication No. WO99/062858, International Publication No. WO03/020836, International Publication No. WO2004/078836, International Publication No. WO2013/027850, and International Publication No. WO2014/084399.

Examples of the cation exchange resin include, but are not limited to, known ones such as a strongly acidic cation exchange resin containing as a functional group a —$SO_3^-$ group and a weakly acidic cation exchange resin containing as a functional group a —$COO^-$ group. Of these, from the viewpoint of removal efficiency, a strongly acidic cation exchange resin is preferred, a $H^+$ form strongly acidic cation exchange resin is more preferred.

The "mixed bed containing a cation exchange resin and an anion exchange resin" encompasses, but is not limited to, those in which the resins are filled into a single column, those in which the resins are filled into different columns, and those in which the resins are dispersed in an aqueous dispersion.

The concentration may be carried out by a known method. Specific examples include those described in International Publication No. WO2007/046482 and International Publication No. WO2014/084399.

Examples thereof include phase separation, centrifugal sedimentation, cloud point concentration, electric concentration, electrophoresis, filtration treatment using a reverse osmosis membrane (RO membrane), and nanofiltration treatment. The concentration may concentrate the fluoropolymer concentration to be 30 to 70% by mass in accordance with the application thereof. The concentration may impair the stability of the dispersion. In such a case, a dispersion stabilizer may be further added. The dispersion stabilizer added may be the polymer (1), the nonionic surfactant, or any of other various surfactants. The nonionic surfactant is the same as the nonionic surfactant exemplified as the nucleating agent described above, and can be appropriately selected from the nonionic surfactants described above.

Also, the cloud point of the nonionic surfactant is a measure of its solubility in water. The surfactant used in the aqueous dispersion has a cloud point of about 30° C. to about 90° C., preferably about 35° C. to about 85° C.

The total amount of the dispersion stabilizer is 0.5 to 20% by mass in terms of concentration, based on the solid of the dispersion. When the amount of the dispersion stabilizer is less than 0.5% by mass, the dispersion stability may deteriorate, and when the amount thereof is more than 20% by mass, dispersion effects commensurate with the amount thereof may not be obtained, which is impractical. The lower limit of the amount of the dispersion stabilizer is more preferably 2% by mass, while the upper limit thereof is more preferably 12% by mass.

The polymer (1) may be removed by the concentration operation.

The aqueous dispersion obtained by the polymerization may also be subjected to a dispersion stabilization treatment without concentration depending on the application, to prepare an aqueous dispersion having a long pot life. Examples of the dispersion stabilizer used include the same as those described above.

Examples of the applications of the aqueous dispersion include, but are not limited to, those in which the aqueous dispersion is directly used, such as coating achieved by applying the aqueous dispersion to a base material, drying the dispersion, and optionally firing the workpiece; impregnation achieved by impregnating a porous support such as nonwoven fabric or a resin molded article with the aqueous dispersion, drying the dispersion, and preferably firing the workpiece; and casting achieved by applying the aqueous dispersion to a base material such as glass, drying the dispersion, optionally immersing the workpiece into water to remove the base material and to thereby provide a thin film. Examples of such applications include aqueous dispersion-type coating materials, tent membranes, conveyor belts, printed circuit boards (CCL), binders for electrodes, and water repellents for electrodes.

The aqueous dispersion may be used in the form of an aqueous coating material for coating by mixing with a known compounding agent such as a pigment, a thickener, a dispersant, a defoaming agent, an antifreezing agent, a film-forming aid, or by compounding another polymer compound.

In addition, the aqueous dispersion may be used for additive applications, for example, for a binder application for preventing the active material of an electrode from falling off, for a compound application such as a drip inhibitor, or for a dust suppression treatment application for preventing floating of sand and dust, and the like.

For the purpose of adjusting the viscosity of the aqueous dispersion or improving the miscibility with a pigment or filler, the aqueous dispersion may preferably contain an anionic surfactant. The anionic surfactant may be appropriately added to an extent that causes no problems from the economic and environmental viewpoints.

Examples of the anionic surfactant include non-fluorinated anionic surfactants and fluorine-containing anionic surfactants. Preferred are fluorine-free, non-fluorinated anionic surfactants, i.e., hydrocarbon anion surfactants.

For the purpose of adjusting the viscosity, any known anionic surfactants may be used, for example, anionic surfactants disclosed in International Publication No. WO2013/146950 and International Publication No. WO2013/146947. Examples thereof include those having a saturated or unsaturated aliphatic chain having 6 to 40 carbon atoms, preferably 8 to 20 carbon atoms, and more preferably 9 to 13 carbon atoms. The saturated or unsaturated aliphatic chain may be either linear or branched, or may have a cyclic structure. The hydrocarbon may have aromaticity, or may have an aromatic group. The hydrocarbon may contain a hetero atom such as oxygen, nitrogen, or sulfur.

Examples of the anionic surfactants include alkyl sulfonates, alkyl sulfates, and alkyl aryl sulfates, and salts thereof; aliphatic (carboxylic) acids and salts thereof; and phosphoric acid alkyl esters and phosphoric acid alkyl aryl esters, and salts thereof. Of these, preferred are alkyl sulfonates, alkyl sulfates, and aliphatic carboxylic acids, or salts thereof.

Preferred examples of the alkyl sulfates or salts thereof include ammonium lauryl sulfate and sodium lauryl sulfate.

Preferred examples of the aliphatic carboxylic acids or salts thereof include succinic acid, decanoic acid, undecanoic acid, undecenoic acid, lauric acid, hydrododecanoic acid, or salts thereof.

The amount of the anionic surfactant added depends on the types of the anion surfactant and other compounding agents, and is preferably 10 ppm to 5,000 ppm based on the mass of the solid of the fluoropolymer.

The lower limit of the amount of the anionic surfactant added is more preferably 50 ppm or more, still more preferably 100 ppm or more. Too small an amount of the anionic surfactant may result in a poor viscosity adjusting effect.

The upper limit of the amount of the anionic surfactant added is more preferably 3,000 ppm or less, still more preferably 2,000 ppm or less. Too large an amount of the anionic surfactant may impair mechanical stability and storage stability of the aqueous dispersion.

For the purpose of adjusting the viscosity of the aqueous dispersion, components other than the anionic surfactants, such as methyl cellulose, alumina sol, polyvinyl alcohol, and carboxylated vinyl polymers may also be added.

For the purpose of adjusting the pH of the aqueous dispersion, a pH adjuster such as aqueous ammonia may also be added.

The aqueous dispersion may optionally contain other water soluble polymer compounds to an extent that does not impair the characteristics of the aqueous dispersion.

Examples of the other water soluble polymer compound include, but are not limited to, polyethylene oxide (dispersion stabilizer), polyethylene glycol (dispersion stabilizer), polyvinylpyrrolidone (dispersion stabilizer) phenol resin, urea resin, epoxy resin, melamine resin, polyester resin, polyether resin, silicone acrylic resin, silicone resin, silicone polyester resin, and polyurethane resin. The aqueous dispersion may further contain a preservative, such as isothiazolone-based, azole-based, pronopol, chlorothalonil, methylsulfonyltetrachloropyridine, carbendazim, fluorfolpet, sodium diacetate, and diiodomethylparatolylsulfone.

The polymer (1), decomposition products and by-products of the polymer (1) by-produced from the polymer (1), residual monomers, and the like may be collected from discharge water generated in the coagulation or the washing and/or from off gas generated in the drying, and then purified to reuse the polymer (1), the decomposition products and by-products of the polymer (1) by-produced from the polymer (1), the residual monomers, and the like. The collection and the purification may be performed by known methods, although not limited thereto. For example, they may be performed by the methods disclosed in National Publication of International Patent Application No. 2011-520020.

The collection of the polymer (1), the decomposition products and by-products of the polymer (1) by-produced from the polymer (1), the residual monomers, and the like from discharge water generated in the coagulation, discharge water generated in the washing, and off gas generated in the drying and the purification thereof may be performed by any conventionally known methods, although not limited thereto, such as the methods disclosed in U.S. Patent Application Publication No. 2007/0015937, U.S. Patent Application Publication No. 2007/0025902, and U.S. Patent Application Publication No. 2007/0027251. Specific examples of the methods are as follows.

An example of the method of collecting the polymer (1), the decomposition products and by-products of the polymer (1) by-produced from the polymer (1), the residual monomers, and the like from discharge water is a method in which the discharge water is brought into contact with adsorbent particles formed of ion exchange resin, activated carbon, silica gel, clay, zeolite, or the like, so that the particles are allowed to adsorb the polymer (1) and the others, and then the discharge water and the adsorbent particles are separated. Incinerating the adsorbent particles having adsorbed the polymer (1) and the others can prevent emission of the polymer (1) and the others into the environment.

Alternatively, the polymer (1) and the others may be removed and eluted by a known method from the ion exchange resin particles having adsorbed the polymer (1) and the others, and collected. For example, in the case of using anion exchange resin particles as the ion exchange resin particles, the polymer (1) and the others can be eluted by bringing a mineral acid into contact with an anion exchange resin. When a water-soluble organic solvent is added to the resulting eluate, the mixture is usually separated into two phases. Since the lower phase contains the polymer (1) and the others, it is possible to collect the polymer (1) and the others by collecting and neutralizing the lower phase. Examples of the water-soluble organic solvent include polar solvents such as alcohols, ketones, and ethers.

Other methods of collecting the polymer (1) and the others from ion exchange resin particles include a method of using an ammonium salt and a water-soluble organic solvent and a method of using an alcohol and, if necessary, an acid. In the latter method, ester derivatives of the polymer (1) and the others are generated, and they can easily be separated from the alcohol by distillation.

When the discharge water contains fluoropolymer particles and other solids, they are preferably removed before the discharge water and the adsorbent particles are brought into contact with each other. Examples of methods of removing the fluoropolymer particles and other solids include a method of adding an aluminum salt, for example, to deposit these components, and then separating the discharge water and the deposits, and an electrocoagulation method. The components may also be removed by a mechanical method, and examples thereof include a crossflow filtration method, a depth filtration method, and a precoat filtration method.

From the viewpoint of productivity, the discharge water preferably contains the fluoropolymer in a non-agglomerated form in a low concentration, more preferably less than 0.4% by mass, and particularly preferably less than 0.3% by mass.

An example of the method of collecting the polymer (1) and the others from the off gas is a method in which a scrubber is brought into contact with deionized water, an alkaline aqueous solution, an organic solvent such as a glycol ether solvent, or the like to provide a scrubber solution containing the surfactant and the others. When the alkaline aqueous solution used is a highly concentrated alkaline aqueous solution, the scrubber solution can be collected in a state where the polymer (1) and the others are phase-separated, and thus the polymer (1) and the others can be easily collected and reused. Examples of the alkali compound include alkali metal hydroxides and quaternary ammonium salts.

The scrubber solution containing the polymer (1) and the others may be concentrated using a reverse osmosis membrane, for example. The concentrated scrubber solution usually contains fluoride ions. Still, the fluoride ions may be removed by adding alumina after the concentration so that the polymer (1) and the others can easily be reused. Alternatively, the scrubber solution may be brought into contact with adsorbent particles so that the adsorbent particles can adsorb the polymer (1) and the others, and thereby the polymer (1) and the others may be collected by the aforementioned method.

The polymer (1) and the others collected by any of the methods may be reused in the production of fluoropolymer.

The present disclosure also relates to use of a polymer for production of a fluoropolymer by polymerizing a fluoromonomer in an aqueous medium, the polymer being a polymer (1) comprising a polymerized unit (1) derived from a monomer represented by the following general formula (1):

$$CX_2{=}CY(—CZ_2—O—Rf\text{-}A) \quad (1)$$

wherein X is the same or different and is —H or —F; Y is —H, —F, an alkyl group, or a fluorine-containing alkyl group; Z is the same or different and is —H, —F, an alkyl group, or a fluoroalkyl group; Rf is a fluorine-containing alkylene group having 1 to 40 carbon atoms or a fluorine-containing alkylene group having 2 to 100 carbon atoms and having an ether bond; and A is —COOM, —$SO_3$M, or —$OSO_3$M, wherein M is —H, a metal atom, —$NR^7_4$, imidazolium optionally having a substituent, pyridinium optionally having a substituent, or phosphonium optionally having a substituent, wherein $R^7$ is H or an organic group, with the proviso that at least one of X, Y, and Z contains a fluorine atom.

The aqueous medium, the fluoromonomer, and the fluoropolymer are preferably the same as those that can be used in the production method of the present disclosure. A preferred constitution of the polymer (1) is the same as that of the polymer (1) used in the production method of the present disclosure.

The present disclosure also relates to a composition comprising a fluoropolymer and a polymer (1) comprising a polymerized unit (1) derived from a monomer represented by the following general formula (1):

$$CX_2{=}CY(—CZ_2—O—Rf\text{-}A) \quad (1)$$

wherein X is the same or different and is —H or —F; Y is —H, —F, an alkyl group, or a fluorine-containing alkyl group; Z is the same or different and is —H, —F, an alkyl group, or a fluoroalkyl group; Rf is a fluorine-containing alkylene group having 1 to 40 carbon atoms or a fluorine-containing alkylene group having 2 to 100 carbon atoms and having an ether bond; and A is —COOM, —$SO_3$M, or —$OSO_3$M, wherein M is —H, a metal atom, —$NR^7_4$, imidazolium optionally having a substituent, pyridinium optionally having a substituent, or phosphonium optionally having a substituent, wherein $R^7$ is H or an organic group, with the proviso that at least one of X, Y, and Z contains a fluorine atom.

In the composition of the present disclosure, the polymerized unit (1) is preferably a polymerized unit (1A) derived from a monomer represented by the following general formula (1A):

$$CH_2{=}CF(—CF_2—O—Rf\text{-}A) \quad (1A)$$

wherein Rf and A are as described above.

The fluoropolymer may be any fluoropolymer different from the polymer (1) and is preferably the same as those that can be used in the production method of the present disclosure, more preferably a fluororesin, still more preferably a fluororesin having a fluorine substitution percentage described above of 50% or higher, further preferably a fluororesin having the fluorine substitution percentage of higher than 50%, further preferably a fluororesin having the fluorine substitution percentage of 55% or higher, further preferably a fluororesin having the fluorine substitution percentage of 60% or higher, further preferably a fluororesin having the fluorine substitution percentage of 75% or higher, particularly preferably a fluororesin having the fluorine substitution percentage of 80% or higher, and most preferably a fluororesin having the fluorine substitution percentage of 90 to 100%, i.e., a perfluororesin.

The perfluororesin is more preferably a fluororesin having the fluorine substitution percentage of 95 to 100%, still more preferably PTFE, FEP, or PFA, and particularly preferably PTFE.

In other words, in the composition, the fluoropolymer is preferably polytetrafluoroethylene. Further, the above PTFE is more preferably modified PTFE from the viewpoint of the stability of the aqueous dispersion and the yield thereof.

A preferred constitution of the polymer (1) is the same as that of the polymer (1) used in the production method of the present disclosure.

An embodiment of the composition of the present disclosure may be in the form of an aqueous dispersion, powder, or pellets. The aqueous dispersion may be a dispersion as polymerized, or may be one obtained by processing the dispersion as polymerized. For example, a nonionic surfactant may be added to the aqueous dispersion for mechanical stability and storage stability. The amount of nonionic surfactant added is preferably 0.5 to 25% by mass based on the fluoropolymer. The lower limit thereof is more preferably 1% by mass, further preferably 3% by mass, while the upper limit thereof is more preferably 20% by mass, still more preferably 15% by mass, further preferably 10% by mass.

The aqueous dispersion is a dispersion system in which an aqueous medium serves as a dispersion medium and the fluoropolymer serves as a dispersoid. The aqueous medium may be any liquid containing water, and may contain, in addition to water, an organic solvent such as an alcohol, an ether, a ketone, or paraffin wax.

The lower limit value of the content of the polymer (1) in the composition is preferably 0.0001% by mass, more preferably 0.001% by mass, still more preferably 0.01% by mass, and particularly preferably 0.1% by mass based on the fluoropolymer. The upper limit value thereof is preferably 20% by mass, more preferably 10% by mass, still more preferably 6% by mass, further preferably 4% by mass, still further preferably 2% by mass or less, particularly preferably 1.5% by mass or less, and most preferably 1% by mass or less.

The content of the polymer (1) can be determined herein by solid-state NMR measurement.

Examples of a method for measuring the content of the polymer (1) include methods for measuring the content of the polymer disclosed in International Publication No. WO2014/099453, International Publication No. WO2010/075497, International Publication No. WO2010/075496, International Publication No. WO2011/008381, International Publication No. WO2009/055521, International Publication No. WO1987/007619, Japanese Patent Laid-Open No. 61-293476, International Publication No. WO2010/075494, International Publication No. WO2010/075359, International Publication No. WO2012/082454, International Publication NO. WO2006/119224, International Publication No. WO2013/085864, International Publication No. WO2012/082707, International Publication No. WO2012/082703, International Publication No. WO2012/082454, International Publication No. WO2012/082451, International Publication No. WO2006/135825, International Publication No. WO2004/067588, International Publication No. WO2009/068528, Japanese Patent Laid-Open No. 2004-075978, Japanese Patent Laid-Open No. 2001-226436, International Publication No. WO1992/017635, International Publication No. WO2014/069165, Japanese Patent Laid-Open No. 11-181009, and the like.

The content of the polymer (1) in the composition can be determined by, for example, solid-state $^{19}$F-MAS NMR measurement.

Specific examples of the device used therefor include AVANCE III HD400 manufactured by Bruker and AVANCE300 manufactured by Bruker.

The rotation speed is set according to the resonance frequency of the device, and is set such that the spinning side band does not overlap the peaks used for the content calculation of the fluoropolymer or the polymer (1).

The present disclosure also relates to a molded body comprising the composition. The molded body is preferably a stretched body, and examples of the stretched body include, but are not limited to, yarns, tubes, tapes, and films (e.g., uniaxially stretched films and biaxially stretched films) .

In the composition of the present disclosure, the fluoropolymer is preferably polytetrafluoroethylene.

Hereinafter, in the composition of the present disclosure, the case where the fluoropolymer is polytetrafluoroethylene will be described in more detail.

The composition of the present disclosure is a composition comprising polytetrafluoroethylene and the polymer (1). The content of the polymer (1) is preferably 0.0001% by mass or more and 20% by mass or less based on polytetrafluoroethylene. In the composition of the present disclosure, the lower limit of the content of the polymer (1) is more preferably 0.001% by mass, still more preferably 0.01% by mass, and particularly preferably 0.1% by mass based on polytetrafluoroethylene. The upper limit value thereof is more preferably 10% by mass, still more preferably 6% by mass, further preferably 4% by mass, still further preferably 2% by mass or less, particularly preferably 1.5% by mass or less, and most preferably 1% by mass or less.

The content of the polymer (1) can be determined by solid-state NMR measurement.

For example, when the polymer (1) in the composition is a copolymer of TFE and a monomer represented by $CH_2{=}CF(CF_2OCFCF_3COONH_4)$ and the content of the copolymer of TFE and the monomer represented by $CH_2{=}CF(CF_2OCFCF_3COONH_4)$ in the composition is determined, the rotation speed may be set to 30 kHz when using AVANCE300 manufactured by Bruker Japan KK.

For example, when the polymer (1) in the composition is a copolymer of TFE and a monomer represented by $CH_2{=}CF(CF_2OCFCF_3COONH_4)$, the content of the copolymer of TFE and the monomer represented by $CH_2{=}CF(CF_2OCFCF_3COONH_4)$ in the composition can be determined from the spectrum obtained by solid-state $^{19}$F-MAS NMR measurement (rotation speed 30 kHz) using the following formula.

$$Y=(400B/(5xA+3xB))\times 100$$

Y: content of copolymer of TFE and monomer represented by $CH_2{=}CF(CF_2OCFCF_3COONH_4)$ (mol %)

A: integration value of signal at −120 ppm

B: sum of integration values of $CF_2$ and $CF_3$ signals at −83 ppm

The chemical shift value used was that when the peak top of the signal derived from the main chain of PTFE was −120 ppm.

x: ratio (mol %) of polymerized unit derived from the monomer represented by $CH_2{=}CF(CF_2OCFCF_3COONH_4)$ in the copolymer of TFE and the monomer represented by $CH_2{=}CF(CF_2OCFCF_3COONH_4)$.

In the composition of the present disclosure, the total amount of polytetrafluoroethylene and the polymer (1) is preferably 90% by mass or more, more preferably 99% by mass or more, and still more preferably substantially 100% by mass.

In the composition of the present disclosure, the polytetrafluoroethylene is more preferably a modified polytetrafluoroethylene.

The polytetrafluoroethylene preferably has an aspect ratio of primary particles of less than 2.00, more preferably 1.90 or less, still more preferably 1.80 or less, further preferably 1.70 or less, still further preferably 1.60 or less, and particularly preferably 1.50 or less. The aspect ratio is more preferably 1.45 or less, still more preferably 1.40 or less, further preferably 1.35 or less, still further preferably 1.30 or less, particularly preferably 1.20 or less, and most preferably 1.10 or less.

When the aspect ratio is measured using an aqueous dispersion, the aqueous dispersion of PTFE is diluted to have a solid concentration of about 1% by mass and observed by a scanning electron microscope (SEM), and 400 or more randomly extracted particles are subjected to image processing, and the aspect ratio is obtained from the average of the ratios of the major axis to the minor axis thereof.

When the aspect ratio is measured using powder, the PTFE powder is irradiated with an electron beam, added into an aqueous solution of a fluorosurfactant, and then redispersed with ultrasonic waves to obtain a PTFE aqueous dispersion, and the aspect ratio is determined from this PTFE aqueous dispersion by the same method as the method of measuring using an aqueous dispersion.

The composition of the present disclosure can also be suitably used as a material for forming a stretched body (stretching material). In other words, the composition of the present disclosure is preferably stretchable.

In the composition of the present disclosure, the content of the polymer (1) is preferably 0.0001% by mass or more and 20% by mass or less based on polytetrafluoroethylene, and the composition is preferably stretchable.

When used as a stretching material, the composition of the present disclosure is preferably in the form of powder.

The term "stretchable" as used herein is determined based on the following criteria.

21.7 g of a lubricant (trade name: Isopar H®, manufactured by Exxon) is added to 100 g of PTFE powder, and mixed for 3 minutes in a glass bottle at room temperature. Then, the glass bottle is left to stand at room temperature (25° C.) for at least 1 hour before extrusion to obtain a lubricated resin. The lubricated resin is paste extruded at a reduction ratio of 100:1 at room temperature through an orifice (diameter 2.5 mm, land length 11 mm, entrance angle 30°) into a uniform beading. The extrusion speed, i.e. ram speed, is 20 inch/min (51 cm/min). The beading obtained by paste extrusion is heated at 230° C. for 30 minutes to remove the lubricant from the beading. Next, an appropriate length of the beading (extruded molded body) is cut and clamped at each end leaving a space of 1.5 inches (38 mm) between clamps, and heated to 300° C. in an air circulation furnace. Then, the clamps are moved apart from each other at a desired rate (stretch rate) until the separation distance corresponds to a desired stretch (total stretch) to perform the stretch test. This stretch method essentially follows a method disclosed in U.S. Pat. No. 4,576,869, except that the extrusion speed is different (51 cm/min instead of 84 cm/min).

"Stretch" is an increase in length due to stretching, usually expressed in relation to original length. In the production method, the stretch rate is 1,000%/sec, and the total stretch is 2,400%. This means that a stretched beading having a uniform appearance can be obtained without being cut in this stretching test.

The composition of the present disclosure preferably has a standard specific gravity (SSG) of 2.200 or less. When the standard specific gravity is 2.200 or less, a stretchable composition can be obtained, and a stretched body excellent in breaking strength can be obtained. The standard specific gravity is preferably 2.195 or less, more preferably 2.190 or less, and still more preferably 2.185 or less.

The standard specific gravity is determined by the water replacement method in conformity with ASTM D-792 using a sample molded in conformity with ASTM D4895-89.

The composition of the present disclosure preferably has an extrusion pressure of 30.0 MPa or less, more preferably 25.0 MPa or less, and preferably 5.0 MPa or more, more preferably 10.0 MPa or more. The extrusion pressure is a value determined by the following method according to a method disclosed in Japanese Patent Laid-Open No. 2002-201217.

21.7 g of a lubricant (trade name: Isopar H®, manufactured by Exxon) is added to 100 g of PTFE powder, and mixed for 3 minutes in a glass bottle at room temperature. Then, the glass bottle is left to stand at room temperature (25° C.) for at least 1 hour before extrusion to obtain a lubricated resin. The lubricated resin is paste extruded at a reduction ratio of 100:1 at room temperature through an orifice (diameter 2.5 mm, land length 11 mm, entrance angle 30°) into a uniform beading (beading; extruded molded body). The extrusion speed, i.e. ram speed, is 20 inch/min (51 cm/min). The extrusion pressure is a value obtained by measuring the load when the extrusion load becomes balanced in the paste extrusion and dividing the measured load by the cross-sectional area of the cylinder used in the paste extrusion.

The composition of the present disclosure preferably has a breaking strength of 10.0 N or more. In the composition of the present disclosure, the content of the polymer (1) is preferably 0.0001% by mass or more and 20% by mass or less based on polytetrafluoroethylene, and the breaking strength thereof is preferably 10.0 N or more.

The breaking strength is more preferably 13.0 N or more, still more preferably 16.0 N or more, and further preferably 19.0 N or more. The higher the breaking strength, the better, but the upper limit of the breaking strength is, for example, 50.0 N.

The breaking strength is a value determined by the following method.

First, a stretching test of an extrusion beading is performed by the following method to produce a sample for measuring breaking strength.

The beading obtained by paste extrusion is heated at 230° C. for 30 minutes to remove the lubricant from the beading. Next, an appropriate length of the beading (extruded molded body) is cut and clamped at each end leaving a space of 1.5 inches (38 mm) between clamps, and heated to 300° C. in an air circulation furnace. Then, the clamps are moved apart from each other at a desired rate (stretch rate) until the separation distance corresponds to a desired stretch (total stretch) to perform the stretch test. This stretch method essentially follows a method disclosed in U.S. Pat. No. 4,576,869, except that the extrusion speed is different (51 cm/min instead of 84 cm/min). "Stretch" is an increase in length due to stretching, usually expressed in relation to original length. In the production method, the stretch rate is 1,000%/sec, and the total stretch is 2,400%.

The stretched beading obtained in the stretching test (produced by stretching the beading) is clamped by movable jaws having a gauge length of 5.0 cm, and a tensile test is performed at 25° C. at a rate of 300 mm/min, and the strength at the time of breaking is taken as the breaking strength.

The composition of the present disclosure preferably has a stress relaxation time of 50 seconds or longer, more preferably 80 seconds or longer, still preferably 100 seconds or longer, and may be 150 seconds or longer. The stress relaxation time is a value measured by the following method.

Both ends of the stretched beading obtained in the stretching test are tied to a fixture to form a tightly stretched beading sample having an overall length of 8 inches (20 cm). The fixture is placed in an oven through a (covered) slit on the side of the oven, while keeping the oven at 390° C. The time it takes for the beading sample to break after it is placed in the oven is taken as the stress relaxation time.

The composition of the present disclosure is preferably substantially free from a fluorine-containing surfactant. The term "substantially free from a fluorine-containing surfactant" as used herein means that the fluorine-containing surfactant is 10 ppm or less based on the fluoropolymer. The content of the fluorine-containing surfactant is preferably 1 ppm or less, more preferably 100 ppb or less, still more preferably 10 ppb or less, further preferably 1 ppb or less, and particularly preferably the fluorine-containing surfactant is below the detection limit as measured by liquid chromatography-mass spectrometry (LC/MS/MS).

The amount of the fluorine-containing surfactant can be determined by a known method. For example, it can be determined by LC/MS/MS analysis. First, any of the obtained aqueous dispersion, the powder, the molded body, the pellets, a fluoropolymer obtained by refining the molded body, or a fluoropolymer obtained by refining the pellets is extracted into an organic solvent of methanol, and the extracted liquid is subjected to LC/MS/MS analysis. Then, the molecular weight information is extracted from the LC/MS/MS spectrum to confirm agreement with the structural formula of the candidate surfactant.

Thereafter, aqueous solutions having five or more different concentration levels of the confirmed surfactant are prepared, and LC/MS/MS analysis is performed for each concentration level to prepare a calibration curve with the area.

The obtained aqueous dispersion, powder, or powder obtained by crushing a molded body is subjected to Soxhlet extraction with methanol, and the extracted liquid is subjected to LC/MS/MS analysis for quantitative measurement.

The fluorine-containing surfactant is the same as those exemplified in the production method of the present disclosure described above. For example, the surfactant may be a fluorine atom-containing surfactant having, in the portion excluding the anionic group, 20 or less carbon atoms in total, may be a fluorine-containing surfactant having an anionic portion having a molecular weight of 800 or less, and may be a fluorine-containing surfactant having a Log POW of 3.5 or less.

Examples of the anionic fluorine-containing surfactant include compounds represented by the general formula ($N^0$), and specific examples thereof include compounds represented by the general formula ($N^1$), compounds represented by the general formula ($N^2$), compounds represented by the general formula ($N^3$), compounds represented by the general formula ($N^4$), and compounds represented by the general formula ($N^5$) More specific examples thereof include a perfluorocarboxylic acid (I) represented by the general formula (I), an ω-H perfluorocarboxylic acid (II) represented by the general formula (II), a perfluoropolyethercarboxylic acid (III) represented by the general formula (III), a perfluoroalkylalkylenecarboxylic acid (IV) represented by the general formula (IV), a perfluoroalkoxyfluorocarboxylic acid (V) represented by the general formula (V), a perfluoroalkylsulfonic acid (VI) represented by the general formula (VI), an ω—H perfluorosulfonic group (VII) represented by the general formula (VII), a perfluoroalkylalkylene sulfonic acid (VIII) represented by the general formula (VIII), an alkylalkylene carboxylic acid (IX) represented by the general formula (IX), a fluorocarboxylic acid (X) represented by the general formula (X), an alkoxyfluorosulfonic acid (XI) represented by the general formula (XI), and a compound (XII) represented by the general formula (XII).

The present disclosure also provides a stretched body obtained by stretching the composition. The stretching can be performed by any conventionally known methods and conditions for stretching PTFE.

The present disclosure further provides a stretched body comprising polytetrafluoroethylene and a polymer (1) comprising a polymerized unit (1) derived from a monomer represented by the following general formula (1), in which the stretched body has a breaking strength of 10.0 N or more.

$$CX_2{=}CY(—CZ_2—O—Rf\text{-}A) \quad (1)$$

wherein X is the same or different and is —H or —F; Y is —H, —F, an alkyl group, or a fluorine-containing alkyl group; Z is the same or different and is —H, —F, an alkyl group, or a fluoroalkyl group; Rf is a fluorine-containing alkylene group having 1 to 40 carbon atoms or a fluorine-containing alkylene group having 2 to 100 carbon atoms and having an ether bond; and A is —COOM, —$SO_3M$, or —$OSO_3M$, wherein M is —H, a metal atom, —$NR^7_4$, imidazolium optionally having a substituent, pyridinium optionally having a substituent, or phosphonium optionally having a substituent, wherein $R^7$ is H or an organic group, with the proviso that at least one of X, Y, and Z contains a fluorine atom.

In the stretched body of the present disclosure, the polytetrafluoroethylene and the polymer (1) are the same as those described for the composition of the present disclosure, and each can adopt a suitable embodiment thereof.

The stretched body of the present disclosure more preferably has a breaking strength of 13.0 N or more, still more preferably 16.0 N or more, and further preferably 19.0 N or more. The higher the breaking strength, the better, but the upper limit of the breaking strength is, for example, 50.0 N.

The breaking strength of the stretched body is determined by clamping the stretched body by movable jaws having a gauge length of 5.0 cm and performing a tensile test at 25° C. at a rate of 300 mm/min, in which the strength at the time of breaking is taken as the breaking strength.

The stretched body of the present disclosure preferably has a stress relaxation time of 50 seconds or longer, more preferably 80 seconds or longer, still preferably 100 seconds or longer, and may be 150 seconds or longer. The stress relaxation time is a value measured by the following method.

In order to determine the stress relaxation time of the stretched body, both ends of the stretched body are tied to a fixture to form a tightly stretched sample having an overall length of 8 inches (20 cm), and the fixture is then placed in an oven through a (covered) slit on the side of the oven, while keeping the oven at 390° C. The time it takes for the sample to break after it is placed in the oven is taken as the stress relaxation time.

The stretched body of the present disclosure preferably has an endothermic peak temperature of 325 to 350° C. Further, the stretched body of the present disclosure preferably has an endothermic peak temperature between 325 and 350° C. and between 360 and 390° C. The endothermic peak temperature is a temperature corresponding to the maximum value in the heat-of-fusion curve when the stretched body is heated at a rate of 10° C./min using a differential scanning calorimeter (DSC).

The stretched body of the present disclosure preferably has a porosity in the range of 30% to 99%. The porosity is more preferably 40% or more, still more preferably 50% or more, further preferably 60% or more, and particularly preferably 70% or more. Too small proportion of PTFE in the stretched body may result in insufficient strength of the stretched body, so the porosity is preferably 95% or less, more preferably 90% or less.

The porosity of the stretched body can be calculated from the following formula using the apparent density p.

$$\text{porosity }(\%)=[(2.2-\rho)/2.2]\times 100$$

In the formula, 2.2 is the true density (g/$cm^3$) of PTFE.

Regarding the density ρ of the stretched body, when the stretched body is in the form of a film or a sheet, a mass of the sample cut into a specific size is measured by a precision scale, and the density of the sample is calculated from the measured mass and the film thickness of the sample by the following formula.

$$\rho=M/(4.0\times 12.0\times t)$$

ρ=density (film density) (g/$cm_3$)

M=mass (g)

t=film thickness (cm)

The measurement and calculation are performed at three points, and the average value thereof is taken as the film density.

As for the film thickness, five stretched bodies are stacked and the total film thickness is measured using a film thickness meter, and the value obtained by dividing the value by five is taken as the thickness of one film.

Regarding the density ρ of the stretched body, when the stretched body has a cylindrical shape, a mass of the sample cut into a certain length is measured by a precision scale, and the density of the sample is calculated from the measured mass and the outer diameter of the sample by the following formula.

$$\rho=M/(r\times r\times\pi)\times L$$

ρ=density (g/$cm_3$)

M=mass (g)

r=radius (cm)

L=length (cm)

π=pi

The outer diameter of the stretched body is measured using a laser displacement sensor. The radius is the value obtained by dividing the value by 2.

The above measurement and calculation are performed at three points, and the average value thereof is taken as the density.

In the stretched body of the present disclosure, the content of the polymer (1) is preferably 0.0001% by mass or more and 20% by mass or less based on polytetrafluoroethylene. In the stretched body of the present disclosure, the lower limit of the content of the polymer (1) is more preferably 0.001% by mass, still more preferably 0.01% by mass, and particularly preferably 0.1% by mass based on polytetrafluoroethylene. The upper limit value thereof is more preferably 10% by mass, still more preferably 6% by mass, further preferably 4% by mass, still further preferably 2% by mass or less, particularly preferably 1.5% by mass or less, and most preferably 1% by mass or less.

The content of the polymer (1) can be determined by solid-state NMR measurement.

The stretched body of the present disclosure is preferably substantially free from a fluorine-containing surfactant. The term "substantially free from a fluorine-containing surfactant" as used herein means that the fluorine-containing surfactant is 10 ppm or less based on the fluoropolymer. The content of the fluorine-containing surfactant is preferably 1 ppm or less, more preferably 100 ppb or less, still more preferably 10 ppb or less, further preferably 1 ppb or less, and particularly preferably the fluorine-containing surfactant is below the detection limit as measured by liquid chromatography-mass spectrometry (LC/MS/MS).

The amount of the fluorine-containing surfactant can be determined by a known method. For example, it can be determined by LC/MS/MS analysis. First, the stretched body is refined and extracted into an organic solvent of methanol, and the extracted liquid is subjected to LC/MS/MS analysis. Then, the molecular weight information is extracted from the LC/MS/MS spectrum to confirm agreement with the structural formula of the candidate surfactant.

Thereafter, aqueous solutions having five or more different concentration levels of the confirmed surfactant are prepared, and LC/MS/MS analysis is performed for each concentration level to prepare a calibration curve with the area.

The powder obtained by crushing the obtained stretched body is subjected to Soxhlet extraction with methanol, and the extracted liquid is subjected to LC/MS/MS analysis for quantitative measurement.

The fluorine-containing surfactant is the same as those exemplified in the production method of the present disclosure described above. For example, the surfactant may be a fluorine atom-containing surfactant having, in the portion excluding the anionic group, 20 or less carbon atoms in total, may be a fluorine-containing surfactant having an anionic moiety having a molecular weight of 800 or less, and may be a fluorine-containing surfactant having a Log POW of 3.5 or less.

Examples of the anionic fluorine-containing surfactant include compounds represented by the general formula ($N^0$), and specific examples thereof include compounds represented by the general formula ($N^1$), compounds represented by the general formula ($N^2$), compounds represented by the general formula ($N^3$), compounds represented by the general formula ($N^4$), and compounds represented by the general formula ($N^5$). More specific examples thereof include a perfluorocarboxylic acid (I) represented by the general formula (I), an ω—H perfluorocarboxylic acid (II) represented by the general formula (II), a perfluoropolyethercarboxylic acid (III) represented by the general formula (III), a perfluoroalkylalkylenecarboxylic acid (IV) represented by the general formula (IV), a perfluoroalkoxyfluorocarboxylic acid (V) represented by the general formula (V), a perfluoroalkylsulfonic acid (VI) represented by the general formula (VI), an ω—H perfluorosulfonic acid (VII) represented by the general formula (VII), a perfluoroalkylalkylene sulfonic acid (VIII) represented by the general formula (VIII), an alkylalkylene carboxylic acid (IX) represented by the general formula (IX), a fluorocarboxylic acid (X) represented by the general formula (X), an alkoxyfluorosulfonic acid (XI) represented by the general formula (XI), and a compound (XII) represented by the general formula (XII).

The stretched body of the present disclosure can be obtained by stretching the composition of the present disclosure.

The stretched body of the present disclosure is also preferably in the form of a film, a tube, fibers, or rods.

When the stretched body of the present disclosure is in the form of a film (stretched film or porous film), the stretched body can be formed by stretching by a known PTFE stretching method.

Preferably, roll-stretching a sheet-shaped or rod-shaped paste extrudate in an extruding direction can provide a uniaxially stretched film.

Further stretching in a transverse direction using a tenter, for example, can provide a biaxially stretched film.

Prebaking treatment is also preferably performed before stretching.

The stretched body of the present disclosure is a porous body having a high porosity, and can suitably be used as a filter material for a variety of microfiltration filters such as air filters and chemical filters, a support member for polymer electrolyte films and the like.

The stretched body is also useful as a material of products used in the fields of textiles, of medical treatment, of electrochemistry, of sealants, of air filters, of ventilation/internal pressure adjustment, of liquid filters, and of consumer goods.

The following provides examples of specific applications.

—Electrochemical Field

Examples of the applications in this field include prepregs for dielectric materials, EMI-shielding materials, and heat conductive materials. More specifically, examples thereof include printed circuit boards, electromagnetic interference shielding materials, insulating heat conductive materials, and insulating materials.

—Sealant Field

Examples of the applications in this field include gaskets, packings, pump diaphragms, pump tubes, and sealants for aircraft.

—Air Filter Field

Examples of the applications in this field include ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), adsorbent-attached filters (for HDD embedment), adsorbent-attached vent filters (for HDD embedment), vent filters (for HDD embedment, for example) filters for cleaners (for cleaners), general-purpose multilayer felt materials, cartridge filters for GT (for interchangeable items for GT), and cooling filters (for housings of electronic devices).

—Ventilation/Internal Pressure Adjustment Field

Examples of the applications in this field include materials for freeze drying such as vessels for freeze drying, ventilation materials for automobiles for electronic circuits and lamps, applications relating to vessels such as vessel caps, protective ventilation for electronic devices, including small devices such as tablet terminals and mobile phone terminals, and ventilation for medical treatment.

—Liquid Filter Field

Examples of the applications in this field include liquid filters for semiconductors (for production of semiconductors), hydrophilic PTFE filters (for production of semiconductors), filters for chemicals (for chemical treatment), filters for pure water production lines (for production of pure water), and back-washing liquid filters (for treatment of industrial discharge water).

—Consumer Goods Field

Examples of the applications in this field include clothes, cable guides (movable wires for motorcycles), clothes for motor cyclists, cast liners (medical supporters), filters for cleaners, bagpipes (musical instrument), cables (signal cables for guitars), and strings (for string instrument).

—Textile Field

Examples of the applications in this field include PTFE fibers (fiber materials), machine threads (textiles) weaving yarns (textiles), and ropes.

—Medical Treatment Field

Examples of the applications in this field include implants (stretched articles), artificial blood vessels, catheters, general surgical operations (tissue reinforcing materials), products for head and neck (dura mater alternatives), oral health (tissue regenerative medicine), and orthopedics (bandages).

EXAMPLES the present disclosure is described with reference to Examples, but the present disclosure is not intended to be limited by these Examples.

The parameters in Examples were determined by the following methods.

Average Primary Particle Size

The fluoropolymer aqueous dispersion was diluted with water to a solid concentration of 0.15% by mass. The transmittance of incident light at 550 nm relative to the unit length of the resulting diluted latex was determined and the number-based length average primary particle size was determined by measuring the Feret diameter with a transmission electron microscope (TEM). Based on these values, a calibration curve was prepared. Using this calibration curve, the average primary particle size of each sample was determined from the measured transmittance of incident light at 550 nm.

Standard Specific Gravity (SSG)

Using a sample molded in conformity with ASTM D4895-89, the SSG was determined by the water replacement method in conformity with ASTM D-792.

Melting Point (Peak Temperature)

Regarding each of the PTFE powders obtained in Examples, a heat-of-fusion curve was drawn at a condition of a temperature-increasing rate of 10° C./min using a differential scanning calorimeter (DSC), and the temperature corresponding to the maximum value of the endothermic peak appearing in the heat-of-fusion curve was taken as the melting point of the PTFE.

Further, regarding each of the melt-fabricable fluororesin (PFA, FEP) powders obtained in Examples, a heat-of-fusion curve was drawn when it was heated to a melting point or higher at a condition of a temperature-increasing rate of 10° C./min, then cooled to a melting point or lower at a condition of a temperature-decreasing rate of 10° C./min, and then heated again to a melting point or higher at a condition of a temperature-increasing rate of 10° C./min using a differential scanning calorimeter (DSC), and the temperature corresponding to the maximum value of the endothermic peak appearing in the heat-of-fusion curve was taken as the melting point of the melt-fabricable fluororesin (PFA, FEP).

Content of Modifying Monomer

In order to determine the HFP content, a thin film disk was prepared by pressing the PTFE powder, and the infrared absorbance thereof was measured by FT-IR, and the value obtained by multiplying the ratio of absorbance at 982 $cm^{-1}$/absorbance at 935 $cm^{-1}$ by 0.3 was taken as the HFP content.

The PMVE content was determined from the spectrum obtained by solid-state $^{19}$F-MAS NMR measurement (rotation speed 30 kHz) using the following formula.

$$X=(4B/3)/(A+(B/3))\times 100$$

X: PMVE content (mol %)

A: integration value of signal at −120 ppm

B: integration value of CF signal at −52 ppm

The chemical shift value used was that when the peak top of the signal derived from the main chain of PTFE was −120 ppm.

The content of $CH_2$═$CF(CF_2OCFCF_3COONH_4)$ (hereinafter also referred to as "modifying monomer a") is the amount of the charged total modifying monomer a.

Fluoropolymer Solid Concentration

In an air dryer, 1 g of the fluoropolymer aqueous dispersion was dried at a condition of 150° C. for 60 minutes, and the ratio of the mass of the non-volatile matter to the mass of the aqueous dispersion (1 g) was expressed by percentage and taken as the solid concentration thereof.

Content of Polymer (1)

Content of any of Polymers A to D Contained in the PTFE Powder

The content of any of polymers A to D contained in the PTFE powder was determined from the spectrum obtained by solid-state $^{19}$F-MAS NMR measurement (rotation speed 30 kHz) using the following formula.

$$Y=(4B/(5A+3B))\times 100$$

Y: content of any of polymers A to D (mol %)

A: integration value of signal at −120 ppm

B: sum of integration values of $CF_2$ and $CF_3$ signals at −83 ppm

The chemical shift value used was that when the peak top of the signal derived from the main chain of PTFE was −120 ppm.

Content of Polymer E

The content of polymer E contained in the PTFE powder was determined from the spectrum obtained by solid-state $^{19}$F-MAS NMR measurement (rotation speed 30 kHz) using the following formula.

$$Y=(4B/(10A+3B))\times 100$$

Y: content of polymer E (mol %)

A: integration value of signal at −120 ppm

B: sum of integration values of $CF_2$ and $CF_3$ signals at −81 and −83 ppm

The chemical shift value used was that when the peak top of the signal derived from the main chain of PTFE was −120 ppm.

Content of Polymer F

The content of polymer F contained in the PTFE powder was determined from the spectrum obtained by solid-state $^{19}$F-MAS NMR measurement (rotation speed 30 kHz) using the following formula.

$$Y=(4B/(4.62A+2.77B))\times 100$$

Y: content of polymer F (mol %)

A: integration value of signal at −120 ppm

B: sum of integration values of $CF_2$ and $CF_3$ signals at −83 ppm

The chemical shift value used was that when the peak top of the signal derived from the main chain of PTFE was −120 ppm.

Extrusion Pressure Measurement 21.7 g of a lubricant (trade name: Isopar H®, manufactured by Exxon) was added to 100 g of a fine powder, and mixed for 3 minutes in a glass bottle at room temperature. Then, the glass bottle was left to stand at room temperature (25° C.) for at least 1 hour before extrusion to obtain a lubricated resin. The lubricated resin was paste extruded at a reduction ratio of 100:1 at room temperature through an orifice (diameter 2.5 mm, land length 11 mm, entrance angle 30°) into a uniform beading (beading; extruded molded body). The extrusion speed, i.e. ram speed, was 20 inch/min (51 cm/min). The value obtained by measuring the load when the extrusion load became balanced in the paste extrusion and dividing the measured load by the cross-sectional area of the cylinder used in the paste extrusion was taken as the extrusion pressure.

Stretching Test

The beading obtained by paste extrusion was heated at 230° C. for 30 minutes to remove the lubricant from the beading. Next, an appropriate length of the beading (extruded molded body) was cut and clamped at each end leaving a space of 1.5 inches (38 mm) between clamps, and heated to 300° C. in an air circulation furnace. Then, the clamps were moved apart from each other at a desired rate (stretch rate) until the separation distance corresponds to a desired stretch (total stretch) to perform the stretch test. This stretch method essentially followed a method disclosed in U.S. Pat. No. 4,576,869, except that the extrusion speed is different (51 cm/min instead of 84 cm/min). "Stretch" is an increase in length due to stretching, usually expressed in relation to original length. In the production method, the stretch rate was 1,000%/sec, and the total stretch was 2,400%.

Breaking Strength

The stretched beading obtained in the stretching test (produced by stretching the beading) was clamped by movable jaws having a gauge length of 5.0 cm, and a tensile test was performed at 25° C. at a rate of 300 mm/min, and the strength at the time of breaking was determined as the breaking strength.

Stress Relaxation Time

Both ends of the stretched beading obtained in the stretching test were tied to a fixture to form a tightly stretched beading sample having an overall length of 8 inches (20 cm). The fixture was placed in an oven through a (covered) slit on the side of the oven, while keeping the oven at 390° C. The time it takes for the beading sample to break after it was placed in the oven was determined as the stress relaxation time.

Appearance of Stretched Material

The appearance of the stretched beading (those produced by stretching the beadings) obtained in the stretching test was visually observed.

Aspect Ratio

The aqueous dispersion of PTFE was diluted to have a solid concentration of about 1% by mass and observed by a scanning electron microscope (SEM), and 400 or more randomly extracted particles were subjected to image processing, and the aspect ratio was obtained from the average of the ratios of the major axis to the minor axis thereof.

Melt Flow Rate

The melt flow rate was determined in conformity with ASTM D-1238 and D-2116.

Mooney viscosity (ML1+10 (100° C.))

The Mooney viscosity can be determined using a Mooney viscometer MV2000E manufactured by Alpha Technologies Inc. at 100° C. in conformity with JIS K 6300.

In Examples, a homopolymer of a monomer (modifying monomer a) represented by the following formula:

$CH_2{=}CF(CF_2OCFCF_3COONH_4)$ was used. The homopolymer had a number average molecular weight of 90,000 and a weight average molecular weight of 190,000, and is hereinafter referred to as polymer A.

The number average molecular weight and the weight average molecular weight were calculated by performing measurement by gel permeation chromatography (GPC) by using a GPC HLC-8020 manufactured by Tosoh Corporation and columns (one GPC KF-801, one GPC KF-802, and two GPC KF-806M were connected in series) manufactured by Shodex Corporation, and flowing tetrahydrofuran (THF) as a solvent at a flow rate of 1 ml/min, with reference to monodispersed polystyrene as a standard.

Example 1

To a glass reactor equipped with a stirrer having an internal capacity of 1 L, 530 g of deionized water, 30 g of paraffin wax, and 0.52 g of the polymer A, and aqueous ammonia were added adjusting the pH to 9.2. Next, while the contents of the reactor were heated to 70° C. and sucked, the reactor was purged with TFE monomer to remove oxygen in the reactor. Thereafter, the contents were stirred at 540 rpm. TFE monomer was added into the reactor until the pressure reached 0.73 MPaG. 2.75 mg of ammonium persulfate (APS) initiator dissolved in 20 g of deionized water was injected into the reactor and the pressure in the reactor was adjusted to 0.83 MPaG. A drop in pressure occurred after injection of the initiator, indicating the initiation of polymerization. The TFE monomer was added to the reactor to maintain the pressure, and the polymerization was continued until about 140 g of the TFE monomer was consumed in the reaction. Then, the reactor was evacuated to normal pressure, and the contents were taken out from the reactor and cooled. The supernatant paraffin wax was removed from the PTFE aqueous dispersion.

The solid concentration in the resulting PTFE aqueous dispersion was 20.8% by mass, and the average primary particle size thereof was 258 nm.

The resulting PTFE aqueous dispersion was diluted with deionized water to have a solid concentration of about 10% by mass and coagulated under a high-speed stirring condition. The coagulated wet powder was dried at 150° C. for 18 hours. At this time, the PTFE powder had an SSG of 2.180 and a melting point of 343.1° C.

Example 2

Polymerization was carried out in the same manner as in Example 1, except that 0.52 g of the polymer A in Example 1 was replaced by 0.275 g thereof, 2.75 mg of ammonium persulfate (APS) initiator in Example 1 was replaced by 11 mg thereof, and 2.9 mg of $CH_2{=}CF(CF_2OCFCF_3COONH_4)$ was added. The solid concentration in the resulting PTFE aqueous dispersion was 20.4% by mass, and the average primary particle size thereof was 280 nm.

Example 3

Polymerization was carried out in the same manner as in Example 1 except that 0.52 g of the polymer A in Example 1 was replaced by 1.10 g thereof. The solid concentration in the resulting PTFE aqueous dispersion was 19.3% by mass, and the average primary particle size thereof was 336 nm.

Example 4

Polymerization was carried out in the same manner as in Example 1 except that the polymer A in Example 1 was replaced by a polymer B, which is a homopolymer of the monomer represented by $CH_2{=}CF(CF_2OCFCF_3COONH_4)$ (weight average molecular weight of $4.1\times10^4$, number average molecular weight of $1.9\times10^4$), and the polymerization was continued until the amount of wet PTFE agglomerate adhering to the reactor and stirring blade was about the same as in Example 1. The solid concentration in the resulting PTFE aqueous dispersion was 17.7% by mass, and the average primary particle size thereof was 341 nm.

Example 5

Polymerization was carried out in the same manner as in Example 4 except that the polymer B in Example 4 was replaced by a polymer C, which is a homopolymer of the monomer represented by $CH_2{=}CF(CF_2OCFCF_3COONH_4)$ (weight average molecular weight of $2.7\times10^4$ and number average molecular weight of $1.1\times10^4$). The solid concentration in the resulting PTFE aqueous dispersion was 15.0% by mass, and the average primary particle size thereof was 292 nm.

Example 6

Polymerization was carried out in the same manner as in Example 4 except that the polymer B in Example 4 was replaced by a polymer D, which is a homopolymer of the monomer represented by $CH_2{=}CF(CF_2OCFCF_3COONH_4)$ (weight average molecular weight of $1.9\times10^4$ and number average molecular weight of $1.2\times10^4$). The solid concentration in the resulting PTFE aqueous dispersion was 12.9% by mass, and the average primary particle size thereof was 289 nm.

Example 7

Polymerization was carried out in the same manner as in Example 1 except that 0.18 g of HFP was added. The solid concentration in the resulting PTFE aqueous dispersion was 21.5% by mass, and the average primary particle size thereof was 211 nm.

The polymerization conditions and the evaluation results of the resulting PTFE aqueous dispersions in Examples 1 to 7 are shown in Table 1 and Table 2, respectively.

Example 8

Polymerization was carried out in the same manner as in Example 1 except that 0.52 g of the polymer A in Example 1 was replaced by 0.55 g of a polymer E, which is a homopolymer of a monomer represented by $CH_2{=}CF(CF_2OCFCF_3CF_2OCFCF_3COONH_4)$ (weight average molecular weight of $9.7\times10^4$ and number average molecular weight of $3.3\times10^4$), and 0.13 g of PMVE was added. The solid concentration in the resulting PTFE aqueous dispersion was 21.5% by mass, and the average primary particle size thereof was 183 nm.

Example 9

Polymerization was carried out in the same manner as in Example 8 except that the polymer E in Example 8 was replaced by a polymer F, which is a copolymer of TFE and the monomer represented by $CH_2{=}CF(CF_2OCFCF_3COONH_4)$ (weight average molecular weight of $20.0\times10^4$, number average molecular weight of $5.8\times10^4$, and the content of the polymerized unit $CH_2{=}CF(CF_2OCFCF_3COONH_4)$ is 92.4 mol % based on all polymerized units). The solid concentration in the resulting PTFE aqueous dispersion was 19.6% by mass, and the average primary particle size thereof was 350 nm.

The polymerization conditions and the evaluation results of the resulting PTFE aqueous dispersions in Examples 8 and 9 are shown in Table 1 and Table 2, respectively.

TABLE 1

| | Initiator | | Polymer (1) | | | | Modifier | |
|---|---|---|---|---|---|---|---|---|
| | type — | amount mg | type — | weight average molecular weight $\times10^4$ | number average molecular weight $\times10^4$ | amount g | type — | amount g |
| Example 1 | APS | 2.75 | polymer A | 19.0 | 9.0 | 0.52 | — | — |
| Example 2 | APS | 11.0 | polymer A | 19.0 | 9.0 | 0.275 | modifying monomer a | 0.0029 |
| Example 3 | APS | 2.75 | polymer A | 19.0 | 9.0 | 1.10 | — | — |
| Example 4 | APS | 2.75 | polymer B | 4.1 | 1.9 | 0.52 | — | — |
| Example 5 | APS | 2.75 | polymer C | 2.7 | 1.1 | 0.52 | — | — |
| Example 6 | APS | 2.75 | polymer D | 1.9 | 1.2 | 0.52 | — | — |
| Example 7 | APS | 2.75 | polymer A | 19.0 | 9.0 | 0.52 | HFP | 0.18 |
| Example 8 | APS | 2.75 | polymer E | 9.7 | 3.3 | 0.55 | PMVE | 0.13 |
| Example 9 | APS | 2.75 | polymer F | 20.0 | 5.8 | 0.55 | PMVE | 0.13 |

TABLE 2

| | Solid concentration % by mass | Average primary particle size nm | Standard specific gravity — | Melting point ° C. | Modifier type | Modification amount % by mass |
|---|---|---|---|---|---|---|
| Example 1 | 20.8 | 258 | 2.180 | 343 | — | — |
| Example 2 | 20.4 | 280 | 2.213 | 338 | modifying monomer a | 0.002 |
| Example 3 | 19.3 | 336 | 2.182 | 344 | — | — |
| Example 4 | 17.7 | 341 | 2.177 | 344 | — | — |
| Example 5 | 15.0 | 292 | 2.176 | 343 | — | — |
| Example 6 | 12.9 | 289 | 2.179 | 344 | — | — |
| Example 7 | 21.5 | 211 | 2.209 | 340 | HFP | 0.094 |
| Example 8 | 21.5 | 183 | 2.174 | 341 | PMVE | 0.069 |
| Example 9 | 19.6 | 350 | 2.183 | 342 | PMVE | 0.080 |

Example 10

To a SUS reactor equipped with a stirrer having an internal capacity of 6 L, 3,560 g of deionized water, $10^4$ g of paraffin wax, 5.37 g of the polymer A, and 77.3 mg of $CH_2{=}CF(CF_2OCFCF_3COONH_4)$ were added. Aqueous ammonia was added thereto to adjust the pH to 9.1. Next, while the contents of the reactor were heated to 70° C. and sucked, the reactor was purged with TFE to remove oxygen in the reactor, and the contents were stirred. After adding 0.8 g of HFP into the reactor, TFE was added until the pressure reached 0.73 MPaG. 17.9 mg of ammonium persulfate (APS) initiator dissolved in 20 g of deionized water was injected into the reactor and the pressure in the reactor was adjusted to 0.83 MPaG. A drop in pressure occurred after injection of the initiator, indicating the initiation of polymerization. TFE was added to the reactor to keep the pressure constant at 0.78 MPaG. When the TFE consumed in the reaction reached about 180 g, the feeding and stirring of TFE were stopped. Subsequently, the gas in the reactor was slowly released until the pressure in the reactor reached 0.02 MPaG. Thereafter, TFE was fed until the pressure of the reactor reached 0.78 MPaG, and stirring was started again, whereby the reaction was continued. When the TFE consumed in the reaction reached about 540 g, 14.3 mg of hydroquinone dissolved in 20 g of deionized water was injected into the reactor, whereby the reaction was continued. When the TFE consumed in the reaction reached about 1,250 g, the feeding of TFE was stopped and stirring was stopped, whereby the reaction was completed. Then, the reactor was evacuated to normal pressure, and the contents were taken out from the reactor and cooled. The supernatant paraffin wax was removed from the PTFE aqueous dispersion. The solid concentration in the resulting PTFE aqueous dispersion was 25.7% by mass, and the average primary particle size thereof was 249 nm. The resulting PTFE aqueous dispersion was diluted with deionized water to have a solid concentration of about 10% by mass and coagulated under a high-speed stirring condition, and the coagulated wet powder was dried at 210° C. for 18 hours. Various physical properties of the resulting PTFE powder were measured. The results are shown in Table 3.

Example 11

Polymerization was carried out in the same manner as in Example 10 except that 77.3 mg of $CH_2{=}CF(CF_2OCFCF_3COONH_4)$ in Example 10 was replaced by 9.7 mg thereof, and 0.8 g of HFP in Example 10 was replaced by 0.27 g of PMVE. The solid concentration in the resulting PTFE aqueous dispersion was 24.4% by mass, and the average primary particle size thereof was 275 nm.

Example 12

Polymerization was carried out in the same manner as in Example 10 except that 14.3 mg of hydroquinone in Example 10 was not injected into the reactor. The solid concentration in the resulting PTFE aqueous dispersion was 25.4% by mass, and the average primary particle size thereof was 242 nm.

Example 13

To a SUS reactor equipped with a stirrer having an internal capacity of 3 L, 1,800 g of deionized water, 90 g of paraffin wax, 2.70 g of the polymer A, and 38.9 mg of $CH_2{=}CF(CF_2OCFCF_3COONH_4)$ were added. Aqueous ammonia was added thereto to adjust the pH to 9.1. Next, while the contents of the reactor were heated to 80° C. and sucked, the reactor was purged with TFE to remove oxygen in the reactor, and the contents were stirred. After adding 2.3 g of HFP into the reactor, TFE was added until the pressure reached 1.50 MPaG. 9.0 mg of ammonium persulfate (APS) initiator was injected into the reactor. A drop in pressure occurred after injection of the initiator, indicating the initiation of polymerization. TFE was added to the reactor to keep the pressure constant at 1.50 MPaG. When the TFE consumed in the reaction reached about 90 g, the feeding of TFE and stirring were stopped. Subsequently, the gas in the reactor was slowly released until the pressure in the reactor reached the atmospheric pressure, and was held in vacuum for 1 minute. Thereafter, TFE was fed until the pressure of the reactor reached 2.50 MPaG, and stirring was started again, whereby the reaction was continued. When the TFE consumed in the reaction reached about 180 g, 14.4 mg of hydroquinone dissolved in 20 g of deionized water was injected into the reactor, whereby the reaction was continued. When the TFE consumed in the reaction reached about 600 g, the feeding of TFE was stopped and stirring was stopped, whereby the reaction was completed. Then, the reactor was evacuated to normal pressure, and the contents were taken out from the reactor and cooled. The supernatant paraffin wax was removed from the PTFE aqueous dispersion. The solid concentration in the resulting PTFE aqueous dispersion was 26.9% by mass, and the average primary particle size thereof was 196 nm. The resulting PTFE aqueous dispersion was diluted with deionized water to have a solid concentration of about 10% by mass and coagulated under a high-speed stirring condition, and the coagulated wet powder was dried at 210° C. for 18 hours. Various physical properties of the resulting PTFE powder were measured. The results are shown in Table 3.

TABLE 3

| | Solid concentration % by mass | Average primary particle size nm | Aspect ratio — | Standard specific gravity — | Melting point ° C. | Modifier type | Modifier % by mass | Modifier type | Modifier % by mass |
|---|---|---|---|---|---|---|---|---|---|
| Example 10 | 25.7 | 249 | 1.38 | 2.172 | 343 | HFP | 0.031 | modifying monomer a | 0.006 |
| Example 11 | 24.4 | 275 | 1.41 | 2.187 | 338 | PMVE | 0.016 | modifying monomer a | 0.001 |
| Example 12 | 25.4 | 242 | 1.33 | 2.184 | 342 | HFP | 0.039 | modifying monomer a | 0.006 |
| Example 13 | 26.9 | 196 | 1.39 | 2.169 | 343 | HFP | 0.044 | modifying monomer a | 0.006 |

| | Polymer (1) content % by mass | Extrusion pressure MPa | Breaking strength N | Stress relaxation time sec | Appearance of stretched body — |
|---|---|---|---|---|---|
| Example 10 | 0.43 | 24.0 | 19.4 | 161 | uniform |
| Example 11 | 0.46 | 25.4 | 22.6 | 152 | uniform |
| Example 12 | 0.44 | 25.1 | 14.2 | 113 | uniform |
| Example 13 | 0.40 | 26.7 | 18.9 | 106 | uniform |

Example 14

To a SUS reactor equipped with a stirrer having an internal capacity of 6 L, 3,560 g of deionized water, $10^4$ g of paraffin wax, 3.58 g of the polymer A, and 51.6 mg of $CH_2{=}CF(CF_2OCFCF_3COONH_4)$ were added. Aqueous ammonia was added thereto to adjust the pH to 9.0. Next, while the contents of the reactor were heated to 70° C. and sucked, the reactor was purged with TFE to remove oxygen in the reactor, and the contents were stirred. After adding 0.8 g of HFP into the reactor, TFE was added until the pressure reached 0.73 MPaG. 17.9 mg of ammonium persulfate (APS) initiator dissolved in 20 g of deionized water was injected into the reactor and the pressure in the reactor was adjusted to 0.83 MPaG. A drop in pressure occurred after injection of the initiator, indicating the initiation of polymerization. TFE was added to the reactor to keep the pressure constant at 0.78 MPaG. When the TFE consumed in the reaction reached about 180 g, the feeding of TFE and stirring were stopped. Subsequently, the gas in the reactor was slowly released until the pressure in the reactor reached 0.02 MPaG. Thereafter, TFE was fed until the pressure of the reactor reached 0.78 MPaG, and stirring was started again, whereby the reaction was continued. When the TFE consumed in the reaction reached about 900 g, the feeding of TFE was stopped and stirring was stopped, whereby the reaction was completed. Then, the reactor was evacuated to normal pressure, and the contents were taken out from the reactor and cooled. The supernatant paraffin wax was removed from the PTFE aqueous dispersion. The solid concentration in the resulting PTFE aqueous dispersion was 20.7% by mass, and the average primary particle size thereof was 218 nm. The resulting PTFE aqueous dispersion was diluted with deionized water to have a solid concentration of about 10% by mass and coagulated under a high-speed stirring condition, and the coagulated wet powder was dried at 210° C. for 18 hours. Various physical properties of the resulting PTFE powder were measured. The results are shown in Table 4.

Example 15

Polymerization was carried out in the same manner as in Example 14 except that 51.6 mg of $CH_2{=}CF(CF_2OCFCF_3COONH_4)$ in Example 14 was replaced by 6.4 mg thereof and HFP was replaced by PMVE. The solid concentration in the resulting PTFE aqueous dispersion was 20.4% by mass, and the average primary particle size thereof was 227 nm.

Example 16

Polymerization was carried out in the same manner as in Example 14 except that 3.58 g of the polymer A in Example 14 was replaced by 5.37 g thereof, 51.6 mg of $CH_2{=}CF(CF_2OCFCF_3COONH_4)$ in Example 14 was replaced by 430 mg thereof, and when TFE consumed in the reaction reached about 1250 g, the feeding of TFE was stopped. The solid concentration in the resulting PTFE aqueous dispersion was 26.1% by mass, and the average primary particle size thereof was 227 nm.

Example 17

Polymerization was carried out in the same manner as in Example 14 except that 51.6 mg of $CH_2{=}CF(CF_2OCFCF_3COONH_4)$ in Example 14 was replaced by 6.4 mg thereof and 1.8 mg of polyoxyethylene(10)octylphenyl ether was added. The solid concentration in the resulting PTFE aqueous dispersion was 20.3% by mass, and the average primary particle size thereof was 227 nm.

Example 18

To a SUS reactor equipped with a stirrer having an internal capacity of 3 L, 1,800 g of deionized water, 90 g of paraffin wax, 1.80 g of the polymer A, and 25.9 mg of $CH_2{=}CF(CF_2OCFCF_3COONH_4)$ were added. Aqueous ammonia was added thereto to adjust the pH to 9.1. Next, while the contents of the reactor were heated to 80° C. and sucked, the reactor was purged with TFE to remove oxygen in the reactor, and the contents were stirred. After adding 1.26 g of HFP into the reactor, TFE was added until the pressure reached 1.50 MPaG. 9.0 mg of ammonium persulfate (APS) initiator was injected into the reactor. A drop in pressure occurred after injection of the initiator, indicating the initiation of polymerization. TFE was added to the reactor to keep the pressure constant at 1.50 MPaG. When the TFE consumed in the reaction reached about 510 g, the feeding of TFE was stopped and stirring was stopped, whereby the reaction was completed. Then, the reactor was evacuated to normal pressure, and the contents were taken out from the reactor and cooled. The supernatant paraffin wax was removed from the PTFE aqueous dispersion. The solid concentration in the resulting PTFE aqueous dispersion was 23.5% by mass, and the average primary particle size thereof was 202 nm. The resulting PTFE aqueous dispersion was diluted with deionized water to have a solid concentration of about 10% by mass and coagulated under a high-speed stirring condition, and the coagulated wet powder was dried at 180° C. for 18 hours. Various physical properties of the resulting PTFE powder were measured. The results are shown in Table 4.

Example 19

Polymerization was carried out in the same manner as in Example 14 except that HFP in Example 14 was not added and the operation when the TFE consumed in the reaction reached about 180 g was not performed. The solid concentration in the resulting PTFE aqueous dispersion was 20.1% by mass, and the average primary particle size thereof was 277 nm.

Example 20

To a SUS reactor equipped with a stirrer having an internal capacity of 6 L, 3,600 g of deionized water, 180 g of paraffin wax, 7.20 g of the polymer A, and $10^4$ mg of $CH_2{=}CF(CF_2OCFCF_3COONH_4)$ were added. Aqueous ammonia was added thereto to adjust the pH to 9.1. Next, while the contents of the reactor were heated to 85° C. and sucked, the reactor was purged with TFE to remove oxygen in the reactor, and the contents were stirred. TFE was added until the pressure reached 2.70 MPaG. Then, 56 mg of ammonium persulfate (APS) and 289 mg of disuccinic acid peroxide (DSP) serving as polymerization initiators were charged thereinto. The initiators were injected into the reactor. A drop in pressure occurred after injection of the initiators, indicating the initiation of polymerization. TFE was added to the reactor to keep the pressure constant at 2.70 MPaG. When the TFE consumed in the reaction reached about 900 g, the feeding of TFE was stopped and stirring was stopped, whereby the reaction was completed. Then, the reactor was evacuated to normal pressure, and the contents were taken out from the reactor and cooled. The supernatant paraffin wax was removed from the PTFE aqueous dispersion. The solid concentration in the resulting PTFE aqueous dispersion was 21.0% by mass, and the average primary particle size thereof was 197 nm. The resulting PTFE aqueous dispersion was diluted with deionized water to have a solid concentration of about 10% by mass and coagulated under a high-speed stirring condition, and the coagulated wet powder was dried at 180° C. for 18 hours. Various physical properties of the resulting PTFE powder were measured. The results are shown in Table 4.

TABLE 4

| | Solid concentration % by mass | Average primary particle size nm | Aspect ratio — | Standard specific gravity — | Melting point ° C. | Modifier type | Modifier % by mass | Modifier type | Modifier % by mass | Extrusion pressure MPa |
|---|---|---|---|---|---|---|---|---|---|---|
| Example 14 | 20.7 | 218 | 1.29 | 2.232 | 341 | HFP | 0.054 | modifying monomer a | 0.006 | 22.5 |
| Example 15 | 20.4 | 227 | 1.23 | 2.196 | 338 | PMVE | 0.016 | modifying monomer a | 0.001 | 26.7 |
| Example 16 | 26.1 | 227 | 1.38 | 2.168 | 343 | HFP | 0.029 | modifying monomer a | 0.004 | 23.1 |
| Example 17 | 20.3 | 227 | 1.27 | 2.203 | 341 | HFP | 0.040 | modifying monomer a | 0.001 | 24.6 |
| Example 18 | 23.5 | 202 | 1.21 | 2.198 | 340 | HFP | 0.151 | modifying monomer a | 0.005 | 29.3 |
| Example 19 | 20.1 | 277 | 1.60 | 2.186 | 343 | — | — | modifying monomer a | 0.006 | 21.2 |
| Example 20 | 21.0 | 197 | 1.88 | 2.217 | 336 | — | — | modifying monomer a | 0.011 | 13.5 |

Example 21

To a glass reactor equipped with a stirrer having an internal capacity of 1 L, 530 g of deionized water, 30 g of paraffin wax, and 0.55 g of the polymer A, and aqueous ammonia were added adjusting the pH to 9.1. Next, while the contents of the reactor were heated to 70° C. and sucked, the reactor was purged with TFE monomer to remove oxygen in the reactor. Thereafter, the contents were stirred at 540 rpm. After adding 0.02 g of ethane gas and 8.8 g of PPVE into the reactor, the TFE monomer was added until the pressure reached 0.73 MPaG. 55 mg of ammonium persulfate (APS) initiator dissolved in 20 g of deionized water was injected into the reactor and the pressure in the reactor was adjusted to 0.83 MPaG. A drop in pressure occurred after injection of the initiator, indicating the initiation of polymerization. TFE monomer was added to the reactor to keep the pressure constant at 0.78 MPaG. Polymerization was continued until about 140 g of TFE monomer was consumed in the reaction. Then, the reactor was evacuated to normal pressure, and the contents were taken out from the reactor and cooled. The supernatant paraffin wax was removed from the PFA aqueous dispersion.

The solid concentration of the resulting PFA aqueous dispersion was 21.1% by mass.

The resulting PFA aqueous dispersion was diluted with deionized water to have a solid concentration of about 10% by mass and coagulated under a high-speed stirring condition. The coagulated wet powder was dried at 150° C. for 18 hours. At this time, the PFA powder had a melt flow rate of 64 g/10 minutes, a melting point of 314.3° C., and a PPVE modification amount of 1.2 mol %.

Example 22

To a SUS reactor equipped with a stirrer having an internal capacity of 6 L, 2,980 g of deionized water, 120 g of paraffin wax, 4.5 g of the polymer A, and aqueous ammonia were added adjusting the pH to 9.1. Next, while the contents of the reactor were heated to 70° C. and sucked, the reactor was purged with TFE to remove oxygen in the reactor. Thereafter, the contents were stirred at 280 rpm. After adding 0.27 g of ethane gas and 26.4 g of PPVE into the reactor, the TFE monomer was added until the pressure reached 0.73 MPaG. 150 mg of ammonium persulfate (APS) initiator dissolved in 20 g of deionized water was injected into the reactor and the pressure in the reactor was adjusted to 0.83 MPaG. A drop in pressure occurred after injection of the initiator, indicating the initiation of polymerization. TFE was added to the reactor to keep the pressure constant at 0.78 MPaG. After starting the reaction, 4.5 g of PPVE was added for every 115 g of TFE consumed. When the TFE consumed in the reaction reached about 820 g, the feeding of TFE and stirring were stopped. Then, the reactor was evacuated to normal pressure, and the contents were taken out from the reactor and cooled. The supernatant paraffin wax was removed from the PFA aqueous dispersion. The solid concentration of the resulting PFA aqueous dispersion was 21.5% by mass.

The resulting PFA aqueous dispersion was diluted with deionized water to have a solid concentration of about 10% by mass and coagulated under a high-speed stirring condition. The coagulated wet powder was dried at 150° C. for 18 hours. At this time, the PFA powder had a melt flow rate of 12 g/10 minutes, a melting point of 312.4° C., and a PPVE modification amount of 1.3 mol %.

Example 23

To a glass reactor equipped with a stirrer having an internal capacity of 1 L, 530 g of deionized water, 30 g of paraffin wax, 8.25 g of the polymer A, and 55.0 mg of $CH_2{=}CF(CF_2OCFCF_3COONH_4)$ were added. Aqueous ammonia was added to adjust the pH to 9.1. Next, while the contents of the reactor were heated to 80° C. and sucked, the reactor was purged with TFE monomer to remove oxygen in the reactor. Thereafter, the contents were stirred at 540 rpm. After adding 0.02 g of ethane gas and 16.8 g of HFP into the reactor, the TFE monomer was added until the pressure reached 0.73 MPaG. 303 mg of ammonium persulfate (APS) initiator dissolved in 20 g of deionized water was injected into the reactor and the pressure in the reactor was adjusted to 0.83 MPaG. A drop in pressure occurred after injection of the initiator, indicating the initiation of polymerization. TFE monomer was added to the reactor to keep the pressure constant at 0.78 MPaG. Every 5 hours after the initiation of polymerization, 27.5 mg of APS initiator dissolved in 5 g of deionized water was added. Polymerization was continued until about 120 g of TFE monomer was consumed in the reaction. Then, the reactor was evacuated to normal pressure, and the contents were taken out from the reactor and cooled. The supernatant paraffin wax was removed from the FEP aqueous dispersion.

The solid concentration of the resulting FEP aqueous dispersion was 18.3% by mass.

A portion of the resulting FEP aqueous dispersion was put in a freezer and frozen. The frozen FEP aqueous dispersion was left to stand until 25° C. was reached, to obtain a coagulated powder. The coagulated wet powder was dried at 150° C. for 18 hours. At this time, the FEP powder had a melt flow rate of 136 g/10 minutes, a melting point of 282.3° C., and an HFP modification amount of 7.2 mol %.

Example 24

To a SUS reactor equipped with a stirrer having an internal capacity of 6 L, 3,560 g of deionized water, 104 g of paraffin wax, 53.4 g of the polymer A, 358.0 mg of $CH_2{=}CF(CF_2OCFCF_3COONH_4)$, and aqueous ammonia were added adjusting the pH to 9.1. Next, while the contents of the reactor were heated to 80° C. and sucked, the reactor was purged with nitrogen gas to remove oxygen in the reactor. Thereafter, the contents were stirred at 280 rpm. After adding 100 g of HFP into the reactor, the TFE monomer was added until the pressure reached 0.73 MPaG. 1,970 mg of ammonium persulfate (APS) initiator dissolved in 20 g of deionized water was injected into the reactor and the pressure in the reactor was adjusted to 0.83 MPaG. A drop in pressure occurred after injection of the initiator, indicating the initiation of polymerization. TFE was added to the reactor to keep the pressure constant at 0.78 MPaG. Every 5 hours after the initiation of polymerization, 180 mg of APS initiator dissolved in 10 g of deionized water was added. Polymerization was continued until about 900 g of TFE monomer was consumed in the reaction. Then, the reactor was evacuated to normal pressure, and the contents were taken out from the reactor and cooled. The supernatant paraffin wax was removed from the PFA aqueous dispersion.

The solid concentration of the resulting FEP aqueous dispersion was 20.3% by mass.

A portion of the resulting FEP aqueous dispersion was put in a freezer and frozen. The frozen FEP aqueous dispersion was left to stand until 25° C. was reached, to obtain a coagulated powder. The coagulated wet powder was dried at 150° C. for 18 hours. At this time, the FEP powder had a melt flow rate of 3.4 g/10 minutes, a melting point of 249.7° C., and an HFP modification amount of 7.7 mol %.

Example 25

To an autoclave made of SUS with an internal volume of 3 L, 1,657 g of deionized water and 3.0 g of the polymer A were added. The reactor was sealed and the system was purged with nitrogen to remove oxygen. The temperature of the reactor was raised to 80° C., and while stirring, a monomer composition (initial monomer) consisting of vinylidene fluoride (VDF)/tetrafluoroethylene (TFE)/hexafluoropropylene (HFP) (=19/11/70 mol %) was fed under pressure until the pressure reaches 1.53 MPaG. Then, a polymerization initiator aqueous solution prepared by dissolving 0.30 g of ammonium persulfate (APS) in deionized water was fed under nitrogen gas pressure to initiate the reaction. At the point when the internal pressure dropped to 1.50 MPaG as the polymerization proceeded, a mixed monomer consisting of VDF/TFE/HFP (=50/20/30 mol %) was charged until the internal pressure was kept constant at 1.53 MPaG. APS was dissolved in deionized water as described above in an amount of 0.15 g after 100 minutes, 0.15 g after 130 minutes and 0.15 g after 320 minutes from the initiation of polymerization, and fed under nitrogen gas pressure to continue the polymerization reaction. When 12 g of the mixed monomer was added, 3.75 g of diethyl malonate was fed as a chain transfer agent under nitrogen gas pressure. When 261 g of the mixed monomer was added, the stirring was stopped and the pressure was released until the reactor was adjusted to the atmospheric pressure. The autoclave was cooled to obtain an aqueous dispersion having a solid concentration of 13.1% by mass.

An aqueous aluminum sulfate solution was added to the aqueous dispersion to cause coagulation. The resulting coagulated product was washed with water and dried to obtain a rubbery fluorine-containing copolymer. The Mooney viscosity of the rubbery fluorine-containing copolymer was ML1+10 (100° C.)=21.1. The copolymer compositional features were determined by NMR analysis to be VDF/TFE/HFP=50/20/30 (mol %).

Example 26

To an autoclave made of SUS with an internal volume of 3 L, 1,657 g of deionized water and 3.0 g of the polymer A were added. The reactor was sealed and the system was purged with nitrogen to remove oxygen. The temperature of the reactor was raised to 80° C., and while stirring, a monomer composition (initial monomer) consisting of vinylidene fluoride (VDF)/tetrafluoroethylene (TFE)/hexafluoropropylene (HFP) (=19/11/70 mol %) was fed under pressure until the pressure reached 1.53 MPaG. Then, a polymerization initiator aqueous solution prepared by dissolving 0.030 g of ammonium persulfate (APS) in deionized water was fed under nitrogen gas pressure to initiate the reaction. At the point when the internal pressure dropped to 1.50 MPaG as the polymerization proceeded, a mixed monomer consisting of VDF/TFE/HFP (=50/20/30 mol %) was charged to keep the internal pressure constant at 1.53 MPaG. APS was dissolved in deionized water as described above in an amount of 0.06 g after 130 minutes, 0.30 g after 300 minutes and 0.30 g after 370 minutes from the initiation of polymerization, and fed under nitrogen gas pressure to continue the polymerization reaction. When 12 g of the mixed monomer was added, 2.907 g of diiodine compound $I(CF_2)_4I$ was fed as a chain transfer agent under nitrogen gas pressure. When 500 g of the mixed monomer was added, the stirring was stopped and the pressure was released until the reactor was adjusted to the atmospheric pressure. The autoclave was cooled to obtain an aqueous dispersion having a solid concentration of 23.4% by mass.

An aqueous aluminum sulfate solution was added to the aqueous dispersion to cause coagulation. The resulting coagulated product was washed with water and dried to obtain a rubbery fluorine-containing copolymer. The Mooney viscosity of the rubbery fluorine-containing copolymer was ML1+10 (100° C.)=31.8. The copolymer compositional features were determined by NMR analysis to be VDF/TFE/HFP=50/20/30 (mol %).

The invention claimed is:

1. A method for producing a fluoropolymer, comprising polymerizing a fluoromonomer in an aqueous medium in the presence of a polymer (1) and substantially in the absence of a fluorine-containing surfactant where an amount of the fluorine-containing surfactant in the aqueous medium is 10 ppm or less to provide a fluoropolymer, the polymer (1) having a number average molecular weight of $0.3\times10^4$ or more and comprising a polymerized unit (1) derived from a monomer represented by the following general formula (1):

$$CX_2{=}CY(\text{—}CZ_2\text{—}O\text{—}Rf\text{-}A) \quad (1)$$

wherein X is the same or different and is —H or —F; Y is —H, —F, an alkyl group, or a fluorine-containing alkyl group; Z is the same or different and is —H, —F, an alkyl group, or a fluoroalkyl group; Rf is a fluorine-containing alkylene group having 1 to 40 carbon atoms or a fluorine-containing alkylene group having 2 to 100 carbon atoms and having an ether bond; and A is —COOM, $—SO_3M$, or $—OSO_3M$, wherein M is —H, a metal atom, $—NR^7{}_4$, imidazolium optionally having a substituent, pyridinium optionally having a substituent, or phosphonium optionally having a substituent, wherein $R^7$ is H or an organic group, with the proviso that at least one of X, Y, and Z contains a fluorine atom.

2. The method according to claim 1, wherein in the general formula (1), at least one X is —H.

3. The method according to claim 1, wherein in the general formula (1), both X are —H.

4. The method according to claim 1, wherein in the general formula (1), Rf is a fluorine-containing alkylene group having 1 to 10 carbon atoms or a fluorine-containing alkylene group having 2 to 12 carbon atoms and having an ether bond.

5. The method according to claim 1, wherein the polymerized unit (1) is a polymerized unit (1A) derived from a monomer represented by the following general formula (1A):

$$CH_2{=}CF(\text{—}CF_2\text{—}O\text{—}Rf\text{-}A) \quad (1A)$$

wherein Rf and A are as described above.

6. The method according to claim 1, wherein the polymerized unit (1) is a polymerized unit (1a) derived from a fluoroallyl ether compound represented by the following general formula (1a):

$$CX_2{=}CFCF_2\text{—}O\text{—}(CF(CF_3)CF_2O)_{n5}\text{—}CF(CF_3)\text{-}A \quad (1a)$$

wherein each X is the same and represents F or H; n5 represents 0 or an integer of 1 to 10; and A is as defined above.

7. The method according to claim 1, wherein A is —COOM.

8. The method according to claim 1, wherein M is —H, —Na, —K, —Li, or $—NH_4$.

9. The method according to claim 1, wherein the polymer (1) has a content of the polymerized unit (1) of 90 mol % or more based on all polymerized units.

10. The method according to claim 1, wherein the polymer (1) has a number average molecular weight of $1.0\times10^4$ or more.

11. The method according to claim 1, wherein the polymer (1) has a number average molecular weight of $3.0\times10^4$ or more.

12. The method according to claim 1, wherein the fluoropolymer is polytetrafluoroethylene.

13. The method according to claim 12, wherein the polytetrafluoroethylene is a modified polytetrafluoroethylene.

14. A method for producing a stretched body, comprising stretching a polytetrafluoroethylene obtained by the method according to claim 12.

* * * * *